US006701338B2

United States Patent
Narad et al.

(10) Patent No.: US 6,701,338 B2
(45) Date of Patent: Mar. 2, 2004

(54) CUMULATIVE STATUS OF ARITHMETIC OPERATIONS

(75) Inventors: Charles E. Narad, Santa Clara, CA (US); Kevin Fall, Berkley, CA (US); Neil MacAvoy, Redwood City, CA (US); Pradip Shankar, Fremont, CA (US); Leonard M. Rand, San Francisco, CA (US); Jerry J. Hall, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 183 days.

(21) Appl. No.: 10/059,770

(22) Filed: Jan. 28, 2002

(65) Prior Publication Data

US 2003/0005103 A1 Jan. 2, 2003

Related U.S. Application Data

(63) Continuation of application No. 09/283,662, filed on Apr. 1, 1999, now Pat. No. 6,421,730, which is a continuation of application No. 09/097,858, filed on Jun. 15, 1998, now Pat. No. 6,157,955.

(51) Int. Cl.[7] ............................................. G06F 13/00
(52) U.S. Cl. ...................................... 708/525; 709/223
(58) Field of Search ................................ 709/220, 222, 709/223; 708/100, 231, 300, 303, 305, 490, 510, 525, 672

(56) References Cited

U.S. PATENT DOCUMENTS

| 5,485,455 A | 1/1996 | Dobbins et al. |
| 5,764,645 A | 6/1998 | Bernet et al. |
| 6,078,953 A | 6/2000 | Vaid et al. |

OTHER PUBLICATIONS rfc1633, Network Working Group, R. Braden, Request for comments: 1633, ISI, Category: Informational, D. Clark, MIT, S. Shenker, Xerox, PARC, Jun. 1994. 25 Pages.

IBM Research Report, Design and Implementation of a QoS Capable Switch–Router, E. Basturk, A. Birman, 01/31/097, 25 Pages.

*Primary Examiner*—Robert B. Harrell
(74) *Attorney, Agent, or Firm*—Robert A. Greenberg

(57) ABSTRACT

The present invention relates to a general-purpose programmable packet-processing platform for accelerating network infrastructure applications which have been structured so as to separate the stages of classification and action. Network packet classification, execution of actions upon those packets, management of buffer flow, encryption services, and management of Network Interface Controllers are accelerated through the use of a multiplicity of specialized modules. A language interface is defined for specifying both stateless and stateful classification of packets and to associate actions with classification results in order to efficiently utilize these specialized modules.

64 Claims, 19 Drawing Sheets

| Ring Base Register 400 | | THRESHOLD REPORTED |
|---|---|---|
| + 0x0000 | RX_A Ring 402 | <256 valid between MPROD & MFILL |
| + 0x1000 | RX_B Ring 404 | <256 valid between MPROD & MFILL |
| + 0x2000 | TX_A Ring 406 | <256 empty between MTPROD & MTRECOV |
| + 0x3000 | TX_B Ring 408 | <256 empty between MTPROD & MTRECOV |
| + 0x4000 | Reclassify_A_Inbound Ring 410 | <256 empty between RPROD & RPCONS |
| + 0x5000 | Reclassify_A_Outbound Ring 412 | <256 empty between RPROD & RPCONS |
| + 0x6000 | Reclassify_B_Inbound Ring 414 | <256 empty between RPROD & RPCONS |
| + 0x7000 | Reclassify_B_Outbound Ring 416 | <256 empty between RPROD & RPCONS |
| + 0x8000 | DMA Ring 418 | <256 empty between DMA_PROD & DMA_RECOV |
| + 0x9000 | Crypto Ring 420 | <256 empty between CRYP_PROD & CRYP_CONS |
| + 0xA000 | COM0 Ring 422 | |
| + 0xB000 | COM1 Ring 424 | |
| + 0xC000 | COM2 Ring 426 | The 5 General Purpose Rings have Prog. |
| + 0xD000 | COM3 Ring 428 | <256-empty/<256-full Threshold as set in the RBASE Register. |
| + 0xE000 | COM4 Ring 430 | |

CUMULATIVE STATUS OF ARITHMETIC OPERATIONS

RELATED APPLICATIONS

This application is a Continuation of Ser. No. 09/283,662, filed Apr. 1, 1999, now U.S. Pat. No. 6,421,730 which is a Continuation of Ser. No. 09/097,858, filed Jun. 15, 1998, now U.S. Pat. No. 6,157,955.

FIELD OF THE INVENTION

The present invention relates to computer networks and, more particularly, to a general purpose programmable platform for acceleration of network infrastructure applications.

BACKGROUND OF THE INVENTION

Computer networks have become a key part of the corporate infrastructure. Organizations have become increasingly dependent on intranets and the Internet and are demanding much greater levels of performance from their network infrastructure. The network infrastructure is being viewed: (1) as a competitive advantage; (2) as mission critical; (3) as a cost center. The infrastructure itself is transitioning from 10 Mb/s (megabits per second) capability to 100 Mb/s capability. Soon, infrastructure capable of 1 Gb/s (gigabits per second) will start appearing on server connections, trunks and backbones. As more and more computing equipment gets deployed, the number of nodes within an organization has also grown. There has been a doubling of users, and a ten-fold increase in the amount of traffic every year.

Network infrastructure applications monitor, manage and manipulate network traffic in the fabric of computer networks. The high demand for network bandwidth and connectivity has led to tremendous complexity and performance requirements for this class of application. Traditional methods of dealing with these problems are no longer adequate.

Several sophisticated software applications that provide solutions to the problems encountered by the network manager have emerged. The main areas for such applications are Security, Quality of Service (QoS)/Class of Service (CoS) and Network Management. Examples are: Firewalls; Intrusion Detection; Encryption; Virtual Private Networks (VPN); enabling services for ISPs (load balancing and such); Accounting; Web billing; Bandwidth Optimization; Service Level Management; Commerce; Application Level Management; Active Network Management.

There are three conventional ways in which these applications are deployed:

(1) On general purpose computers.

(2) Using single function boxes.

(3) On switches and routers.

It is instructive to examine the issues related to each of these deployment techniques.

1. General Purpose Computers

General Purpose computers, such as PCs running NT/Windows or workstations running Solaris/HP-UX, etc. are a common method for deploying network infrastructure applications. The typical configuration consists of two or more network interfaces each providing a connection to a network segment. The application runs on the main processor (Pentium/SPARC etc.) and communicates with the Network Interface Controller (NIC) card either through (typically) the socket interface or (in some cases) a specialized driver "shim" in the operating system (OS). The "shim" approach allows access to "raw" packets, which is necessary for many of the packet oriented applications. Applications that are end-point oriented, such as proxies can interface to the top of the IP (Internet Protocol) or other protocol stack.

The advantages of running the application on a general purpose computer include: a full development environment; all he OS services (IPC, file system, memory management threads, I/O etc); low cost due to ubiquity of the platform; stability of the APIs; and assurance that performance will increase with each new generation of the general purpose computer technology.

There are, however, many disadvantages of running the application on a general purpose computer. First, the I/O subsystem on a general purpose computer is optimized to provide a standard connection to a variety of peripherals at reasonable cost and, hence, reasonable performance. 32b/33 MHz PCI ("Peripheral Connection Interface", the dominant I/O connection on common general purpose platforms today) has an effective bandwidth in the 50–75 MB/s range. While this is adequate for a few interfaces to high performance networks, it does not scale. Also, there is significant latency involved in accesses to the card. Therefore, any kind of non-pipelined activity results in a significant performance impact.

Another disadvantage is that general purpose computers do not typically have good interrupt response time and context switch characteristics (as opposed to real-time operating systems used in many embedded applications). While this is not a problem for most computing environments, it is far from ideal for a network infrastructure application. Network infrastructure applications have to deal with network traffic operating at increasingly higher speeds and less time between packets. Small interrupt response times and small context switch times are very necessary.

Another disadvantage is that general purpose platforms do not have any specialized hardware that assist with network infrastructure applications. With rare exception, none of the instruction sets for general purpose computers are optimized for network infrastructure applications.

Another disadvantage is that, on a general purpose computer, typical network applications are built on top of the TCP/IP stack. This severely limits the packet processing capability of the application.

Another disadvantage is that packets need to be pulled into the processor cache for processing. Cache fills and write backs become a severe bottleneck for high bandwidth networks.

Finally, general purpose platforms use general purpose operating systems (OS's). These operating systems are generally not known for having quick reboots on power-cycle or other wiring-closet appliance oriented characteristics important for network infrastructure applications.

2. Fixed-Function Appliances

There are a couple of different ways to build single function appliances. The first way is to take a single board computer, add in a couple of NIC cards, and run an executive program on the main processor. This approach avoids some of the problems that a general purpose OS brings, but the performance is still limited to that of the base platform architecture (as described above).

A way to enhance the performance is to build special purpose hardware that performs functions required by the specific application very well. Therefore, from a performance standpoint, this can be a very good approach.

There are, however, a couple of key issues with special function appliances. For example, they are not expandable by their very nature. If the network manager needs a new application, he/she will need to procure a new appliance. Contrast this with loading a new application on a desktop PC. In the case of a PC, a new appliance is not needed with every new application.

Finally, if the solution is not completely custom, it is unlikely that the solution is scalable. Using a PC or other single board computer as the packet processor for each location at which that application is installed is not cost-effective.

3. Switches and Routers

Another approach is to deploy a scaled down version of an application on switches and routers which comprise the fabric of the network. The advantages of this approach are that: (1) no additional equipment is required for the deployment of the application; and (2) all of the segments in a network are visible at the switches.

There are a number of problems with this approach.

One disadvantage is that the processing power available at a switch or router is limited. Typically, this processing power is dedicated to the primary business of the switch/router—switching or routing. When significant applications have to be run on these switches or routers, their performance drops.

Another disadvantage is that not all nodes in a network need to be managed in the same way. Putting significant processing power on all the ports of a switch or router is not cost-effective.

Another disadvantage is that, even if processing power became so cheap as to be deployed freely at every port of a switch or router, a switch or router is optimized to move frames/packets from port to port. It is not optimized to process packets, for applications.

Another disadvantage is that a typical switch or router does not provide the facilities that are necessary for the creation and deployment of sophisticated network infrastructure applications. The services required can be quite extensive and porting an application to run on a switch or router can be very difficult.

Finally, replacing existing network switching equipment with new versions that support new applications can be difficult. It is much more effective to "add applications" to the network where needed.

What is needed is an optimized platform for the deployment of sophisticated software applications in a network environment.

SUMMARY

The present invention relates to a general-purpose programmable packet processing platform for accelerating network infrastructure applications which have been structured so as to separate the stages of classification and action. A wide variety of embodiments of the present invention are possible and will be understood by those skilled in the art based on the present patent application. In certain embodiments, acceleration is achieved by one or more of the following:

Dividing the steps of packet processing into a multiplicity of pipeline stages and providing different functional units for different stages, thus allowing more processing time per packet and also providing concurrency in the processing of multiple packets, Providing custom, specialized Classification Engines which are micro-programmed processors optimized for the various functions common in predicate analysis and table searches for these sort of applications, and are each used as pipeline stages in different flows, Providing a general-purpose microprocessor for executing the arbitrary actions desired by these applications, Providing a tightly-coupled encryption coprocessor to accelerate common network encryption functions, Reducing or eliminating the need for the applications to examine the actual contents of the packet, thus minimizing the movement of packet data and the effects of that data movement on the processor's cache/bus/memory subsystem, and Either eliminating or providing special hardware to accelerate system overheads common to embedded network applications run on general purpose platforms; this includes special support for managing buffer pools, for communication among units and the passing of buffers between them, and for managing the network interface MACs (media access controllers) without the need for heavyweight device driver programs.

Recognizing a common policy enforcement module for network infrastructure applications Certain specific embodiments are implemented with one or more of the following features:

a policy enforcement module consisting of Classification and associated Action both stateless classification and stateful classification which uses sets Provision of a high level interface to packet level Classification and Action (Action and Classification Engine—ACE)

Provision of the high level interface within common operating environments

Policy can be changed dynamically

Application partitioned into an AP module running on the AP (Application Processor) and a PE (Policy Engine) module running on the PE AP can run operating systems with full services to facilitate application development PE functionality embodied as software running on AP as well as hardware and software running on the hardware PE A language interface to describe Classification and to associate Actions with the results of the Classification Language (NetBoost Classification Language-NCL) for Classification/Action Object oriented (extensible)

Specific to Classification and hence very simple

Built-in intrinsics such as checksum

Language constructs make it easy to describe layered protocols and protocol fields Rule construct to associate Classification and Actions Predicate construct which is a function of packet contents at any layer of any protocol and/or of hash search results Set construct to describe hash tables and multiple searches on the same hash table Action code Written in high level language Complex packet processing possible Can avail of Application Services Library (ASL) providing services useful for packet processing ASL consists of packet management, memory management, time and event management, link level services, packet timestamp service, cryptographic services, communication services to AP module plus extensions TCP/IP extensions include services such as Network Address Translation (NAT) for IP, TCP and UDP, Checksums, IP fragment reassembly and TCP segment reassembly System components include library implementing API (DLL under Windows NT)

a management process called Resolver an incremental compiler for NCL linker for NCL code dynamic linker for action code operating-system specific drivers which communicate with both hardware and software PEs software Policy Engine that executes Classification and Action code ASL for Action code management services (Resolver and Plumber) for both application developer and the end-user development environment for AP and PE code including compilers, and other software development tools familiar to those skilled in the art

ACE

C++ object which abstracts the packet processing associated with an application or sub-application Provides a context for Classification and Action Contains one or more Target objects, including drop and default, which represent packet destinations Provides a context for upcalls and downcalls between the AP and the PE modules Targets of an ACE are connected to other ACEs or interfaces using the Plumber (graphical and programmatic interfaces) to specify the serialization of ACE processing Operating environment for action code Invokes actions automatically when associated classification succeeds Implements an ACE context Low overhead (soft real-time) environment Handles communication between AP and PE Performs dynamic linking of action code when ACEs are loaded with new Classification code Resolver Maintains namespace of applications, interfaces and ACEs Maps ACEs to PEs automatically Contains the compiler for NCL and does dynamic compilation of NCL Provides the interfaces for management of applications, ACEs and interfaces Compiler for NCL Generates code for multiple processors (AP and PE)

Allows incremental compilation of rules

Plumber

Allows interconnection of ACEs

Allow binding to interfaces

Supports secure remote access

BRIEF DESCRIPTION OF THE DRAWINGS

FIG. 5 shows a ring array in memory related to the present invention.

DETAILED DESCRIPTION OF PREFERRED EMBODIMENTS

Network infrastructure applications generally contain both time-critical and non-time-critical sections. The non-time-critical sections generally deal with setup, configuration, user interface and policy management. The time-critical sections generally deal with policy enforcement. The policy enforcement piece generally has to run at network speeds. The present invention pertains to an efficient architecture for policy enforcement that enables application of complex policy at network rates.

Figure 1:
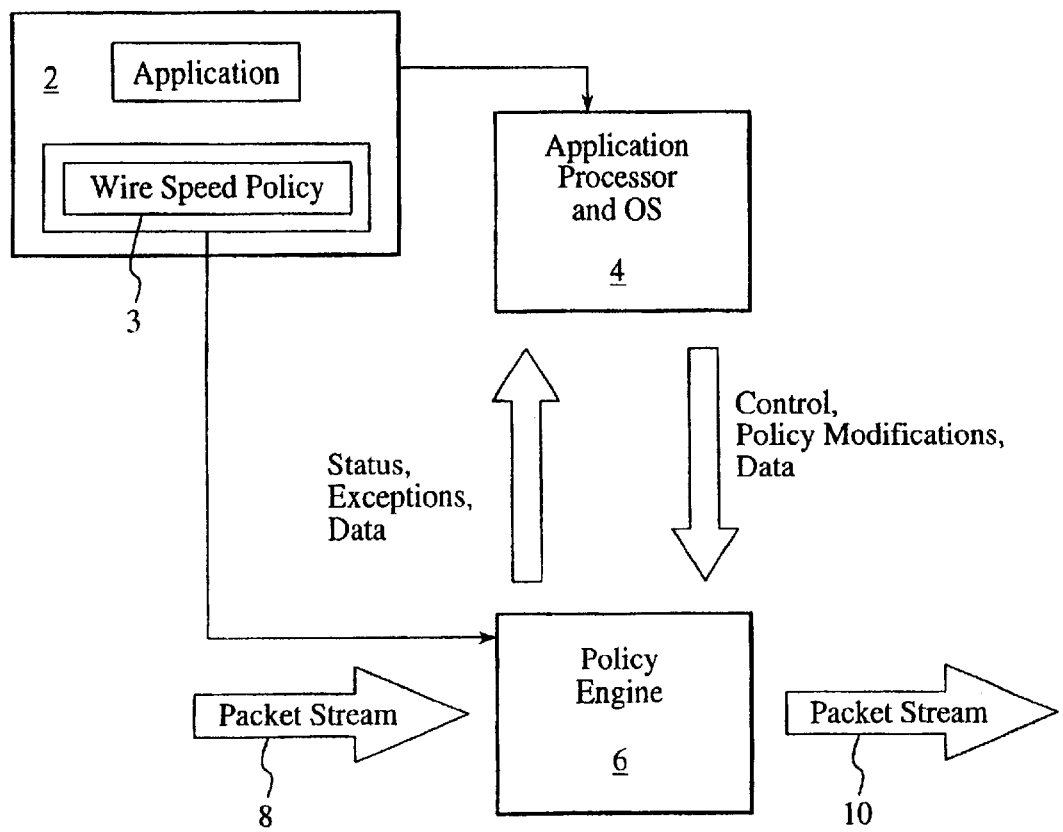
FIG. 1 is a block diagram of a system in accordance with the present invention.

FIG. 1 shows a Network Infrastructure Application, called Application 2, being deployed on an Application Processor (AP) 4 running a standard operating system. The policy enforcement section of the Application 2, called Wire Speed Policy 3 runs on the Policy Engine (PE) 6. The Policy Engine 6 transforms the inbound Packet Stream 8 into the outbound Packet Stream 10 per the Wire Speed Policy 3. Communications from the Application Processor 4 to the Policy Engine 6, in addition to the Wire Speed Policy 3, consists of control, policy modifications and packet data as desired the Application 2. Communication from the Policy Engine 3 to the Application Processor 4 consists of status, exception conditions and packet data as desired by the Application 2.

In a preferred embodiment of a Policy Engine (PE) according to the present invention, the PE provides a highly programmable platform for classifying network packets and implementing policy decisions about those packets at wire speed. Certain embodiments provide two Fast Ethernet ports and implement a pipelined dataflow architecture with storeand-forward. Packets are run through a Classification Engine (CE) which executes a programmed series of hardware assist operations such as chained field comparisons and generation of checksums and hash table pointers, then are handed to a microprocessor ("Policy Processor" or PP) for execution of policy decisions such as Pass, Drop, Enqueue/Delay, (de/en)capsulate, and (de/en)crypt based on the results from the CE. Some packets which require higher level processing may be sent to the host computer system ("Application Processor" or AP). (See FIG. 4.) An optional cryptographic ("Crypto") Processor is provided for accelerating such functions as encryption and key management.

Third-party applications such as firewalls, rate shaping, QoS/CoS, network management and others can be implemented to take advantage of this three-tiered approach to filtering packets. Support for easy encapsulation without copies combined with encryption support allows for VPNs ("Virtual Private Networks") and other applications that require security services.

A large parity-protected synchronous DRAM (SDRAM) buffer memory is provided, along with a PCI interface that is used for communication with the host (AP) and potentially for peer-to-peer communication among Policy Engines, e.g. for applications which route and switch.

In certain embodiments the Policy Engine ASIC can be used on a PCI card both for application software development and for use in a PC or workstation as a two interface product, and can also be used in a multiple-segment appliance with a plurality of PE's along with an embedded Application Processor for a stand-alone product.

In certain embodiments, when used in an appliance, the PE's reside on PCI segments connected together through a plurality of PCI-to-PCI bridges which connect to the host PCI bus on the Application Processor. The PCI bus is 64-bit for all agents in order to provide sufficient bandwidth for applications which route or switch.

Figure 4:
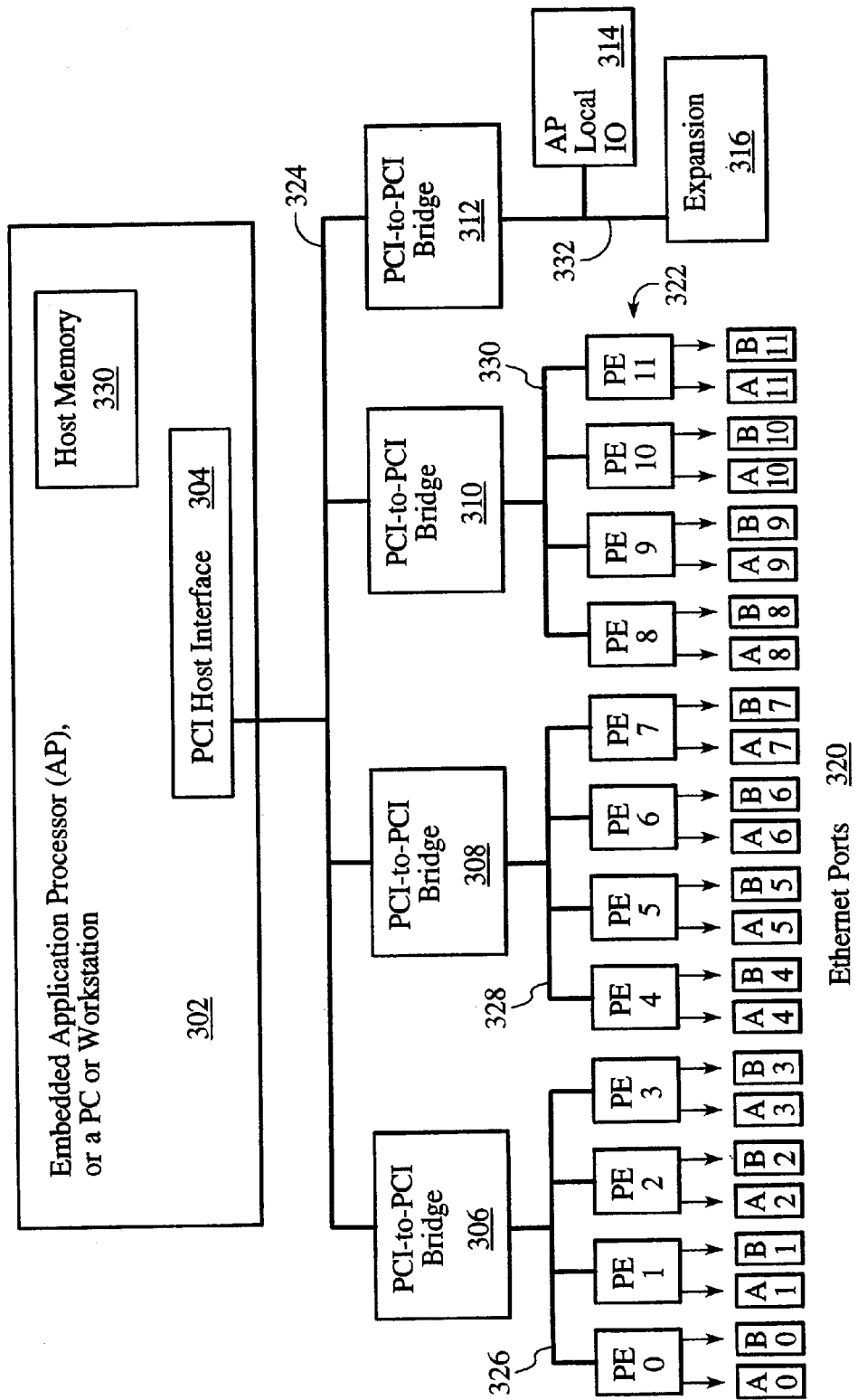
FIG. 4 is a sample system-level block diagram related to the present invention.

A sample system level block diagram is shown in FIG. 4.

FIG. 4 shows an application processor 302 which contains a host interface 304 to a PCI bus 324. Fanout of the PCI bus 324 to a larger number of loads is accomplished with PCI-to-PCI Bridge devices 306, 308, 310, and 312; each of those controls an isolated segment on a "child" PCI bus 326, 328, 330, and 332 respectively. On three of these isolated segments 326, 328, and 330 is a number of Policy Engines 322; each Policy Engine 322 connects to two Ethernet ports 320 which connects the Policy Engine 322 to a network segment.

One of the PCI-to-PCI Bridges 312 controls child PCI bus 322, which provides the Application Processor 302 with connection to standard I/O devices 314 and optionally to PCI expansion slots 316 into which additional PCI devices can be connected.

In a smaller configuration of the preferred embodiment of the invention the number of Policy Engines 322 does not exceed the maximum load allowed on a PCI bus 324; in that case the PCI-to-PCI bridges 306, 308, and 310 are eliminated and up to four Policy Engines 322 are connected directly to the host PCI bus 324, each connecting also to two Ethernet ports 320. This smaller configuration may still have the PCI-to-PCI Bridge 312 present to isolate Local I/O 314 and expansion slots 316 from the PCI bus 324, or the Bridge 312 may also be eliminated and the devices 314 and expansion 316 may also be connected directly to the host PCI bus 324.

I. Packet Flow

In certain embodiments, the PE utilizes two Fast Ethernet MAC's (Media Access Controllers) with IEEE 802.3 standard Media Independent Interface ("MII") connections to external physical media (PHY) devices which attach to Ethernet segments. Each Ethernet MAC receives packets into buffers addressed by buffer pointers obtained from a producer-consumer ring and then passes the buffer (that is, passes the buffer pointer) to a Classification Engine for processing, and from there to the Policy Processor. The "buffer pointer" is a data structure comprising the address of a buffer and a software-assigned "tag" field containing other information about that buffer. The "buffer pointer" is a fundamental unit of communication among the various hardware and software modules comprising a PE. From the PP, there are many paths the packet can take, depending on what the application(s) running on the PP decide is the proper disposition of that packet. It can be transmitted, sent to Crypto, delayed in memory, passed through a Classification Engine again for further processing, or copied from the PE's memory over the PCI bus to the host's memory or to a peer device's memory, using the DMA engine. The PP may also gather statistics on that packet into records in a hash table or in general memory. A pointer to the buffer containing both the packet and data structures describing that packet is passed around among the various modules.

The PP may choose to drop a packet, to modify the contents of the packet, or to forward the packet to the AP or to a different network segment over the PCI Bus (e.g. for routing.) The AP or PP can create packets of its own for transmission. A 3rd-party NIC (Network Interface Card) on the PCIbus can use the PE memory for receiving packets, and the PP and AP can then cooperate to feed those packets into the classification stream, effectively providing acceleration for packets from arbitrary networks. When doing so, adjacent 2 KB buffers can be concatenated to provide buffers of any size needed for a particular protocol.

Figure 2:
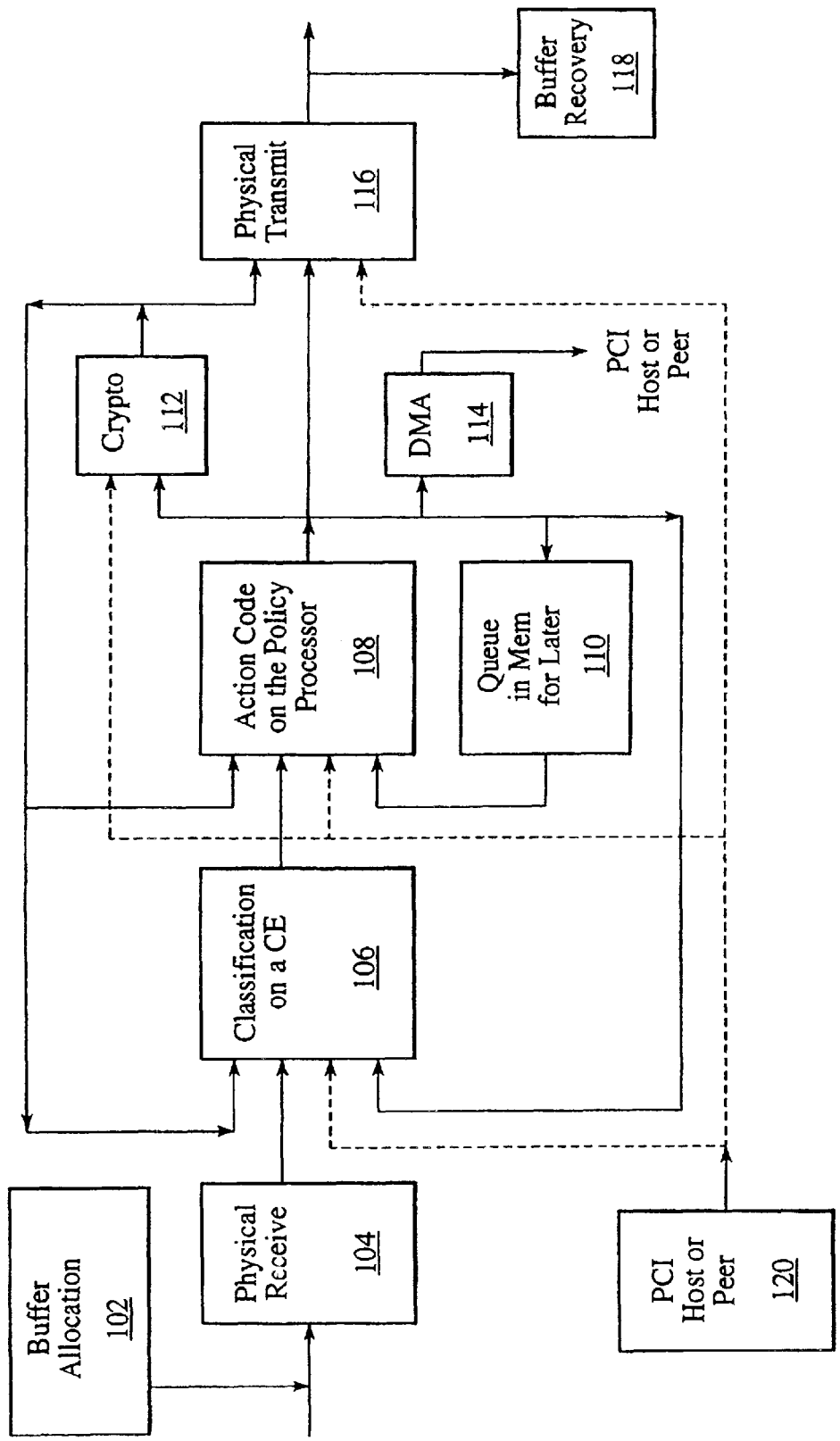
FIG. 2 is a block diagram showing packet flow according to an embodiment of the present invention.
Figure 6:
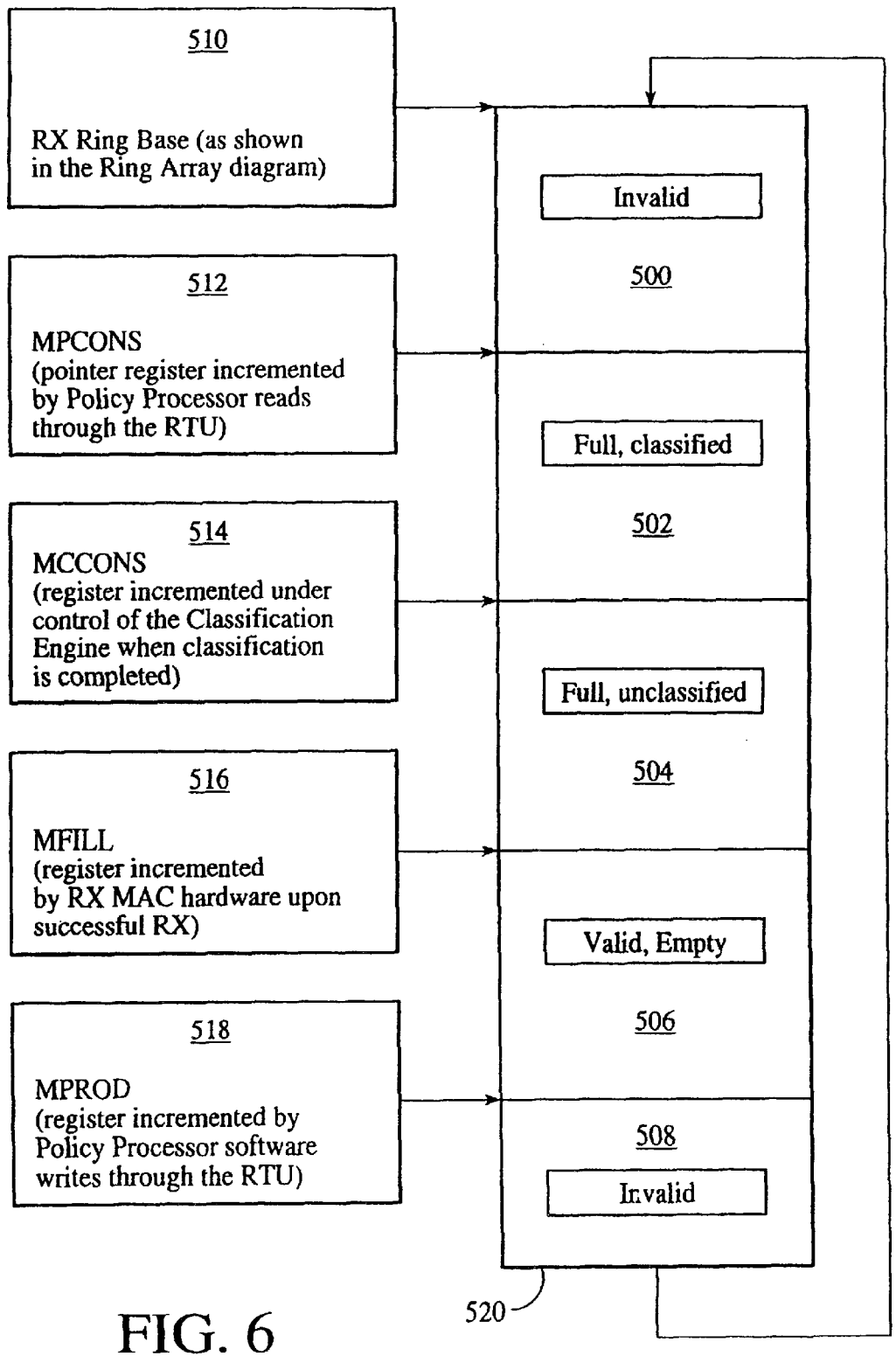
FIG. 6 shows an RX Ring Structure related to the present invention.
Figure 7:
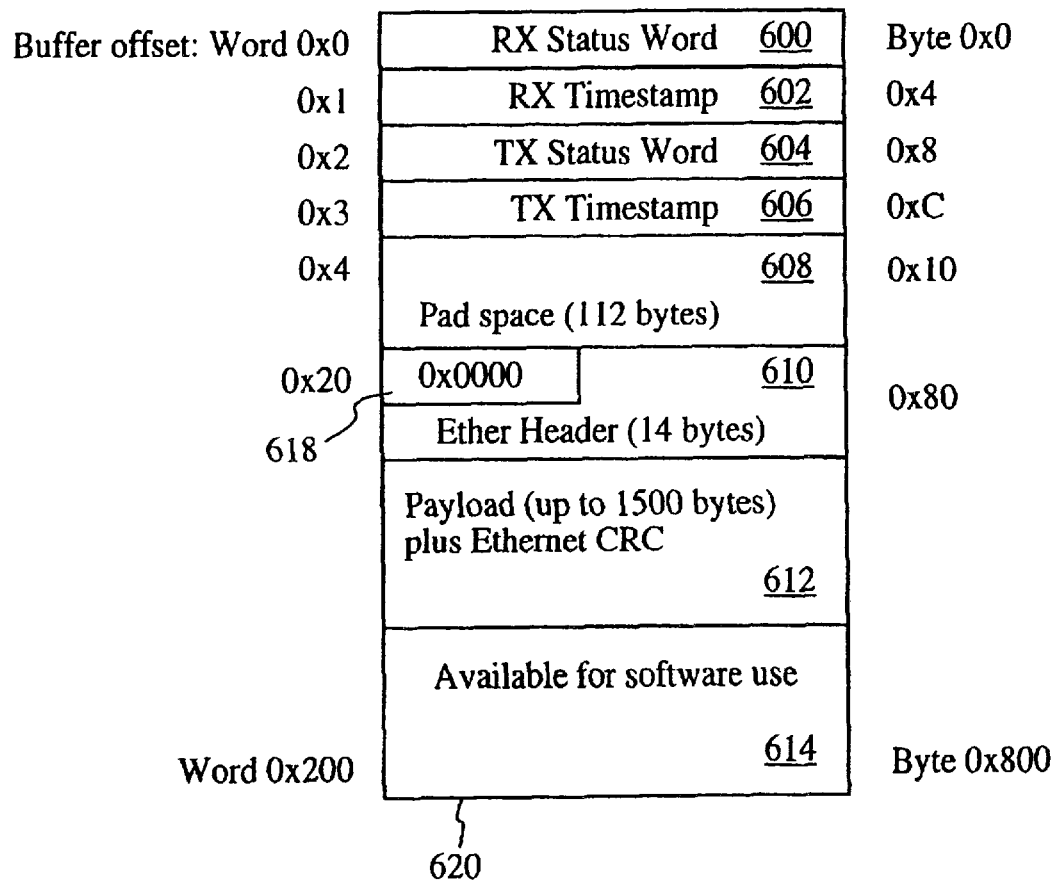
FIG. 7 shows a receive buffer format related to the present invention.

FIG. 2 illustrates packet flow according to certain embodiments of the present invention. Each box represents a process which is applied to a packet buffer and/or the contents of a packet buffer 620 as shown in FIG. 7. The buffer management process involves buffer allocation 102 and the recovery of retired buffers 118. When buffer allocation 102 into an RX Ring 402 or 404 occurs, the Policy Processor 244 enqueues a buffer pointer into the RX Ring 402 or 404 and thus allocates the buffer 620 to the receive MAC 216 or 230, respectively. Upon receiving a packet, the RX MAC controller 220 or 228 uses the buffer pointer at the entry in the RX ring structure of FIG. 6 which is pointed to by MFILL 516 to identify a 2 KB section of memory 260 that it can use to store the newly received packet. This process of receiving a packet and placing it into a buffer 620 is represented by physical receive 104 in FIG. 2.

The RX MAC controller 220 or 228 increments the MFILL pointer 516 modulo ring size to signal that the buffer 620 whose pointer is in the RX Ring 402 or 404 has been filled with a new packet 610 and 612 plus receive status 600 and 602. The Ring Translation Unit 264 detects a difference between MFILL 516 and MCCONS 514 and signals to the classification engine 238 or 242, respectively, for RX Ring 402 or 404, that a newly received packet is ready for processing. The Classification Engine 238 or 242 applies Classification 106 to that packet and creates a description of the packet which is placed in the packet buffer software area 614, then increments MCCONS 514 to indicate that it has completed classification 106 of that packet. The Ring Translation Unit 264 detects a difference between MCCONS 514 and MPCONS 512 and signals to the Policy Processor 244 that a classified packet is ready for action processing 108.

The Policy Processor 244 obtains the buffer pointer from the ring location pointed to by 512 by dequeueing that pointer from the RX Ring 402 or 404, and executes application-specific action code 108 to determine the disposition of the packet. The action code 108 may choose to send the packet to an Ethernet Transmit MAC 218 or 234 by enqueueing the buffer pointer on a TX Ring 406 or 408, respectively; the packet may or may not have been modified by the action code 108 prior to this. Alternatively the action code 108 may choose to send the packet to the attached cryptographic processor (Crypto) 246 for encryption, decryption, compression, decompression, security key management, parsing of IPSEC headers, or other associated functions; this entire bundle of functions is described by Crypto 112. Alternatively the action code 108 may choose to copy the packet to a PCI peer 322 or 314 or 316, or to the host memory 330, both paths being accomplished by the process 114 of creating a DMA descriptor as shown in Table 3 and then enqueueing the pointer to that descriptor into DMA Ring 418 by writing that pointer to DMA_PROD 1116, which triggers the DMA Unit 210 to initiate a transfer Alternatively the action code 118 can choose to temporarily enqueue the packet for delay 110 in memory 260 that is managed by the action code 118. Finally, the action code 108 can choose to send a packet for further classification 106 on any of the Classification Engines 208, 212, 238, or 242, either because the packet has been modified or because there is additional classification which can be run on the packet which the action code 108 can command the Classification process 106 to execute via flags in the RX Status Word 600, through the buffer's software area 614, or by use of tag bits in the 32-bit buffer pointer reserved for that use.

Packets can arrive at the classification process 106 from additional sources besides physical receive 104. Classification 106 may receive a packet from the output of the Crypto processing 112, from the Application Processor 302 or from a PCI peer 322 or 314 or 316, or from the application code 108.

Packets can arrive at the action code 108 from classification 106, from the Application Processor 302, from a PCI peer 322 or 314 or 316, from the output of the Crypto processing 112, and from a delay queue 110. Additionally the action code 108 can create a packet. The disposition options for these packets are the same as those described for the receive path, above.

The Crypto processing 112 can receive a packet from the Policy Processor 244 as described above. The Application Processor 302 or a PCI peer 322 or 314 or 316 can also enqueue the pointer to a buffer onto the Crypto Ring 420 to schedule that packet for Crypto processing 112.

The TX MAC 218 or 234 transmits packets whose buffer pointer have been enqueued on the TX Ring 406 or 408, respectively. Those pointers may have been enqueued by the action code 106 running on the Policy Processor 244, by the Crypto processing 112, by the Application Processor 302, or by a PCI peer 322 or 314 or 316. When the TX MAC controller 222 or 232 has retired a buffer either by successfully transmitting the packet it contains, or abandoning the transmit due to transmit termination conditions, it will optionally write back TX status 806 and TX Timestamp 808 if programmed to do so, then will increment MTCONS 714 to indicate that this buffer 840 has been retired. The Ring Translation Unit 264 detects that there is a difference between MTCONS 714 and MTRECOV 712 and signals to the Policy Processor 244 that the TX Ring 406 or 408 has at least one retired buffer to recover; this triggers the buffer recovery process 118, which will dequeue the buffer pointer from the TX ring 406 or 408 and either send the buffer pointer to Buffer Allocation 102 or will add the recovered buffer to a software-managed free list for later use by Buffer Allocation 102.

It is also possible for a device in the PCI expansion slot 316 to play the role defined for the attached Crypto processor 246 performing crypto processing 112 via DMA 114 in this flow.

1. Communication and Buffer Management

In certain embodiments, the buffer memory consists of 16 to 128 MB of parity-protected SDRAM. It is used for packet buffers, for code and data structures for the microprocessor, as a staging area for Classification Engine microcode loading, and for buffers used in communicating with the AP and other PCI agents. The following uses of memory are defined by the architecture of the Policy Engine:

Buffer Pointer rings for RX_MAC_A RX_MAC_B, TX_MAC_A, TX_MAC_B (where "RX" denotes "receive", "TX" denotes "transmit", and "_A" and "_B" indicate which instance of the MAC is being described.)

A pool of 2 KB-aligned buffers used for holding packets that are being processed in this chip as well as information about those packets; larger buffers can be created by concatenating these 2 KB buffers if needed for processing larger packets from other media.

"Reclassification" pointer rings for each of the four Classification Engines; these are used to schedule packets for processing on that CE, when the classification of the packet is being scheduled by an agent other than an RX MAC.

A ring containing pointers to DMA descriptors used to schedule transfers using the DMA engine; data copies between PCI and memory in either direction are scheduled by enqueueing descriptor pointers on this ring A pool of memory allocated for use as DMA descriptors.

A pointer ring for scheduling packets for processing on the Crypto unit.

An area that contains instructions for the microprocessor, including the boot sequence An area for staging microcode to be loaded into the control store of the four Classification Engines.

Page tables for the Policy Processor MMU 16 words dedicated to mailbox communications; writes to these words from the PCIbus also set the corresponding mailbox bit in the mailbox status register which signals to the processor that the indicated mailbox has a new message.

A pool of 2 KB buffers that belong to the AP and are used for scheduling transmits of packets that have been handed to the AP for processing or that originate at the AP. In addition to these uses, parts of the memory may be allocated to the applications running on the PP for storing data such as local variables, counters, hash tables and the data structures they contain, AP to PP and PP to AP application-level communications areas, external coprocessor communication and transmit buffers, etc.

The Policy Engine takes advantage of the fact that buffers are 2 KB-aligned, and has the hardware ignore the lower 11 bits of each buffer base pointer, thus enabling software to use those pointer bits as tags.

A simple and lightweight mechanism for buffer allocation and recovery is provided. Hardware support for atomic enqueue and dequeue of buffers through producer-consumer rings, along with detection of completed (retired) buffers enables buffer management in only a few instructions. In the realtime executive loop run on the PP, a short section is devoted to reclaimation of free buffers into the free list from those rings which indicate to the PP that they have retired buffers available for recovery. The RX pools of allocated, empty buffers maintained in the RX Rings can be replenished from the freelist each time a filled, classified RX buffer is dequeued from that ring, thus maintaining the pool size. A simple linked list of buffers or other method well-known to those versed in the art can be used to implement a software-managed freelist from which to feed the pools.

Figure 3:
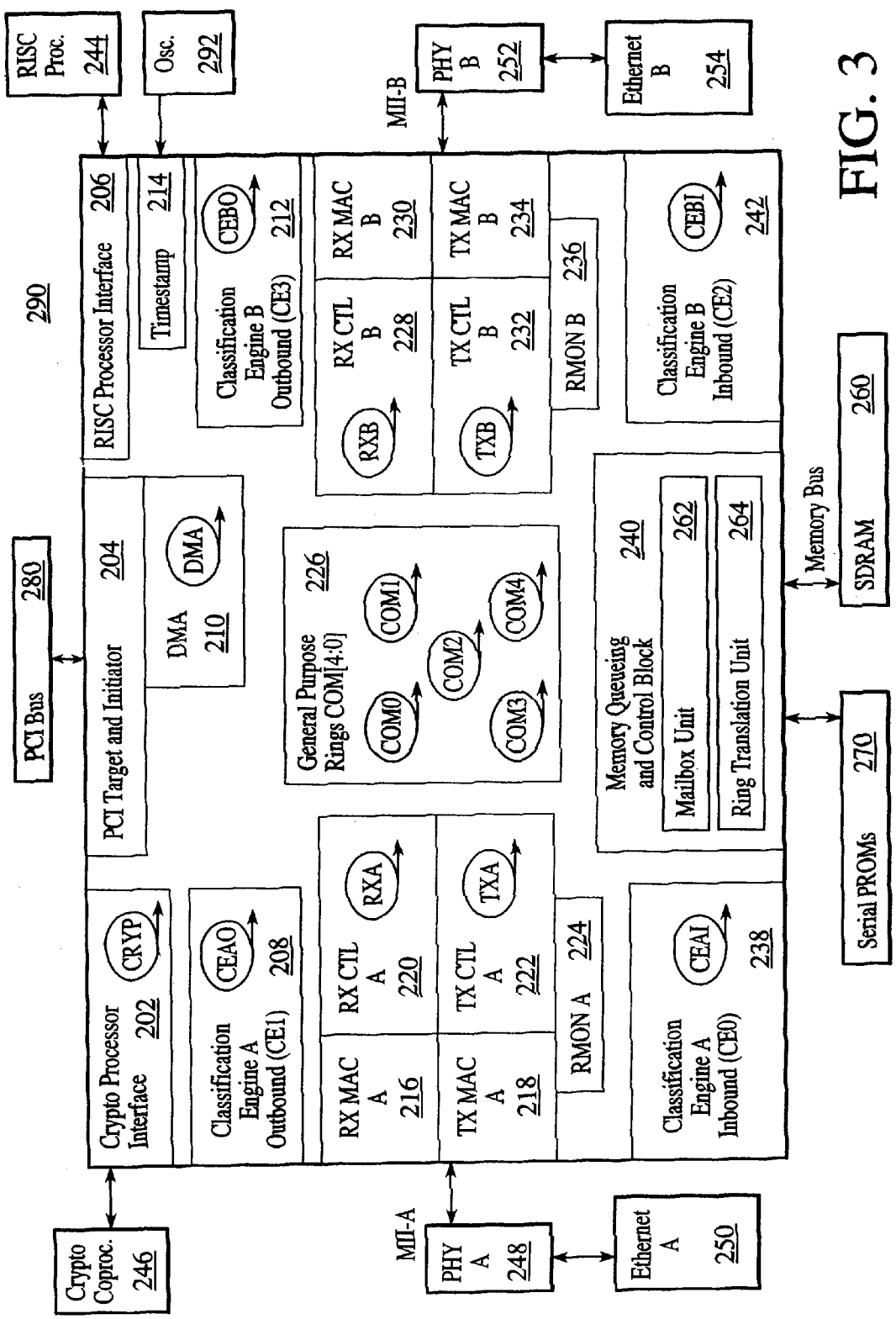
FIG. 3 is a Policy Engine ASIC block diagram according to the present invention.

In order to support atomic enqueueing/dequeueing of buffer pointers and of DMA descriptor pointers, a standard memory-based producer/consumer ring structure is supported in hardware for many purposes (as represented by the circle-with-arrow symbols in FIG. 3). In most cases one or more of the consumers is also a producer for the next consumer, so the rings have a series of index pointers which chase each other in sequence; for example the MAC RX Rings have a Produce Pointer for the allocation of empty buffers, a MAC FILL Pointer for the RXMAC to consume empty buffers and produce full buffers, a Classification Engine Consume Pointer for the CE to consume freshly received buffers and to produce classified buffers, and a Policy Processor Consume Pointer for the PP to consume classified packets as shown in FIG. 6. The leading producer accesses the ring through an "enqueue" register, and the end consumer accesses the ring through a "dequeue" register, obviating the need for mutexes (mutual exclusion locks) or (slow) memory accesses in managing shared ring structures. Interim consumer-producers fetch a buffer pointer through a ring index, then increment that index later to signal that they have finished processing the referenced buffer and that it is available for the next consumer.

This serialized multiple-producer/multiple-consumer ring structure allows for one ring to support a compelled series of steps with much less hardware than would be required to support a separate FIFO between each producer and consumer, and eliminates the need for each consumer-producer to write pointers to the next ring; every cycle saved in a real-time system such as this can be significant.

Hardware detects when there is a difference between a producer's ring index and the ring index for the next consumer in that communication sequence, and signals to the consumer that there is at least one buffer pointer in its ring for processing; thus the presence of work to do wakes up the associated unit, implementing a dataflow architecture through the use of hardware-managed rings.

Ring overflow, underflow, and threshold conditions are detected and reported to the ring users and the PP as appropriate.

2. Memory and Ring Translated Memory 2.1 Memory

Main memory in the preferred embodiment consists of up to 128 MB of synchronous DRAM (SDRAM) in two DIMM's (Dual In-line Memory Modules) or one double-sided DIMM. Detecting the presence of the DIMMs and their attributes uses the standard Serial Presence Detect interface, using the SPD register to manage accesses to the serial PROM. (The same interface is used to access a serial PROM containing MAC addresses, ASIC configuration parameters, and manufacturing information.) Depending on the size of DIMM's installed, memory might not be contiguous; each socket is allocated 64 MB of address space, and will alias within that 64 MB space if a smaller DIMM is used. Alternatively one 128 MB DIMM is supported, in one socket only.

2.2 Ring Translated Memory

The pointer rings associated with various units are simply a region of memory which is accessed through a translation unit. The translation unit implements the rings as a base register (which is used to assign an arbitrary memory location to be used for the rings) plus a set of index registers which each point to an array entry relative to the base address. Reads and writes to the address associated with a particular index register actually access memory at the ring entry pointed to by that index register; that is, such accesses are indirect. Some index registers are automatically incremented after an access (for atomic enqueue and dequeue operations), issued by leading producers or end consumers while others are incremented specifically by their owner (generally an interim consumer-producer) to indicate that the referenced buffer has been processed and is now available for the next consumer down the chain. Pairs of pointers have a producer-consumer relationship, and a difference between them indicates to the consumer that there is work to do; that difference is detected in hardware and is signaled to the appropriate unit.

There are 15 rings in the preferred embodiment, each 4 KB in size (1K entries of 4 bytes each); the 60 KB array of 15 rings resides on a 64 KB boundary in memory. The base of this array is pointed to by the Ring Base Register. The rings themselves are not accessed directly; instead they appear to the users as a set of "registers" which are read or written to access the entries in memory that are pointed to by the associated index register. For addressing purposes each ring is assigned a number, which is used as an index both into the array in memory and into the Ring Translation Unit (RTU) register map.

Writes to a ring will cause the data (which is generally a buffer pointer, or in the case of the DMA Ring, a pointer to a DMA descriptor) to be stored at the location in memory pointed to by [(RingArray[Ring #])+(RTU index register used)], and then that index register is incremented modulo ring size. Reads from a ring will return the data (buffer pointer or descriptor pointer) pointed to by [(RingArray[Ring #])+(RTU index register used)]; if that register is an auto-increment register then it will increment modulo ring size after the read operation. A read attempted via a consumer index register which matches its corresponding produce pointer (that is, there was no work to do) will return zero and the index pointer will not increment. Registers which are not auto-increment are incremented explicitly by that register's owner when the referenced buffer has been processed; the increment is done via a hardware signal, not by register access.

Ring underflow/overflow and near-empty/near-full threshold status (as appropriate) are reported through the CRISIS register to the PP and the AP.

II. Policy Engine

FIG. 3 shows a Policy Engine ASIC block diagram according to certain embodiments of the present invention.

The ASIC 290 contains an interface 206 to an external RISC microprocessor which is known as the Policy Processor 244. Internal to the RISC Processor Interface 206 are registers for all units in the ASIC 290 to signal status to the RISC Processor 244.

There is an interface 204 to a host PCI Bus 280 which is used for movement of data into and out of the memory 260, and is also used for external access to control registers throughout the ASIC 290. The DMA unit 210 is the Policy Engine 322's agent for master activity on the PCI bus 280 Transactions by DMA 210 are scheduled through the DMA Ring 418. The Memory Controller 240 receives memory access requests from all agents in the ASIC and translates them to transactions sent to the Synchronous DRAM Memory 260. Addresses issued to the Memory Controller 240 will be translated by the Ring Translation Unit 264 if address bit 27 is a '1', or will be used untranslated by the memory controller 240 to access memory 260 if address bit 27 is a '0'. Untranslated addresses are also examined by the Mailbox Unit 262 and if the address matches the memory address of one of the mailboxes the associated mailbox status bit is set if the transaction is a write, or cleared if the transaction is a read In addition to the dedicated rings in the Ring Translation Unit 264 which are described here, the Ring Translation Unit also implements 5 general-purpose communications rings COM[4:0] 226 which software can allocate as desired. The memory controller 240 also implements an interface to serial PROMs 270 for obtaining information about memory configuration, MAC addresses, board manufacturing information, Crypto Daughtercard identification and other information.

The ASIC contains two Fast Ethernet MACs MAC_A and MAC_B. Each contains a receive MAC 216 or 230, respectively, with associated control logic and an interface to the memory unit 220 or 228, respectively; and a transmit MAC 218 or 234 respectively with associated control logic and an interface to the memory unit 222 or 232, respectively. Also associated with each MAC is an RMON counter unit 224 or 236, respectively, which counts certain aspects of all packets received and transmitted in support of providing the Ethernet MIB as defined in Internet Engineering Task Force (IETF) standard RFC 1213 and related RFC's.

RX_A Ring 402 is used by RX MAC_A controller 220 to obtain empty buffers and to pass filled buffers to Classification Engine 238. Similarly RX_B Ring 404 is used by RX MAC_B controller 228 to obtain empty buffers and to pass filled buffers to Classification Engine 242. TX_A Ring 406 is used to schedule packets for transmission on TX MAC_A 218, and TX_B Ring 408 is used to schedule packets for transmission on TX MAC_B 234.

There are four Classification Engines 208, 212, 238, and 242 which are microprogrammed processors optimized for the predicate analysis associated with packet filtering. The classification engines are described in FIG. 13. Packets are scheduled for processing by these engines through the use of the Reclassify Rings 412, 416, 410, and 414 respectively, plus the RX MAC controllers MAC_A 220 and MAC_B 228 can schedule packets for processing by Classification Engines 238 and 242, respectively, through use of the RX Rings 402 and 404, respectively.

There is Crypto Processor Interface 202 which enables attachment of an encryption processor 246. The RISC Processor 244 can issue reads and writes to the Crypto Processor 246 through this interface, and the Crypto Processor 246 can access SDRAM 260 and control and status registers internal to the interface 202 through use of interface 202.

A Timestamp counter 214 is driven by a stable oscillator 292 and is used by the RX MAC logic 220 and 228, the TX MAC logic 222 and 232, the Classification Engines 208, 212, 238, and 242, the Crypto Processor 246, and the Policy Processor 244 to obtain timestamps during processing of packets.

Preferably, the Policy Engine Units have the following characteristics:

1. PCI Interface
    33 MHz operation.
    32/64-bit data path.
    32-bit addressing both as a target and as an initiator.
    Initiator and Target interface.
    One interrupt output.
    Up to 32-byte bursts as a master; up to 32-byte bursts to memory (BAR0) as a target (disconnects on 32-byte boundaries), single data-phase operations as a target for Register (BARI) and Ring Translation Unit (BAR2) spaces.
    Single configuration space for the entire device.
2. RISC Processor Interface
    Interface to external SA-110 StrongARM processor, running the bus at ASIC core clock or half core clock as programmed in the Processor Control and Status Register.
    Handles all transaction types for PIO's (reads and writes of I/O registers), cache fills/spills, and non-cached memory accesses.
    Low- and high-priority interrupt signals, driven by enabled bits of PISR and PCSR.
    Boots from main memory; an external agent must initialize memory, download local initialization code etc, and release processor reset to enable operation.
    Support for remap of the trap/reset vector to any location in PE Memory.
3. Classification Engine
    Microcoded engine for accelerating comparisons and hash lookups.
    Runs a set of comparisons on fields extracted from 32-bit words within a packet to offload processor.
    Operations can be on fields in the packet, or on pairs of result bits from previous comparisons.
    Produces a result vector of one bit result for each comparison or for each boolean operation on pairs of bits in the vector (selected bits of which are then stored in a data structure in the 2 KB packet buffer).
    Can also execute one or more hash lookups on one or more tables based on keys extracted from the packet. Optimized for linked list chasing through the use of non-blocking loads and speculative fetch of the next record; searches of hash tables implementing conflict resolution by chaining are thus accelerated. The hash lookup results are also stored in the packet buffer in memory.
    Arbitrary fields can be extracted from the packet and returned in the packet's data structure to the PP. Arbitrary computation on extracted fields and result vector bits which yield multi-bit results can also be done in the CE, and the results returned to the PP in the data structure.
    The above computations could also incorporate operands found in hash table records found during the above hash searches.
    The contents of hash table records found using keys extracted from the packet can be updated with results of computations such as those described above.
    Supports fast TCP/IP checksum calculation via use of the "split-add" unit.
    Decisions and branches are supported.
    Comparisons, extractions and computations, and hashing are run speculatively before the packet is handed to the Policy Processor; if the code on the PP (the Action section of the application) needs to run rules against the packet, the comparisons are done and ready for it to use, with single-bit decisions ("predicate analysis results") for each policy to apply. Similarly, if the Action code needs to compute or extract information about the packet, the results of that computation are already available in the packet's data structure.

Packets are scheduled for classification from both the RX MAC ring and a reclassification ring for the "Inbound" CEs, from a reclassification ring alone for "Outbound" CEs.

4. Ethernet MACs

Standard 10/100 Mbit EEE 802.3u-compliant MAC with MII interface to external PHY.

Each RX MAC has support for a single unicast address match, multicast hash filter, broadcast packets, and promiscuous mode.

Serial MII management interface to PHY.

RX MAC inserts packets along with receive status into 2 KB-aligned buffers, with the packet aligned so that the IP header is on a 32-bit boundary; keeping the receive buffer ring replenished with empty buffers is the only processor interaction with the MAC (i.e. there is no run-time device driver needed for the MAC).

Transmit MAC follows a ring of buffer pointers; scheduling of transmit buffers from any source is supported through a register which makes enqueuing atomic, thus allowing multiple masters to schedule transmits without mutexes.

Mode bit for PASS or DROP of bad ethernet packets (CRC errors etc).

Hardware counters to support RMON ETHER statistics gathering.

MACs operate on 2.5 MHZ/25 MHz RXCLK and TXCLK from the external Fast Ethernet PHY, each has its own clock domain and a synchronizing interface to the ASIC core.

5. Memory Controller

Manages up to two DIMMs of SDRAM.

Aggressively schedules two banks independently for high performance.

Arbitrates among many agents; priorities are:
1) MAC_A, MAC_B ping-pong (top prio); internal to each MAC, the TX and RX units arbitrate locally for the MAC's memory interface, with ping-pong priority
2) Round-robin priority among PP, CE_AI, CE_AO, CE_BI, CE_BO, DMA, PCI_Target, Crypto Supports different speed grades of SDRAM, programmable timing.

Parity generation and checking.

Serial Presence Detect (SPD) interface.

Contains the Ring Translation Unit for mapping Ring accesses to Memory addresses.

Contains the Mailbox address-matching and status unit.

6. DMA Engine

Can be used by PP, Crypto, and also by the host (Application Processor) and PCI peer devices.

Moves word-aligned bursts of data between SDRAM and PCIbus.

Data is transferred between memory and PCI in byte lane order, for endian-neutral transfers of byte streams. See "Endianness" in Section 8.

Each DMA is controlled by a 16-byte descriptor; the initiator first constructs a descriptor, then enqueues a pointer to that descriptor on the DMA Ring to schedule the transfer.

Atomic enqueueing is supported to eliminate locks when scheduling DMAs.

At completion of each DMA, the unit can optionally set one of 8 status bits in the PISR (Processor Interrupt Status Register) or one of 8 status bits in the HISR (Host Interrupt Status Register), as indicated in the descriptor.

DMA engine ignores lower 11 bits of the SDRAM address, using a separate "buffer offset" instead. This is to support the buffer tag field in the buffer pointer used by software.

Descriptor is defined in "DMA Command Queue and Descriptors" in Section 6.

PCI command code is carried in the descriptor for flexibility.

7. Crypto Control

PE ASIC hosts a 32-bit PCI bus for connecting to the Crypto coprocessor(s), with two external request/grant pairs and two interrupt inputs. PP can directly access devices on this bus.

4 BAR's ("Base Address Registers", which are part of the PCI standard) are supported: BAR0 for Memory, BAR1 for access to the ring status bits, BAR2 for access to the rings, and BAR3 for prefetched access to Memory.

Packets are scheduled for encryption by placing a Crypto descriptor in a data structure in the packet buffer in memory, then enqueueing the pointer to that buffer in the Crypto Ring. (Communication Ring 4 is also available for similar use with a second coprocessor.)

The Crypto chip will detect queue-not-empty by polling the CSTAT (Crypto Status Register) register and will dequeue the buffer pointer at the head of the queue for processing. Two rings are available so that up to two devices can be supported for this function After processing a packet, the Crypto chip will write the results back to memory and then enqueue the buffer pointer on the specified destination ring (for further classification, for examination on the PP, for DMA to a target on the PCI bus, or for transmit.)

8. Mailbox Unit

Monitors 16 word-sized mailboxes in memory space.

On address match, sets (clears) the status bit in the Mailbox Status Register associated with the word written (read). Selected status bits contribute to a Mailbox Attention status bit in the PISR.

9. Ring Translation Unit

Base pointer to a 64 KB region of memory (only the first 60 KB are used, 4 KB remainder is available for other use).

Maintains 15 rings as memory arrays of 1K 32-bit entries each.

Reads and writes to rings through the RTU are mapped to locations in these arrays.

Some index registers auto-increment, others are incremented by their owner.

Delta between producer-consumer index pairs is detected in hardware. Any delta is signaled to the consumer indicating that there is work to do.

10 of the rings have specific assignment as shown in FIG. 3.

5 general-purpose rings COM[4:0] are provided for software to allocate as desired; expected use includes a freelist for DMA descriptors and a freelist of buffers for the AP or peers to use, messages-in to the PP, and others. COM4 can optionally be used as a second Crypto ring.

Overflow/underflow and threshold conditions are detected and reported through the CRISIS register in the Policy Processor interface 10. Global TIMER 32-bit up-counter driven from an external, asynchronous clock source.

Counts at 1 uS in bit 3 (leaving room for finer granularity in future higher speed implementations.) Counter rolls over approximately every 536.87 seconds.

Status bit in PISR/HISR sets on every transition (high-low and low-high) in bit[30] to simplify software extension of the timer value.

An Ethernet crystal (buffered copy) is used as the clock source since it is the most stable timebase available. Runs at 25 MHz.

In multi-PE implementations, all PE's receive the same clock source to avoid relative drift in timestamps. In systems using multiple PCI cards each containing a PE they each receive a local, non-aligned clock.

Used by MACs, Classification Engines, and PP for marking events; used for monitoring performance and packet arrival order as needed.

11. Serial PROM

Support for a 24C02 256-byte serial PROM at serial address 0x7; the memory DIMMs are at addresses 0x0 and 0x1 for slots 0 and 1 (if supported).

PROM at 0x7 contains two MAC addresses, full/half-speed control indication for the processor bus, manufacturing information, and other configuration and tracking information.

Additional devices on the SPD bus include a Crypto Daughtercard IDPROM at address 0x6, and a thermal sensor at address 0x4.

III. Data Structures

1. Ring Array in Memory

The 15 rings are packed into a 60 KB array aligned on a 64 KB boundary in memory. The RING_BASE register points to the start of this array. Each ring is 4 KB in size and can hold up to 1K entries of 32 bits each.

FIG. 5 illustrates a ring array in memory.

The Ring Translation Unit (RTU) 264 manages 15 arrays in memory 260 for communication purposes. Each ring actually consists of 1024 32-bit entries in memory for a total of 4 KB per ring, along with index registers and logic for detecting differences between the index register for a producer and the index register for the associated consumer, which is reported to that consumer as an indication that there is work for it to do. Various near-full-threshold, near-empty-threshold, full, and empty conditions are detected as appropriate to each ring and are reported to the ring users and to the Policy Processor 244 as appropriate. The RTU 264 translates Ring accesses into both a memory 260 access at a translated address, and in some cases into commands to increment specific index pointers after completing that memory access. Each ring is assigned a number for mapping purposes, and that number is used to index into the array of memory 260 in which the rings are implemented. The index registers are incremented modulo 4 KB so that FIFO behavior is achieved. Each index register contains one more significant bit than is used for addressing, so that a full ring can be differentiated from an empty ring.

A Ring Base Register 400 selects the location in memory 260 of the base of the 64 KB-aligned array 440 represented in FIG. 5. The structure is an array of arrays; there is an array of 15 rings indexed by the ring number, and each of those rings is a 4 KB array of 1024 32-bit entries indexed by various index registers used by different agents.

RX_A Ring 402 and RX_B Ring 404 implement the structure described in FIG. 6, and are associated with the receive streams from RX MAC_A 220 and RX MAC_B 228 respectively. TX_A Ring 406 and TX_B Ring 408 implement the structure of FIG. 8, and are associated with the transmit MACs 222 and 232 respectively. The Reclassify Rings 410, 412, 414, and 416 are used to schedule packets for classification on Classification Engines 238, 208, 242, and 212 respectively, and implement the structure shown in FIG. 10.

Figure 11:
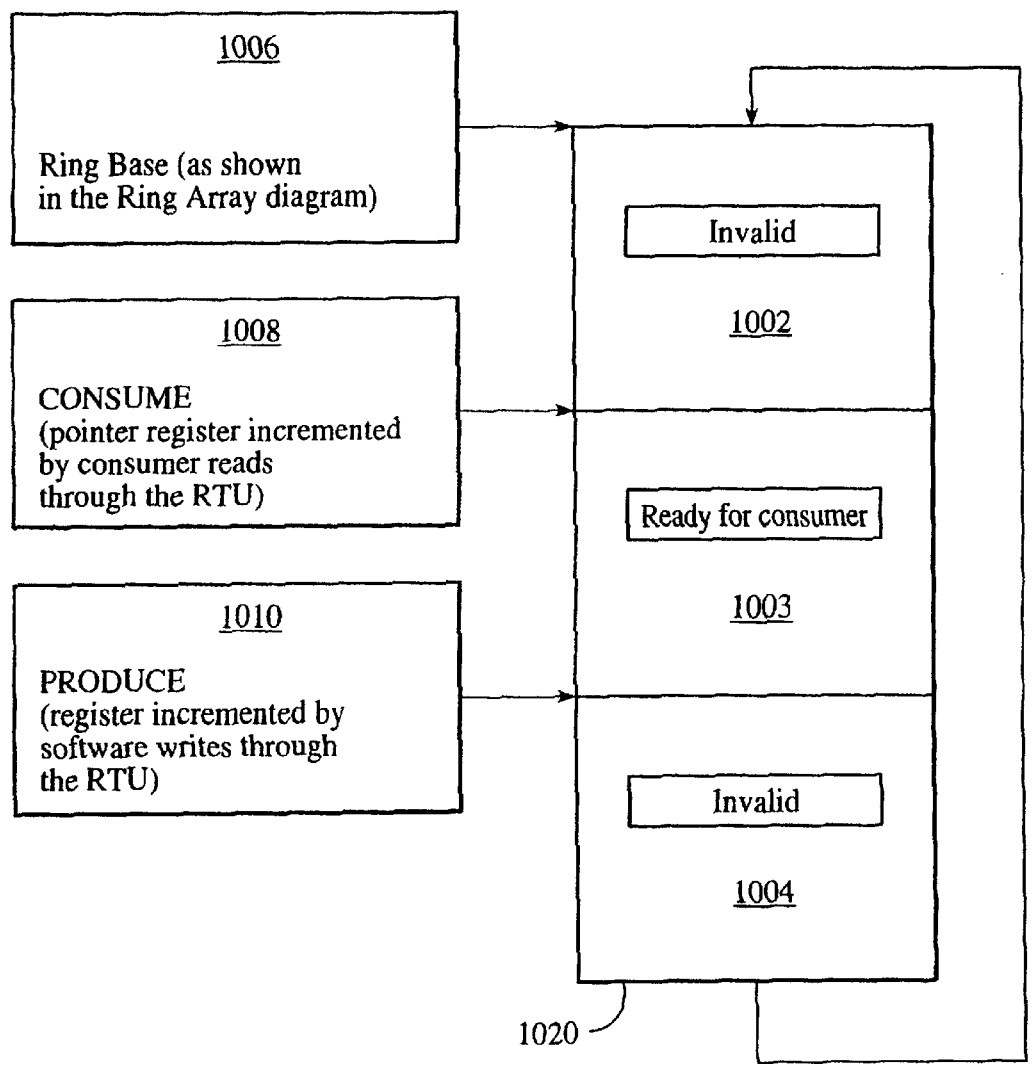
FIG. 11 shows a Crypto Ring and COM[4:0] Rings Structure related to the present invention.
Figure 12:
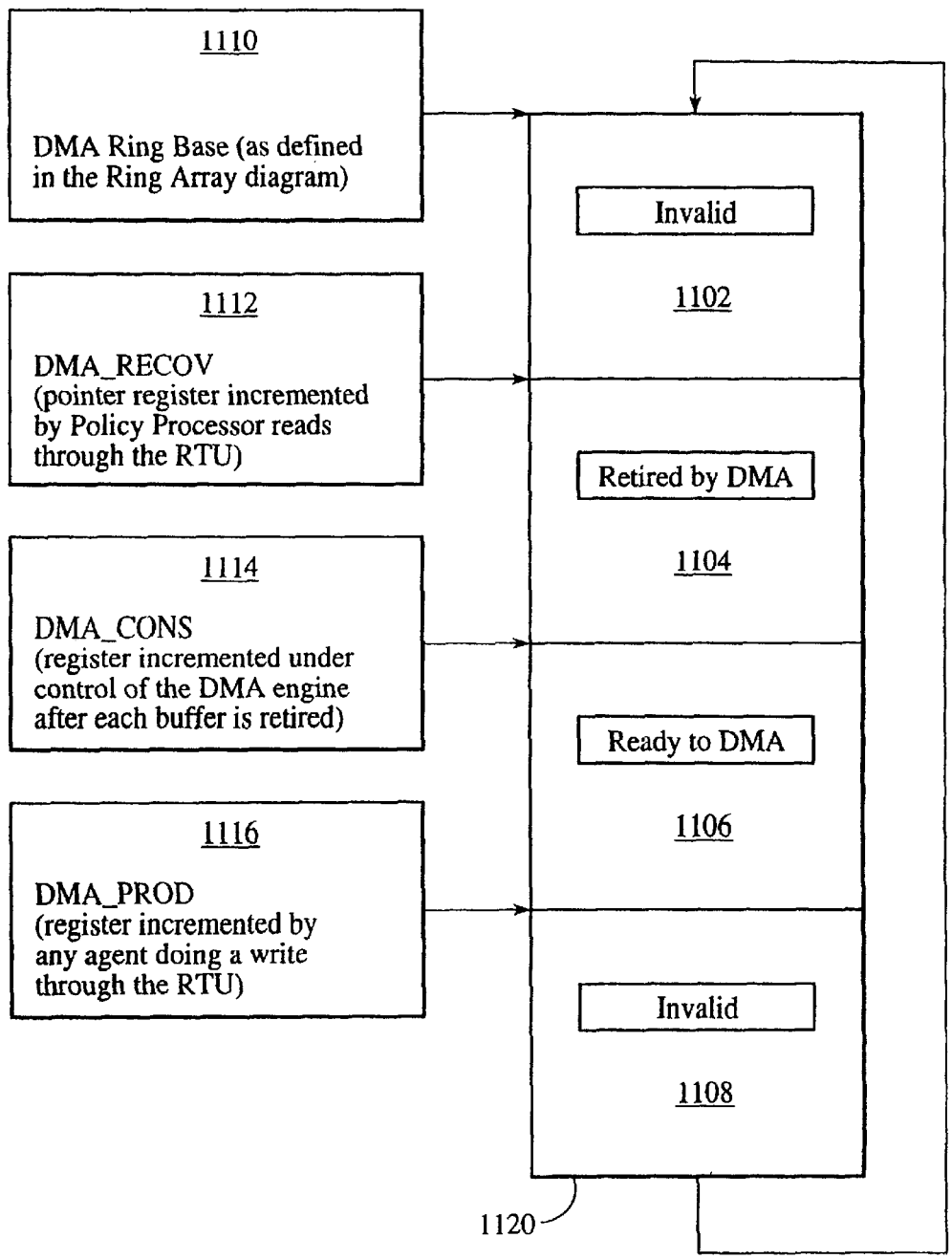
FIG. 12 shows a DMA Ring Structure related to the present invention.

DMA Ring 418 is used to schedule descriptor pointers for consumption by DMA Unit 210, and implements the structure shown in FIG. 12. Crypto Ring 420 is used to schedule buffers for processing on the Crypto Processor 246 and implements the structure shown in FIG. 11. The five general purpose communication rings CCM[4:0] are available for assignment by software and also implement the structure shown in FIG. 11.

2. RX Buffer Pointer Ring and Produce/Consume Pointers

A ring of buffer pointers resides in the memory for each RX MAC. Associated with this ring are produce and consume index pointers for the various users of these buffers to access specific rings. The Policy Processor allocates free, empty buffers to the MAC by writing them to the associated MPROD address in the Ring Translation Unit (RTU), which writes the buffer address into the ring and increments the MPROD pointer modulo ring size. The RX MAC chases that pointer with the MFILL index which is used to find the next available empty buffer. That pointer is chased by MCCONS which is used by the Classification Engine to identify the next packet to run the classification microcode on. The PP uses a status bit in the PISR to see that there is at least one classified packet to process, then reads the ring through MPCONS in the RTU to identify the next buffer that the PP needs to process.

FIG. 6 shows an RX Ring Structure related to certain embodiments of the present invention. There are two RX Rings 402 and 404. Each is located in the Ring Array in memory 260. Each has four index registers associated with it. FIG. 6 shows the ring as an array in memory with lower addresses to the top and higher addresses to the bottom of the picture.

The ring's base address 510 is a combination of the Ring Base Register 400 and the ring number which is used to index into the Ring Array 440 as shown in FIG. 5. Two instances of the set of four index registers MPCONS 512, MCCONS 514, MFILL 516, and MPROD 518 are used to provide an offset from the RX Ring Base 510 of the particular ring 402 or 404, each of which is a 4 KB array 520.

MPROD 518 is the lead producer index for this ring. The Policy Processor 244 or the Application Processor 302 enqueues buffer pointers into the RX Ring 402 or 404 by writing the buffer pointer to the RTU's enqueue address for the particular ring 402 or 404, which causes the RTU to write the buffer pointer to the location in memory 260 referenced by MPROD 518, and then to increment MPROD 518 modulo the ring size of 4096 bytes. This process allocates an empty buffer to the RX MAC MAC_A or MAC_B associated with ring 402 or 404 respectively.

MPROD 518 and MFILL 516 have a producer-consumer relationship. Any time there is a difference between the value of MPROD 518 and MFILL 516, the RTU 264 signals to the associated RX MAC MAC_A or MAC_B that it has empty buffers available. The region 506 in the RX Ring 402 or 404 represents one or more valid, empty buffers that have been allocated to the associated RX MAC by enqueueing the pointers to those buffers.

When the RX MAC MAC_A or MAC_B receives a packet, it obtains the buffer pointer referenced by its associated MFILL pointer 516 by reading from the RTU's MFILL address and then writes the packet and associated RX Status 600 and RX Timestamp 602 into the buffer pointed to by that buffer pointer. When the RX_MAC has successfully received a packet and has finished transferring it into the buffer, it increments the index MFILL 516 by a hardware signal to the RTU which causes the RTU to increment MFILL 516 modulo the ring size of 4096 bytes. MFILL 516 and MCCONS 514 have a producer-consumer relationship; when the RTU 264 detects a difference between the value of MFILL 516 and MCCONS 514 it signals to that ring's associated Classification Engine 238 or 242 that it has a freshly received packet to process. The region 504 in the ring array contains the buffer pointers to one or more full, unclassified buffers that the RX MAC has passed to the associated Classification Engine.

The Classification Engine 238 or 242 receives a signal if the RTU 264 detects full, unclassified packets in RX Ring 402 or 404, respectively. When the dispatch microcode on that CE 238 or 242 tests the ring status and sees this signal from the RTU 264, that CE 238 or 242 obtains the buffer pointer by reading from the RTU's MCCONS address for that ring. When the CE 238 or 242 has finished processing that buffer and has written all results back to memory 260, it signals to the RTU 264 to increment its associated MCCONS index 514. Upon receiving this signal the RTU 264 increments MCCONS 514 modulo the ring size of 4096 bytes. By sending the signal, the CE 238 or 242 has indicated that it is done processing that packet and that the packet is available for the consumer, which is action code 108 running on the Policy Processor 244. The region 502 contains the buffer pointers for one or more full, classified packets that the Classification Engine has passed to the Action Code 108.

MCCONS 514 and MPCONS 512 have a producer-consumer relationship. When the CE 238 or 242 has produced a full, classified packet then that packet is available for consumption by the action code 108. The RTU detects when there is a difference between the values of MCCONS 514 and MPCONS 512 and signals this to the Policy Processor 244 through a status register in the Processor Interface 206. The Policy Processor 224 monitors this register, and when dispatch code on the Policy Processor 224 determines that it is ready to process a full, classified packet it dequeues the buffer pointer of that packet from the RX Ring 402 or 404, as appropriate, by reading the RTU's dequeue address for that ring. This read causes the RTU to return to the Policy Processor 244 the buffer pointer referenced by that ring's MPCONS index 512, and then to increment MPCONS 512 modulo the ring size of 4096 bytes. The act of dequeueing the buffer pointer means that the pointer no longer has any meaning in the RX ring. The contents of the ring in locations between MPCONS 512 and MPROD 518 have no meaning, and are indicated by the Invalid regions 500 and 508. Since this is a ring structure which wraps, 500 and 508 are actually the same region; in the figure shown, due the current values of the ring index pointers 512, 514, 516, and 518 the Invalid regions 500 and 508 happens to wrap across the start and end of the array containing this ring, but it should be obvious to one skilled in the art that under normal circumstances these ring index pointers can have different values and any of regions 502, 504, or 506 could also be region which wraps around the end and beginning of the array 520.

2.1 RX Buffer Structure

Figure 8:
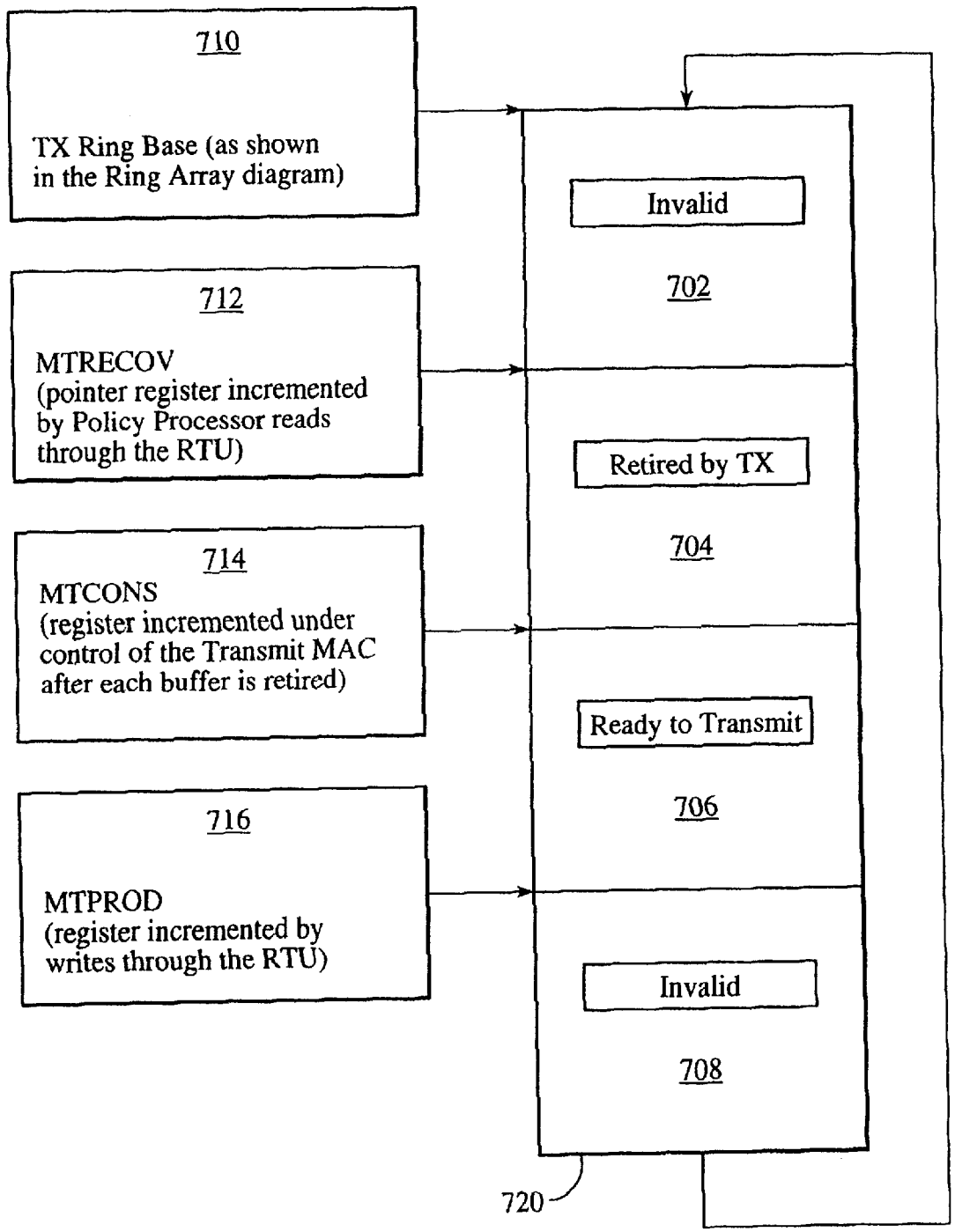
FIG. 8 shows a TX Ring Structure related to the present invention.

The receive data buffer is a 2 KB structure which contains an Ethernet packet and information about that packet. A substantially similar format is used for transmitting the packet, as indicated in FIG. 8. The packet offset from the base of the buffer is designed so that upon receive the Ether header is offset by two bytes into a word, thus aligning the IP header on a word (32-bit) boundary. Enough space is left before the packet so that encapsulation/encryption headers (e.g., up to 40 bytes for a standard IPv6 header plus AH and ESP) can be inserted for encapsulation of the packet without copying the packet, by just copying the Ethernet header up to make space and then inserting the encapsulation headers. The total pad size is 112 Bytes; if more is needed then the Crypto Coprocessor can realign the packet when writing it back.

The RX MAC can be programmed to either drop bad packets or receive them normally; if the latter, then error status is also shown in the buffer RX status field.

FIG. 7 illustrates the receive buffer format.

A packet is passed around the system by placing it into a packet buffer 620 and then passing the 2 KB-aligned buffer pointer among units via pointer rings implemented by the RTU 264. The RX Status and Transmit Command Word 600 is always located at the word pointed to by the 2 KB-aligned buffer pointer. All hardware in the Policy Engine 322 is designed to assume that a buffer pointer is 2 KB-aligned and to ignore bits [10:0], which allows software to use bits [10:0] of the buffer pointer to carry software tag information associated with that buffer.

Upon receiving a packet the RX MAC 220 or 228 places that packet at an offset of (130) bytes from the beginning of a buffer 620, and writes zero to the bytes at byte offset (128) and (129) from the beginning of that buffer; these two bytes are called the Ethernet Header Pad 618. The packet consists of the (14)-byte Ethernet header 610 and the payload 612 of the Ethernet packet, which are stored contiguously in the buffer 620. The reason for inserting the Ethernet Header Pad is to force protocol headers encapsulated in the Ethernet packet to be word (32-bit) aligned for ease in further processing; encapsulated protocols such as IP, TCP, UDP etc have word-oriented formats.

The RX MAC control logic 220 or 228 then writes the RX Status Word 600 into the buffer 620 at an offset of (0) from the start of the buffer, and an RX Timestamp 602 as a 32-bit word at byte offset (4) from the start of the buffer 620. The RX Status Word has the format shown in Table 1 The timestamp is the value obtained from the Timestamp Register 214 at the time the RX status 600 is written to the buffer 620. The TX Status Word 604 and the TX Timestamp 606 are not written at this time, but those locations covering the two 32-bit words at offsets of 8 and 12 bytes, respectively, from the start of the buffer 620 are reserved for later use by the TX MAC controllers 222 and 232.

The format for the RX Status word in Table 1 is such that it can be used directly as a TX Command Word without modification; the fields LENGTH and PKT_OFFSET have the same meaning in both formats. The RX MAC controller 220 or 228 subtracts (4) bytes from the Ethernet packet's length before storing the LENGTH field in the RX Status Word 600 such that the (4-byte) Ethernet CRC is not counted in LENGTH, so that the buffer can be handed to a TX MAC 222 or 232 without need for the Policy Processor 244 modifying the contents of the buffer.

Pad Space 608 is left before the start of the packet 610 and 612 in buffer 620 to support the addition of encapsulating protocol headers without copying the entire packet. Up to (112) bytes of encapsulation header(s) can be inserted simply by copying the ethernet header 610 (and possibly an associated SNAP encapsulation header in the start of payload 612) upwards into the Pad Space 608 by the number of bytes necessary to make room for the inserted headers, which are then written into the location that was opened up for them in areas 608, 610, and 612 as needed. If more than (112) bytes of encapsulation header are being inserted then the entire payload 612 must be copied to a different location in the buffer to make room for the inserted headers.

The per-packet software data structure 614 is used by the classification 106, action code 108, encryption processing 112, the host 302 and PCI peers 322, 314, and 316 to carry information about the packet that is carried in the buffer 620. The location of the software data structure 614 and the sizes of the packet header 610 and packet payload 612, as well as the total size of the packet buffer 620 are not hard limits in the preferred embodiment. The 2 KB-alignment of the RX status word 600 and RX Timestamp are enforced by the hardware; but packets from other sources and also from other media besides Ethernet can be injected into the classification flow of FIG. 2 as follows. The SOURCE field of the RX status word 600 as shown in Table 1 has only a few reserved codes; the rest can be assigned by software to at a fixed location relative to the RX Status Word 600, rather than having that location be a variable depending on different media and the resulting variations in the size of the packet payload 612.

The section marked "Available for software use" contains transient per-packet information such as the result vector and hash pointers output by the Classification Engine, a command descriptor for the Crypto Unit, buffer reference counts, an optional pointer to an extension buffer, and any other data structures that the software defines. "TX Status/ TX Timestamp" is optionally written by the transmit MAC if it is programmed to do so; that field contains garbage after an RX.

The "RX Timestamp" field contains the 32-bit value of the chip's TIMER register at the time that the packet was successfully received (approximately the time of receipt of the end of packet) and the RX_STATUS field was written. The "RX Status" field is one 32-bit word with the following format:

Note throughout this document that bit [31] is the left (most significant) bit of a 32-bit word, and bit [0] is right (least significant). "MCSR" mentioned in Table 1, below, is the MAC Control and Status Register.

TABLE 1

Ethernet RX Status Word and TX Command Word Format

| Bits | Field | Description |
| --- | --- | --- |
| [31] | BAD_PKT | Summary error bit; set if any of [30:27, 15:14] is set, which can only happen if the MAC is programmed to receive bad frames. |
| [30] | CRC_ERR | Ethernet frame had incorrect CRC and (MCSR[RCV_BAD]==1) for this MAC. |
| [29] | RUNT | Ethernet frame was smaller than legal and (MCSR[RCV_BAD]==1) for this MAC |
| [28] | GIANT | Ethernet frame was larger than legal and (MCSR[RCV_BAD]==1) for this MAC |
| [27] | PREAMB_ERR | Invalid preamble and (MCSR[RCV_BAD]==1) for this MAC. This error is associated with some previous event, not with the current packet. |
| [26:16] | LENGTH | For RX, number of bytes in the Ethernet frame including the Ethernet header but not including the Ethernet CRC. For TX, length of packet, including CRC if (MCSR[CRC_EN]==0) |
| [15] | DRBL_ERR | Odd number of nibbles received (dribble) and (MCSR[RCV_BAD]==1) for this MAC |
| [14] | CODE_ERR | 4b/5b encoding error and (MCSR[RCV_BAD]==1) for this MAC |
| [13] | BCAST | The received packet was a broadcast packet (destination address is all 1's) |
| [12] | MCAST | The received packet was a multicast packet and was passed by the multicast hash filter |
| [11:08] | SOURCE | This indicates the source of the packet or other source as marked later by software. If the packet was generated at a RX MAC then this field is 0x0 for MAC_A or 0x1 for MAC_B. |
| [07:00] | PKT_OFFSET | This is the byte offset from the beginning of the buffer to the first byte of the Ethernet header. Other agents may choose to move this offset in order to encapsulate the IP packet or to strip of encapsulation headers. The CE, PP, and AP all use this offset when accessing the frame in this buffer. The RX MAC will always write a value of 0x82 into this field, indicating that the Ethernet Frame was received into the buffer starting at byte offset 130 from the start of the buffer. | identify packets from other sources and also from other media which do not share the packet format or packet size of Ethernet. By software convention larger buffers can be assigned by grouping contiguous 2 KB buffers together and treating them as one buffer; the pointer to this larger buffer 602 will still be 2 KB-aligned and the RX Status Word 600 and RX Timestamp 602 will still reside at that location in the buffer. The packet area 610 and 612 can be made arbitrarily large to accommodate a packet from a different medium. The location of the software data structure 614 can be moved downwards as the larger payload space is allocated. Alternatively the software can choose to allocate buffers so that they have space before the 2 KB-aligned RX Status Word 600, and carry the software data structure 614 above the RX Status Word 600 rather than below the Payload 612 as shown in FIG. 7. The advantage of this second approach is that the location of the software data structure is always known to be The same packet buffer format is used for encryption and transmission; for those uses the only meaningful fields are LENGTH, PKT_OFFSET and the contents of the Ethernet frame found at that offset; plus for encryption the encryption descriptor included in the "Software" area in the buffer.

3. TX Buffer Pointer Rings and Producer/Consumer Pointers

A packet gets scheduled for transmission by enqueueing the address of the buffer onto the pointer queue for that transmit MAC, by writing it to MTPROD in the RTU (MAC A and MAC B each have their own ring and associated registers). Any time the produce pointer is not equal to the consume pointer for that ring, the associated MAC will be notified that there is at least one packet to transmit and will follow the pointer to obtain the next buffer to deal with. When the packet has been retired the TX controller will write back status if configured to do so, then increment the consume pointer and continue to the next buffer (if any.)

The recover pointer is used to track retired buffers (either successfully transmitted or abandoned due to transmit termination conditions) for return to the buffer pool, or possibly for a retransmit attempt; the PP is signaled by the RTU that there is a delta between MTCONS and MTRECOV, and then reads the Ring through the RTU register MTRECOV to get the pointer to the next buffer to recover. MTPROD, MTCONS, and MTRECOV are duplicated for each instance of a transmit MAC.

FIG. 8 illustrates the TX Ring Structure according to certain embodiments of the present invention.

The TX Rings 406 and 408 have substantially the same structure as the RX Rings described previously. The fundamental differences are that there is one fewer interim producer-consumer using this ring, and that this ring is assigned for a different function with different agents using it. Each ring 406 and 408 is a 4096-byte array 720 in memory 260.

A packet is scheduled for transmit on the TX MACs 222 or 232 by enqueuing a pointer to the buffer containing the packet onto TX Ring 406 or 408, respectively The buffer pointer is enqueued onto 406 or 408 by any agent, by writing the buffer pointer to the RTU 264 enqueue address for that ring. The RTU 264 writes the buffer pointer to the location in memory 260 referenced by the MTPROD index register 716, and then increments MTPROD 716 modulo the ring size of 4096 bytes. There is a producer-consumer relationship between MTPROD 716 and MTCONS 714; when the RTU detects a difference in the values of MTPROD 716 and MTCONS 714 it signals to the associated TX MAC controller 222 or 232 that there is a packet ready to transmit. The region 706 in the TX Ring 406 or 408 contains one or more buffer pointers for the buffers containing packets scheduled for transmission.

The TX MAC controller 222 or 232 obtains the buffer pointer for the buffer 206 containing this packet by reading the RTU's MTCONS address for TX Ring 406 or 408, respectively, which causes the RTU to return to the MAC the buffer pointer in memory 260 referenced by MTCONS 714. When the TX MAC 218 or 234 has successfully transmitted this packet or has abandoned transmitting this packet due to transmit termination conditions, its controller 222 or 232 respectively will optionally write back TX Status 806 and TX Timestamp 808 if it has been configured to write status, then retires the buffer by signaling to the RTU 264 to increment MTCONS 714. Upon receiving this signal the RTU 264 will increment MTCONS 714 modulo the ring size of 4096 bytes.

Index registers MTCONS 714 and MTRECOV 712 have a producer-consumer relationship When the RTU detects a difference in their values, it signals to the PP that the associated TX ring 406 or 408 has a retired buffer to recover. That information is visible to the Policy Processor 244 in a status register in Processor Interface 206 which the Policy Processor 244 polls on occasion to see what work it needs to dispatch. Upon testing the RECOVER status for the TX Ring 406 or 408 and detecting that there is at least one buffer to recover, the Buffer Recovery code 118 reads the RTU's 264 MTRECOV address for that ring to dequeue the buffer pointer from the TX ring 406 or 408. The read causes the RTU to return the buffer pointer referenced by MTRECOV 712, and then to increment MTRECOV 712 modulo the ring size of 4096 bytes. The region 704 contains the buffer pointers of buffers which have been retired by the TX MAC 222 or 232 but have not yet been recovered by the Buffer Recovery code 118.

The regions 702 and 708 are the same region, which in the figure shown are spanning the end and the beginning of the array 720 in memory 260 which contains the TX Ring 406 or 408. This region contains entries which are neither a buffer pointer to a buffer ready for transmit, nor a buffer pointer to a buffer which the TX MAC 222 or 232 has retired but the recovery code 118 CRC, and the data in 816 is sent with the packet for use as the packet's CRC. This configuration which uses software-generated Ethernet CRC is provided primarily as a diagnostic tool for sending bad packets to other devices on the network.

Upon completion or abandonment of a transmit, the TX MAC will write back the TX Status Word 806 and the TX Timestamp 808 if it is so configured. The TX Status Word 806 contains the information and format shown in Table 2. The TX Timestamp 808 is written with the value of the Timestamp Register 214 at the time the write to TX Timestamp 808 is initiated.

The software data structure 820 which travels in the packet buffer 840 along with the packet is the same one 614 discussed in the description of an RX buffer 620 as shown in FIG. 7, and may be relocated by software convention as described in the discussion of FIG. 7.

The transmit status word 806 contains a flag indicating if the transmission was successful, and the reason for failure if the transmit was abandoned. This field is written only if MCSR[TX_STAT] is set, otherwise the fields 806 and 808 contain uninitialized data.

TABLE 2

Ethernet TX Status Word

| Bits | Field | Description |
|---|---|---|
| [31] | TX_OK | Packet was successfully transmitted. |
| [30] | LATE_COL | Transmit abandoned due to a late collision. (only if (MCSR[LATE_COL_RTRY] = 0)) |
| [29] | XS_COL | Transmit abandoned due to excessive collisions (16 collisions) |
| [28] | XS_DEFER | Transmit abandoned due to excessive deferrals |
| [27] | UNDERFLOW | Transmit abandoned due to slow memory response times. |
| [26] | GIANT | Packet length was larger than legal |
| [25:22] | COL_CNT[3:0] | Number of collisions experienced (never shows more than 15; if XS_COL this value is 'x') |
| [21:11] | reserved | MAC writes 0 × 0 to this field. |
| [10:0] | TX_SIZE[10:0] | Number of bytes transmitted (includes the 4-byte Ethernet CRC) |

There are 5 possible transmit packet sources sharing the TX MAC; these are

The RISC processor (Policy Processor) generating or forwarding a packet has not yet dequeued. For the purposes of a TX Ring 406 or 408 this region consists of space into which more packets may be scheduled for transmit. One skilled in the art will recognized that region 704 or region 706 could just as easily be the region wrapping around the array boundary, depending on the values of MTRECOV 712, MTCONS 714, and MTPROD 716.

Embedded in the buffer is the packet length in bytes (including the Ethernet header, but not including the CRC since the TX MAC will generate that) and also the byte offset within the buffer where the Ethernet header begins. The offset is necessary since the start of packet might have been moved back (if adding encapsulation headers) or forward (if decapsulating a packet.) The Ethernet header typically starts at byte offset 0x2 within that word, but the TX MAC supports arbitrary byte alignment. PKT_OFFSET and LENGTH are found in the "RX Status" and "TX Command" word of the buffer as described in Table 1; for transmit purposes those are the only two meaningful fields in that word.

The area labeled "TX Status/TX Timestamp" is optionally written with one word of transmit status plus the value of TIMER at the time the field is written, if MCSR[TX_STAT] is set; the content of that word is described in Table 2.

Figure 9:
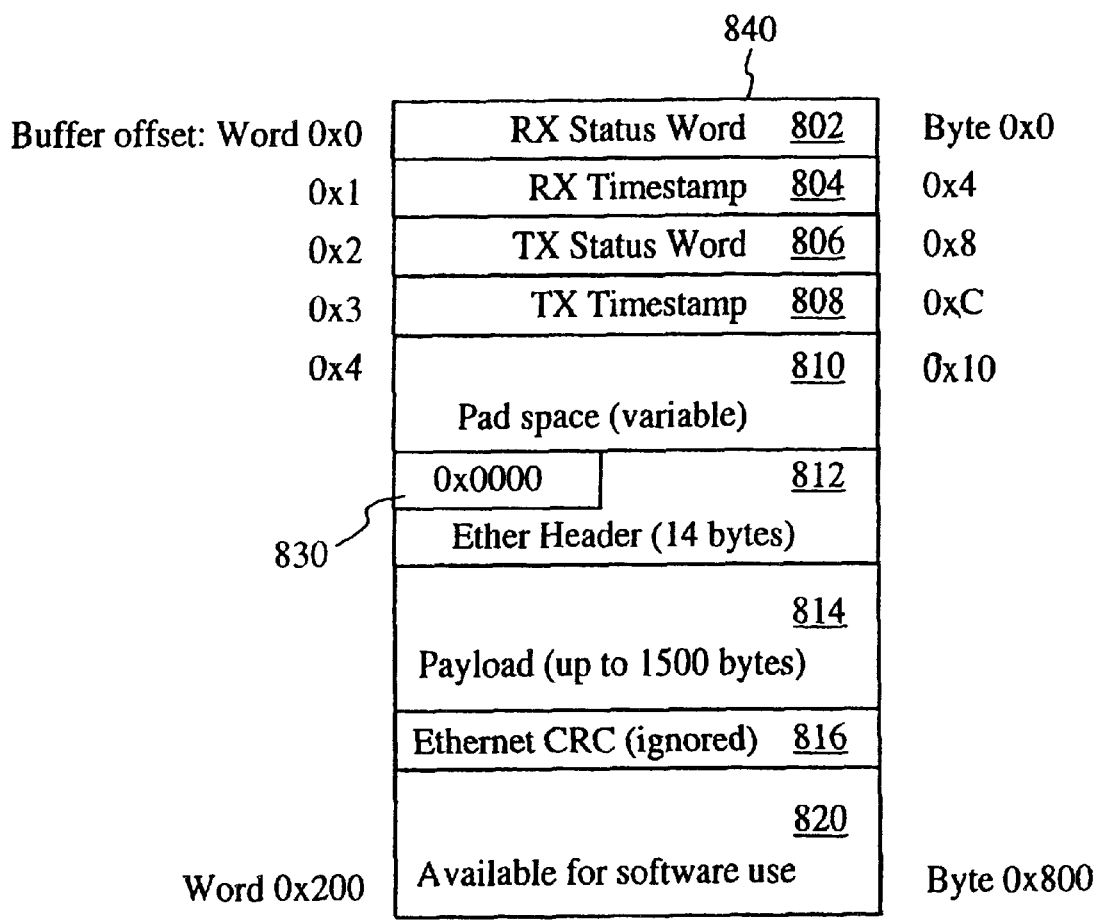
FIG. 9 shows a transmit buffer format related to the present invention.

FIG. 9 illustrates the transmit buffer format according to certain embodiments of the present invention.

When a packet is scheduled through TX Ring 406 or 408 to be transmitted on a TX MAC 218 or 234, respectively, the TX MAC controller 222 or 232, respectively, interprets the contents of the packet buffer 840 in accordance with the format shown in FIG. 9. The RX Status Word and TX Command Word 802 is found at the location pointed to by the 2 KB-aligned buffer pointer obtained from the TX Ring 406 or 408. The RX Status and TX Command Word 802 is in the format specified by Table 1; when this word is interpreted by the TX MAC controller 222 or 232 only the fields LENGTH and PKT_OFFSET have any meaning and the rest of the word is ignored. PKT_OFFSET indicates the byte offset from the start of the 2 KB-aligned buffer at which the first byte of the Ethernet header is to be found, and LENGTH is the number of bytes to be transmitted not including the (4-byte) Ethernet CRC which the TX MAC 222 or 232 will generate and append to the packet as it is being transmitted. The RX Timestamp 804 was used by previous agents processing this buffer, and is not interpreted by the TX MAC controller 222 or 232.

The PKT_OFFSET field can legitimately have any value between (16) and (255), allowing the agent that scheduled the transmit to manipulate headers and to relocate the start of the packet header 812 as needed. FIG. 9 shows a zero-filled two-byte pad 830 prior to the start of Ether Header 812, but that is not a requirement of the preferred embodiment; the TX MAC 222 or 232 can transmit a packet which starts at any arbitrary byte alignment in the transmit buffer 840. The two-byte pad 830 shown preceding the header 812 is shown to illustrate the common case, wherein a received packet was thus aligned and any movement of the ethernet header 812 for encapsulation or decapsulation of protocols is in units of words (4 bytes.) Pad Space 810 can vary in size from zero bytes to (240) bytes as defined by the value of PKT_OFFSET in the TX Command Word 802.

The concatenation of Ether Header 812 and Payload 814 comprise the packet that is transmitted, along with the generated Ethernet CRC which the TX MAC 222 or 232 appends during transmit. The Ethernet CRC field 816 is not normally used by the TX MAC 218 or 234, but was written there during receive by the RX MAC 220 or 228. Each TX MAC controller 222 and 232 has a configuration setting which can instruct it to not generate CRC as it transmits; in that case the LENGTH field in the TX Command Word 802 includes the four bytes of Ethernet Crypto generating a modified packet
  The AP either creating, forwarding, or modifying a packet
  A device in a PCI expansion slot creating, forwarding, or modifying a packet
  A peer PE forwarding a packet to a different network segment (e.g. for routing or switching)

Atomic enqueueing by multiple sources is supported via writes to RTU[MTPROD] associated with that MAC's Transmit Ring. The RTU can detect high-water-mark conditions and signal the situation to the PP and the AP. The MTCONS index pointer is incremented by the MAC whenever a buffer is retired; that is chased by another consume pointer incremented by reads of RTU[MTRECOV] which is used by the PP for recover of retired packet buffers to the buffer pool and (optionally) checking TX status.

4. Reclassify Rings

The Classification Engine receives packets to classify from both the RX MAC (via the RX Ring), and from other sources (PP, AP, Crypto, and potentially other network cards on the PCIbus). A second input ring (Reclassify Ring) is provided for each CE for these other sources to schedule a packet for classification on that CE; each comprises a ring in memory with enqueue and dequeue operations supported through the RTU. The 32-bit entries in the ring are buffer pointers.

Figure 10:
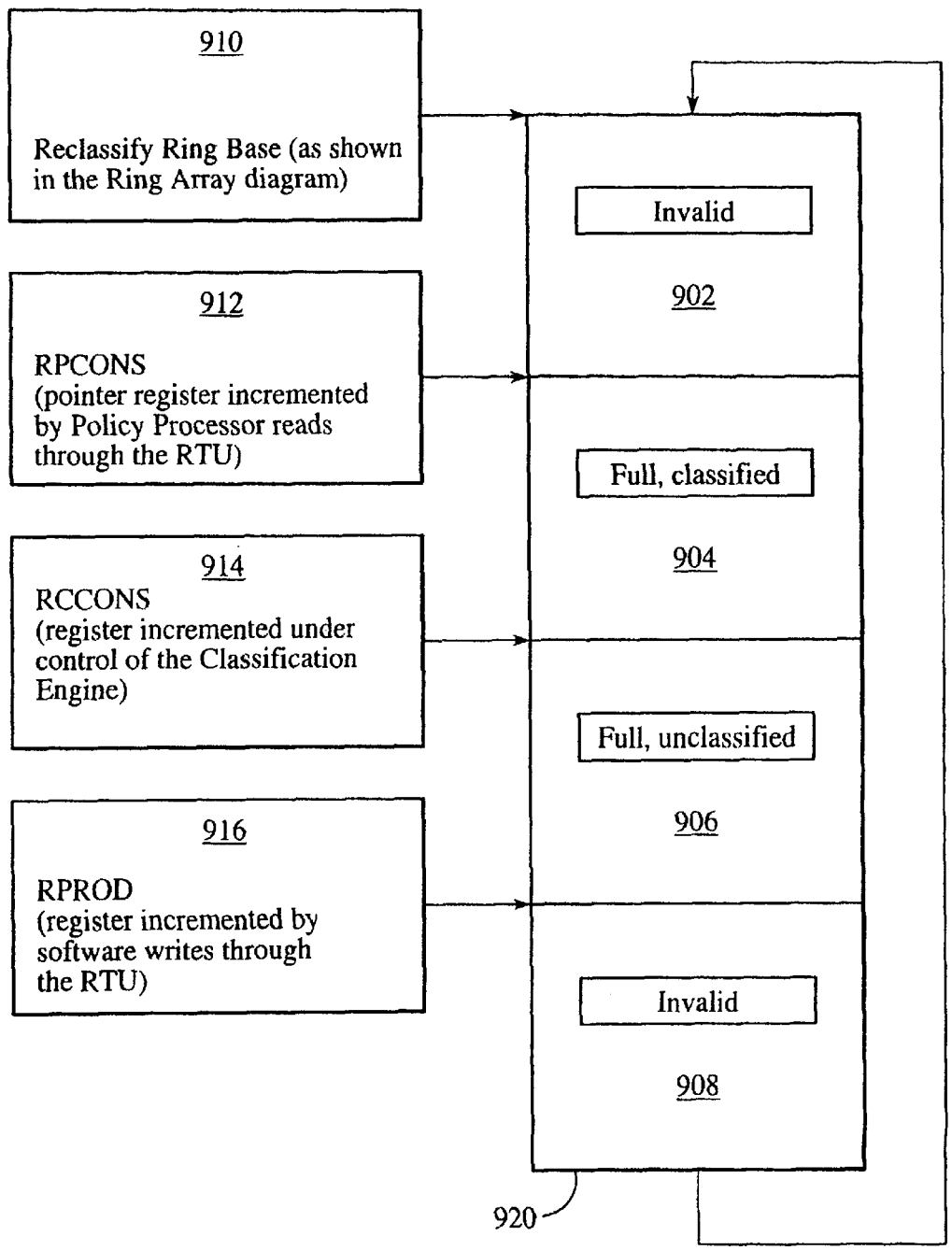
FIG. 10 shows a reclassify ring structure related to the present invention.

FIG. 10 shows the reclassify ring structure.

The Reclassify Rings 410, 412, 414, and 416 serve a very similar purpose to the RX Rings 402 and 404, and have substantially the same structure. The substantive differences are that there is one less interim consumer-producer in the Reclassify Rings, and that packets get scheduled through the Reclassify Rings via a different path. Reclassify Rings 410, 412, 414, and 416 are used to schedule packets for processing on CE 238, 208, 242, and 212 respectively.

In the case of the RX Ring 402 or 404, buffer pointers are enqueued by the Buffer Allocation process 102 running on the Policy Processor 244 using MPROD 518, which allocates the referenced buffers as free and empty for the RX MAC 220 or 228, respectively, to consume using MFILL 516 when receiving a packet and to produce a full, unclassified buffer to the CE 238 or 242, respectively. Packets scheduled for classification via the Reclassify Rings 410, 412, 414, and 416 come from a source other than the RX MAC's 220 or 228, as illustrated in FIG. 2. Full, unclassified buffers get scheduled onto one of the Reclassify Rings when an agent enqueues the buffer pointer onto the ring by writing the buffer pointer to the RTU's 264 enqueue address, which causes the RTU 264 to write the buffer pointer to the location in memory 260 referenced by RPROD 916 and then to increment RPROD 916 modulo the ring size of 4096 bytes.

From that point onward the description is substantially the same as the description of the RX Ring 402 and 404, except that RCCONS 914 is used in place of MCCONS 514, RPCONS 912 is used in place of MPCONS 512, the invalid region 902 and 908 substitutes for 500 and 508, Full and Classified 904 substitutes for 502, and Full Unclassified 906 replaces 504. Since this flow has no allocation of empty buffers there is no equivalent to MFILL 516 nor to Valid Empty 506.

Note that the "Outbound" classifiers 208 and 212 each have only a Reclassify Ring 412 and 416, respectively, but no RX Ring since they are not associated with an RX MAC.

5. Crypto Command Queue and General Purpose Communications Rings

In order to schedule buffers for processing by the external (and optional) encryption engine another memory-based ring containing buffer pointers is implemented, with enqueue and dequeue operations supported through the RTU for the Crypto unit to get the next buffer to process, plus a status bit indicating to Crypto that there is at least one packet buffer pointer in the ring to process. The information about what operations to perform, keys, etc. are embedded in a Crypto Command Descriptor in the software area of the buffer.

FIG. 11 shows the Crypto Ring and COM[4:0] Rings Structures.

The Crypto Ring 420, COM0 Ring 422, COM1 Ring 424, COM2 Ring 426, COM3 Ring 428, and COM4 Ring 430 are identical in structure. Any agent can enqueue a buffer pointer or, in the case of the COM Rings, any 32-bit datum, by writing to the RTU's 264 enqueue address associated with the particular ring. This causes the RTU to store the buffer pointer or 32-bit datum to the location in memory 260 referenced by the specified PRODUCE Pointer 1010 and then to increment PRODUCE 1010 modulo the ring size of 4096 bytes. There is a producer-consumer relationship between a particular ring's PRODUCE pointer 1010 and that ring's CONSUME pointer 1008. When the RTU detects a difference between the values of PRODUCE 1010 and CONSUME 1008 it signals to the consuming unit that there is at least one entry to be consumed.

The consumer dequeues a 32-bit entry from one of these rings by reading from the RTU's dequeue address associated with that particular ring; this causes the RTU to return the data at the address in memory 260 referenced by that CONSUME pointer 1008 and then to increment CONSUME 1008 modulo the ring size of 4096 bytes. As is illustrated here, the degenerate case of the multiple-producer, multiple-consumer ring structure described in FIGS. 6, 8, and 10 is a single-producer, single-consumer FIFO with fifo-not-empty status presented to the consumer. The COM rings 422, 424, 426, and 428 all report ring-not-empty status and (programmably per ring) either near-full or near-empty threshold status to the Policy Processor 244 through status registers in the processor interface 206. These rings can be assigned for any purpose; anticipated uses include a message-in ring for the Policy Processor 244, a ring for allocating buffers for use by remote agents, and a ring for allocating DMA descriptors for use by remote agents scheduling this Policy Engine's DMA Unit 210.

The Crypto Ring 420 reports ring-not-empty status to the Crypto Processor 246 through a status register in Crypto Interface 202. COM4 430 also reports ring-not-empty status through a similar location, so that COM4 430 can optionally be used to support scheduling packets for processing by a second Crypto Processor 246. The Crypto Processor Interface 202 has additional support for a second Crypto Processor 246, which might be added to provide either more bandwidth for encryption processing or additional functionality such as compression. Packets would be scheduled for processing on this second processor 246 by enqueueing their buffer pointers onto COM4 430. Alternatively, both the Crypto Ring 420 and COM4 430 can be used to schedule buffers for processing on the one Crypto processor 246.

The general purpose communication rings COM[4:0] 422, 424, 426, 428, and 430 are identical in structure to the Crypto Ring 420.

6 DMA Command Queue and Descriptors

The DMA engine also uses a ring unit with an Enqueue register for any agent to schedule DMA transfers (DMA_PROD), a Consume register for the DMA engine to get entries from the ring (DMA_CONS), and a Dequeue register for recovering retired descriptors (and the associated buffers) from the ring (DMA_RECOV).

The DMA engine is used to move data between the memory and the PCIbus; the source/target on PCI can be host (AP) memory or another PCI device. DMA operations are scheduled by creating a 16-byte descriptor in memory and then enqueueing the address of that descriptor in the DMA engine's command ring by writing it to DMA_PROD. The PP, the host, a PCI bus peer, and Crypto can atomically schedule use of this engine.

DMA is notified by the RTU when the Produce pointer is not equal to the Consume pointer and processes the next descriptor. When that descriptor is retired, DMA increments the Consume pointer; a delta between that and the Recover pointer causes the RTU to signal to the PP that there are DMA descriptors (and the associated buffer pointers) to recover.

TABLE 3

DMA Descriptor Format

| | |
|---|---|
| | PCI_Address [31:00] |
| | Flags [31:0] |
| S1[31:27] | Buf_Address [26:11]    S2[10:0](pointer tag field) |
| S3[15:11] | Buf_Start_Index [10:2]   0b00   Word_Count[15:0] |

The areas labeled "S2" and "S3" are available for software use. "S1" is reserved for future expansion of PE memory size.

Upon completion of a transfer, the DMA engine can optionally set a completion status bit in either the Host Interrupt Register or Processor Interrupt Status Register in case the initiating agent wants completion status of a transfer or group of transfers. 8 bits are provided in each so that transfers can be tagged as desired. This allows both AP and PP software to have up to 8 DMA completion events scheduled at one time for tracking when particular groups of transfers have completed, or for the PP to signal to the AP that information has been pushed up to a mailbox or communication ring in AP memory, or for similar signals from the AP to the PP.

The Packet Buffer Address field contains the packet buffer pointer in the same format that is used by all other agents in the Policy Engine; this means that bits [10:0] are ignored by hardware and might contain tag information. The actual memory word address is the concatenation of the 2 KB-aligned Packet_Buffer_Address[31:11] with Start_Index[10:2], with 00 in the lower two bits. Note that the Word_Count allows for a maximum DMA transfer of (64K-1 Words, or 256K-4 Bytes), in case there are transfers larger than normal packet buffer movement (e.g. moving down PP code or CE microcode).

The Flags word contains the following fields:

TABLE 3a

DMA Descriptor "Flags" Word

| Bits | Field | Descriptions |
|---|---|---|
| [31:21] | SOFT[10:0] | Available for software use. |
| [20] | TO_MEM | Direction: 1 == To Memory (From PCI), 0 == From Memory (To PCI) |
| [19:16] | PCI_CMD[3:0] | This is the PCI command code which is used on the PCI bus for these transactions; the most common codes will be 0x7 (Memory Write) and 0x6 (Memory Read) with some probability of also using 0xC (Memory Read Multiple) and 0xE (Memory Read Line) if the attached host uses them for prefetch directives. |

TABLE 3a-continued

DMA Descriptor "Flags" Word

| Bits | Field | Descriptions |
|---|---|---|
| [15:08] | SET_HISR[7:0] | Any bit that is set will set the corresponding status bit in the HISR upon retirement of this descriptor. If no bit is set, no status is sent to HISR. |
| [07:00] | SET_PISR[7:0] | Any bit that is set will set the corresponding status bit in the PISR upon retirement of this descriptor. If no bit is set, no status is sent to PISR. |

Since DMA descriptors are read from memory by the DMA engine, software must ensure either that the descriptors were non-cacheable by the processor, or that they are flushed from the PP cache prior to writing the descriptor's address to the DMA ring. For descriptors that are generated by the AP or by a PCI peer see "Endianness" in section 8 for details about descriptor endianness.

FIG. 12 shows the DMA Ring Structure.

The DMA Ring 418 is substantially the same as the TX Rings 406 and 408 as described in FIG. 8. There is a single enqueue index DMA_PROD 1116 used to schedule pointers on the ring 418 by any agent, and interim consumer-producer index DMA_CONS 1114 used by the DMA Unit 120 to consume newly scheduled descriptor pointers and to produce retired descriptor pointers, and a dequeue index DMA_RECOV 1112 used by the Policy Processor 244 to recover retired descriptors as well as the buffers associated with them using the buffer pointer embedded in the DMA descriptor being recovered. Differences between DMA_PROD 1116 and DMA_CONS 1114 are detected by the RTU 264 and reported to the DMA Unit 120. Differences between DMA_CONS 1114 and DMA_RECOV 1112 are reported by the RTU 264 to the Policy Processor 244 through a status bit in the Processor Interface 206. Region 1106 contains one or more descriptor pointers which point to DMA descriptors as described in Table 3. Region 1104 contains the descriptor pointers of descriptors which have been retired by DMA 120 but have not yet been recovered by Buffer Recovery 118. Invalid 1102 and 1108 are the unused space into which more pointers can be scheduled.

7. Buffer Allocation/Flow

At initialization time the software allocates a pool of size-aligned 2 KB buffers in memory. Enough of these are allocated to each of the RX rings (that is, the buffer pointers are enqueued on those rings by writing them to the associated RTU[MPROD]) to provide the desired elasticity for the RX MAC, and the rest are placed on a freelist (e.g. on a software-managed linked list.) Each time the PP dequeues a buffer from the RX ring it can allocate a new empty buffer from the freelist, thus keeping the pool size constant Buffers that go through Crypto may be enqueued by any agent and are dequeued by the Crypto Processor which will then enqueue them on the specified destination ring after processing. Buffers that are scheduled for DMA are recovered at the same time the associated DMA descriptor is recovered from the ring. Buffers may be temporarily absorbed by an application if it is queueing packets for delay. A reference count can be maintained in buffers which go to multiple readers so that they retire only when all readers have retired them.

The goal is that the PP can handle buffer allocation and recovery through the read of status bits in the PISR, reads of RTU recover or dequeue addresses to recover retired buffers when the RTU indicates through the PISR that the particular rings have buffers to recover, and writes to ring RTU enqueue addresses to allocate new buffers. It is a primary goal that copying of buffers is avoided except when absolutely necessary.

Rings report threshold warnings to the PP/AP through the CRISIS register when there is danger of under/overflowing (within ¼ ring-size of a problem situation) and also report full/empty status of rings through bits in the CRISIS Register as appropriate.

7.1 The Life of an RX Packet Buffer

Ideally, a packet arrives into a buffer, gets processed, and then gets transmitted out the other port or gets dropped. Processing may include a decision by the application to enqueue the buffer for temporary delay (and possible later dropping), to feed a packet through the local optional Crypto for encryption work, or to pass a packet to the AP or external coprocessor (see FIG. 4). The key concept is to think of a packet as being "owned" by some agent, and that agent taking responsibility for the final disposition of the packet.

7.2 Flow of a Buffer Which Remains Local

At the beginning of time the system allocates a number of buffers to an RX MAC by writing their pointers into that RX Ring's RTU[MPROD] enqueue register, which presents these buffers to that MAC as empty/allocated. These buffers are now owned by that RX MAC, and cannot be touched by others until the MAC has so indicated. When the RX MAC has filled a buffer with a newly received packet it passes ownership to the associated Classification Engine by moving the MFILL pointer to the next entry (buffer pointer) in the ring. The CE will detect this, then process that packet; when it is done it passes ownership to the PP by incrementing the MCCONS index modulo ring size, and then the application(s) running on the PP will determine what action (s) to take. Ownership of a buffer is always explicitly relinquished by the current owner.

The PP can perform any conventional actions with a buffer. Examples of actions for a buffer which remains entirely local are DROP, FORWARD, MODIFY or temporarily ENQUEUE then later FORWARD.

DROP: The code running on the PP determines that there are no further uses for the contents of this buffer, so it retires/recovers the buffer. Typically this occurs when the Action portion of the application(s) running on the PP decide that a packet does not meet the criteria for passing it forward.

FORWARD: The PP enqueues the pointer onto the appropriate TX ring; TX is fire-and-forget (with optional completion status from the MAC), with the hardware responsible for either completing or abandoning the transmit (that is, the TX MAC owns that buffer). Some time later in the buffer reclaimation code, the PP will recognize that the TX MAC has retired this packet (is done with it) since the RTU indicates that there is a delta between MTCONS and MTRECOV, thus ownership of that buffer has transferred back to the PP. The PP then checks TX completion status (if the application(s) care) and recovers the buffer or reschedules the transmit as appropriate.

MODIFY: The application may choose to send the packet through Crypto for processing, may encapsulate/decapsulate the packet, could do address translation, or can do any other modification of the packet that the application directs.

ENQUEUE: The application running on the PP determines that it wants to hold on to the packet for some period of time, after which it will either forward or drop it.

Ownership of that buffer stays with the application until it relinquishes it by enqueuing the buffer's pointer on the appropriate TX or Reclassify ring, or by deciding to DROP it, in which case the same path as DROP (above) is followed. In the Enqueue case the average residency of a packet in a memory buffer is much longer than in the simple DROP or FORWARD cases, so if applications are enqueueing packets then care must be taken to allocate a large enough buffer pool.

7.3 Buffer Handling for Packets Sent to the PCI Bus

The applications(s) on the PP may decide that a packet should be forwarded to the AP either for further processing or because the packet is actually targeted at the AP as the final destination In either case it is necessary to migrate the packet to buffers in the AP's memory (e.g. into mbufs in the stack running there or into application-specific storage.) The buffer itself is not migrated, some or all of its contents are copied to a different buffer in host memory; this is done using the DMA engine.

Alternatively the application could choose to store the packet locally (that is, maintain ownership of the buffer) and simply pass a pointer and other information up to the AP. In this case the PP cannot reclaim the buffer until the AP has informed the PP that ownership of the buffer has been released back to the PP.

Other reasons for sending packets up to the PCI bus include a push-model peer-to-peer copy to a different Policy Engine or external coprocessor, and logging of selected packets at the AP. The latter is interesting because it may involve a fork where a packet takes two paths; one to a MAC transmit queue, and a second to the PCI bus; reclaimation of that buffer would require a convergence of completion, that is, a "join" function before the buffer can be reclaimed (if copying is to be avoided.) Software can maintain a reference count in the buffer for this purpose.

Forwarding a packet to the AP can be in the guise of NIC-like behavior or for application-specific communication. In either case the packet's buffer pointer is written to a DMA descriptor as the MEM_ADDR, and after the rest of the DMA descriptor is created the pointer to that descriptor is enqueued on the DMA engine's command queue. As with all other queues described so far, the PP has a trailing recover pointer DMA_RECOV and receives status in the PISR from the RTU when there are retired descriptors to recover.

The "NIC" interface as seen in host memory can be arbitrarily complex, but can be as simple as a memory image consisting of a buffer pool and pointer ring with a produce and a consume pointer, all in host memory; the "RX NIC interface" can mean reading a pointer to a free buffer, DMAing the entire packet buffer to that location, following that with a DMA of a new value to the "Produce" pointer associated with it, and an interrupt to the host (using one of the bits HISR[DMA DONE[7:0]]) upon completion of that DMA. More efficient host structures can be implemented without much more complexity. Communication down from the AP can also use the DMA engine and can involve a similar software ring structure in either host or PE memory; messages and/or ring indexes are written by the AP into one of the 16 Mailbox locations provided, which write data to PE memory and set a per-mailbox status bit which signals mailbox status through the PISR to the PP.

A peer-to-peer routing operation with a push model might require a buffer pool in PE memory to be allocated for each peer that will be doing this; then sending a packet to another Policy Engine for transmit is as simple as scheduling a DMA to copy the data from the local buffer to a buffer in this PE's buffer pool on the remote PE, followed by a DMA of the pointer to that buffer (in the "local" pointer format) into RTU[MTPROD] to schedule it for transmit. Later the remote PP will reclaim the buffer some time after the transmit is done, and will send back the pointer (or a "credit" message) by DMA'ing it to this PP's "freelist" ring for that particular peer.

Another more general method of allocating buffers and DMA descriptors to remote masters is to assign one of the generalpurpose COM rings to contain a freelist of buffer pointers, and a second to contain a freelist of DMA descriptor pointers; any remote master desiring to push data could then simply read the two rings to obtain both a target buffer and a DMA descriptor for scheduling a fill of that buffer.

A "pull" model of communication would have the remote master send only a (PCI) pointer or a descriptor down through either a mailbox or a COM ring allocated for this function, and require the PP to select a buffer from its own pool of buffers allocated for this purpose, using DMA to copy the buffer from the remote memory into local memory, then taking whatever actions are specified for that packet. Ownership of the actual buffer in this case always belongs to the PP.

7.4 Placement of the Software Structure in the Buffer

While the hardware defines the location of the receive and transmit control and status words and the location of the packet in the packet buffer, it is only by convention that the software structure resides forward from the 2 KB-aligned buffer pointer. A different convention can be used where the software structure of N bytes actually begins N bytes before the 2 KB-aligned buffer pointer; in this case the buffers managed and allocated by software are actually (2 KB–N)-byte aligned, and the RX status word is placed N bytes into the buffer, which lands it precisely on the 2 KB-aligned word where it already goes; hardware doesn't know the difference, but software can take advantage of such a structure to allow for arbitrary-sized packets from any media, which start forward from the RX status word just like the ethernet packet but may occupy contiguous memory far bigger than an ethernet packet would. By placing the software structure before the RX status word, the structure does not have to be moved to accommodate larger packets.

8. Endianness 8.1 Overview

Internal to the Policy Engine ASIC, all agents are big-endian. This includes the MACs, memory, the CEs, the Policy Processor, the Crypto port, and the DMA engine descriptor format. This choice is most convenient for dealing with protocol headers, which are typically big-endian native. The CE itself has no endianness since it works only in units of 32 bits throughout; however, it does deal with multibyte data in the way those words are formatted in memory, thus it sees the big-endian layout of the packet buffer contents and also writes its status words and hash pointers in big-endian format, which is what the PP expects to see.

All PIO accesses from PCI to registers (PCI address range recognized by BAR1) are required to be 32-bit access only. The registers connect to the PCI bus so that bit<0> of the host CPU register is bit<0> of the PE register, and bit<31> corresponds to bit<31>. This implies that bit<0> of a register access travels on bit<0> of the PCIbus. Registers are placed on doubleword boundaries but are accessed as words, and the data travels on bits<31:0> of the PCI bus even if the bus is connecting 64-bit agents. As word-only entities the registers have no byte order issue. The same is true of PCI Configuration Register accesses.

All transfers between memory and the PCIbus move data by byte lane; this means that byte<0> in memory travels on byte<0> on the PCIbus, byte<1> on byte<1>, etc. This is endian-neutral for byte streams. This applies to all DMA activity, to PIO accesses from the PCIbus to/from memory, and also reads and writes from PCI through the Ring Translation Unit; the rings are simply memory with fancy address translation.

TABLE 4

Byte Lane Steering, PCI64-to-Memory

| (byte 7) | (byte 6) | (byte 5) | (byte 4) | (byte 3) | (byte 2) | (byte 1) | (byte 0) |
|---|---|---|---|---|---|---|---|
| PCI[63:56] | PCI[55:48] | PCI[47:40] | PCI[39:32] | PCI[31:24] | PCI[23:16] | PCI[15:8] | PCI[7:0] |
| M[7:0] | M[15:8] | M[23:16] | M[31:24] | M[39:32] | M[47:40] | M[55:48] | M[63:56] |

TABLE 5

Byte Lane Steering, PCI32-to-Mem

| | (byte 3) | (byte 2) | (byte 1) | (byte 0) |
|---|---|---|---|---|
| | PCI[31:24] | PCI[23:16] | PCI[15:8] | PCI[7:0] |
| First data phase (or word at 0x0) | M[39:32] | M[47:40] | M[55:48] | M[63:56] |
| Second data phase (or word at 0x4) | M[7:0] | M[15:8] | M[23:16] | M[31:24] |

This byte-lane steering has some interesting implications that need to be understood so that it is clear when software will have to twist data. Four interesting cases will be examined: (a) the host writing a DMA descriptor into memory for the DMA engine to consume, (b) the host writing a message to the PP in memory, (c) the PP writing a message in memory that is DMA'd to host memory, and (d) issues surrounding loading of CMEM in the four CE's.

8.2 Host Writing a DMA Descriptor in Memory

The DMA descriptor is not a byte stream, therefore the endian-neutral PIO from the host to memory is not sufficient. The DMA engine sees the descriptor as a 16-byte, 16-byte-aligned big-endian data structure as shown in Table 3 on page 22. For this example the fields are simplified into a 32-bit PCI address PA, a 32-bit Buffer Address BA, a 16-bit offset OF, a 16-bit Word Count WC, and a 32-bit Flag word F.

Here is the big-endian view of that descriptor as it appears in memory and as the DMA engine interprets it:

TABLE 6

DMA Descriptor Byte Order, big endian memory

| (byte 0) | (byte 1) | (byte 2) | (byte 3) | (byte 4) | (byte 5) | (byte 6) | (byte 7) |
|---|---|---|---|---|---|---|---|
| PA[31:24] | PA[23:16] | PA[15:08] | PA[07:00] | F[31:24] | F[23:16] | F[15:08] | F[07:00] |
| BA[31:24] | BA[23:16] | BA[15:8] | BA[7:0] | OF[15:08] | OF[7:00] | BC[15:08] | WC[7:0] |

Assuming that the host (AP) will write to this data structure in PE memory using word PIO's over PCI (for the example shown), the host must pre-scramble those words so that the data will arrive in the correct byte lanes:

TABLE 7

DMA Descriptor Byte Order, little endian register

| | (byte 3) | (byte 2) | (byte 1) | (byte 0) |
|---|---|---|---|---|
| First data phase (word at 0x0) | PA[07:00] | PA[15:08] | PA[23:16] | PA[31:24] |
| Second data phase (word at 0x4) | F[07:00] | F[15:08] | F[23:16] | F[31:24] |
| Third data phase (word at 0x8) | BA[7:0] | BA[15:8] | BA[23:16] | BA[31:24] |
| Fourth data phase (word at 0xC) | WC[07:00] | WC[15:08] | OF[7:0] | OF[15:8] | and then when the host writes the address of the descriptor into the DMA ring (which is "byte-lane" memory), that descriptor pointer is written as a word with the following content:

TABLE 8

Descriptor Pointer Byte Order, little endian register

| (byte 3) | (byte 2) | (byte 1) | (byte 0) |
|---|---|---|---|
| DESC_A[07:00] | DESC_A[15:08] | DESC_A[23:16] | DESC_A[31:24] |

Note that reads and writes through the ring unit are accesses to memory, not to registers, which is why the address_ shuffle (where "the address" is data, as above) is required when the host is writing to the ring-enqueue address.

8.3 Host Writing a Message to the PP in Memory

The PP views the memory as big-endian in the same manner as the DMA engine, so the example in 7.8.2 describes this path as well. Messages are either a byte stream, or require the host to manually byte swap larger data. The contents of a mailbox and the contents of any ring entry or other item in memory will follow the same format as shown in Table 8.

8.4 PP Writing a Message in Memory that is DMA'ed to the Host

If messages sent up to the host are simply a byte stream then there is no issue, since byte streams travel in an endian-neutral way. If on the other hand the message includes data that are larger than a byte (e.g. a buffer pointer), byte swapping occurs and both ends of the communication must be aware of this.

For example, if the PP wants to send a 32-bit address to the host, it must byte swap within that word before sending it. That is, if the PP wants to send the 32-bit word 0XDEAD-BEEF up to the host as a message, then the PP must put it into memory as 0XEFBEADDE (see Table 5.)

8.5 Classification Engine CMEM Fills

Writing instructions into CMEM in the Classification Engines takes one of two paths; the data is either DMA'ed or PIO'ed into PE memory from the host and then copied from memory to CMEM by the CE (using the CE's FILL_ DMA unit), or the host can PIO data directly into CMEM over the Register interface (CMEM_DIAG access).

The CMEM_DIAG path is word-oriented and no twisting occurs, since it is all via the register path. The 32-bit data and addresses seen in the host processor is the same 32-bit data that is seen in the AP's registers. Diagnostic PIO's of data are sent to CMEM in the order [Least Significant Word, then Most Significant Word] to construct the 64-bit instruction.

The FILL_DMA path takes 64-bit words from PE memory and writes them into the 64-bit CMEM. The compiler and host software always handle 64-bit instructions in their native (that is, readable) form. CMEM instructions are laid out as native 64-bit units in host memory; the host/compiler does not need to twist them to help the (other-endian) recipient. When the data arrives in PE memory, each 64-bit instruction will arrive byte-swapped due to byte-lane steering; that is, the instruction 0XAABBCCDD_EEFF0123
in host memory will land in PE memory as
0X2301FFEE_DDCCBBAA
and the CE CMEM Fill data path is wired as shown in Table 4, so that the bytes land in the correct place. Thus the MSB from PE memory will go to the LSB in CMEM, and vice versa. This works whether the data arrived in PE memory via a PIO from the AP or via a DMA from host memory prior to the FILL_DMA transfer into CMEM.

The upshot of all of this is that the CMEM FILL DMA unit views PE memory as little-endian; and it doesn't matter to anyone using normal paths that CMEM microcode images are byte-swapped while they reside in the staging area in PE memory. This is all hidden from software.

IV. Classification Engine

The Classification Engine (CE) is a microprogrammed processor designed to accelerate predicate analysis in network infrastructure applications. The primary functions commonly used in predicate analysis include parsing layers of successively encapsulated headers, table lookups, and checksum verification.

Header parsing consists of extracting arbitrary single- or multiple-bit fields from those headers, comparing those fields to one or more constants, then taking the results of these comparisons and doing boolean reductions on multiple extraction results to reduce them finally to a single "matches/doesn't-match" status for each complex predicate statement; this single boolean value can then be used to quickly dispatch the appropriate actions at the PP. The size of each header is also determined so that the next level of protocol can be found and parsed in sequence. Applications can also choose to examine packet contents in addition to the headers if desired; the CE does not treat the header portion of a packet any differently from the payload portion.

Table lookups can consist of comparing an extracted value against a table of constants, or can involve generating a hash key from extracted values and then doing a lookup in a hash table (content-addressable table) to identify a record associated with packets matching that key; the record can contain arbitrary application-specific information such as permissions, counters, encryption context, etc.

Checksum verification involves arithmetic functions across protocol headers and/or packet payloads to determine if the packet contents are valid and thus comprise a valid packet. A special adder parallel to the mask-rotate unit called split-add adds the upper and lower half of a 32-bit operand together and produces a 17-bit result for use as an operand by the ALU; this is used in TCP, UDP, and IP checksum computation.

Since one purpose of the CE is to help the PP to avoid needing to touch packet contents and thus fault portions of the packet into the PP's data cache, the CE can also be programmed to extract arbitrary data fields and optionally do computations on them, then pass the results to the applications running on the PP via the packet buffer's software data structure.

A software structure is carried in the packet buffer along with the packet and the associated MAC status. This structure is written with predicate analysis results, hash table pointers to records found, hash insertion pointers in the case of a failed search, checksum results, a pointer to the base of each protocol found, extracted and computed fields, etc. for use by the application(s) running on the PP.

In order to accelerate these functions, the Classification Engine loads some or all of the packet from the PE's SDRAM-based memory (PE Memory) into a packet memory (PMEM) which it can then access randomly or sequentially to extract fields from the packet. A mask-and-rotate unit allows arbitrary bit fields to be extracted from words of the packet which can then be used as operands in computation or as comparison values for bulk table comparisons. Table comparisons or individual arithmetic and logic operations can set one or more bits in the result vector which is a large, 1-bit wide register file. These RESVEC bits can then be accessed randomly and arbitrary boolean operations can be done on pairs of bits to produce more RESVEC bits, at a rate of up to two boolean bit operations per cycle, eventually reducing sets of bits to single-bit predicate results. Gang operations (GANGOPS) help optimize boolean reduction by doing a logical operation (OR, AND, NOR, or NAND) on any number of selected bits within a 32-bit group of RESVEC bits in a single clock, producing a single RESVEC bit as a result. After boolean reduction is completes some or all of the result vector can then be spilled to the software structure in the packet buffer in PE Memory for use by the Policy Processor.

A 32-bit Arithmetic and Logic Unit (ALU) and a set of general-purpose 32-bit registers (GPREG) allow for general computation as well.

Program flow control in the branch unit allows the microcode to decide if the next instruction in the microcode control store (CMEM) comes from a sequential location, from a relative-branch value which can be an immediate value in the microword or the contents of a GPREG, or (in the case of a RETURN) from the top of the hardware microstack; microstack values are enqueued when a CALL style of branch is executed, and the microstack is accessed in LIFO (last-in, first-out) fashion to support nested subroutines in the microcode. Branch, Call, and Return operations are all conditional based on any of the rich set of condition codes provided. When the microcode bit "BRANCH_EN" is set then a Branch, Call, or Return is executed if the selected condition code is true; calls and returns are done if the associated bit CALL or RET is set in the control word when BRANCH_EN is set. Due to pipelining of the microsequencer all program-flow changes have a 1-cycle delay before taking effect, so the instruction following any of program flow control instructions (the "branch delay slot") is always executed regardless of the success or failure of the conditional flow control instruction; as a result of this the address stored in the microstack upon a successful CALL is the address of the first instruction following the delay slot.

The CE also contains several special purpose registers and also supports execution of many special operations. Special-purpose registers include the interface to PE memory, the condition code register, a memory base pointer register used for base-index access to packet buffers in PE memory, a chip-wide timestamp timer, and instrumentation and diagnostic registers including a counter which monitors execution time and a counter which tracks stall cycles due to various memory interface delays.

The memory interface appears to the microcode as 3 FIFO's; DFIFO_W receives one or more words of data to be packed into a memory burst access for stores, DFIFO_R unpacks requested bursts of data that have been read from memory, and MEM_ADDR receives PE memory addresses along with size and direction information. Reads (or "loads") are non-blocking; microcode schedules a load and then can take the data from DFIFO_R at any time later; if the data has not yet arrived then the pipeline will stall until it does. The pipeline will also stall if there is an attempt to write data to DFIFO_W and there is no room or if there is an attempt to schedule another address in MEM_ADDR and there is no room. Both of these conditions are self-cleaning as the fifos drain to the chip's memory controller. Extensive error-checking logic uses counters to track the state of various parts of the memory interface and will not allow microcode to oversubscribe DFIFO_R nor to issue a write ("store") to memory unless precisely the right number of words of data have already been scheduled in DFIFO_W. Memory accesses sizes are 1, 2, 4, or 8 32-bit words.

Using the memory interface for a store consists of writing the desired number of words of data to DFIFO_W, then committing the store by scheduling the address into MEM_ADDR along with the appropriate size code and the direction flag for a store. Using it for a load consists of scheduling the address, size, and direction flag for a load into MEM_ADDR, then consuming precisely that many words in order from DFIFO_R at some later time DFIFO_R holds up to 4 maximum-sized bursts or up to 32 words of data scheduled as smaller reads, so properly written microcode can often hide the latency of reading PE Memory by scheduling several loads before consuming the result of the first. Bulk data movement such as filling PMEM with a packet can keep several reads outstanding in a pipelined fashion to move data at the maximum memory bandwidth available.

These non-blocking loads help to accelerate hash table searches and linked-list searches; once the header of a record has been fetched, the forward pointer can be used to speculatively fetch the next record before doing any key comparisons with the current one, hiding much of the memory latency and generally overlapping computation and memory access so that hash searches can be done as fast as the records can be fetched from the SDRAM (PE Memory).

Special Operations include various administrative functions that the CE uses; these include functions such as incrementing MCCONS and RCCONS in the RTU, flash-clearing the general purpose registers and the result vector, selecting immediate or index-register addressing for PMEM, loading the PMEM index pointer and setting or clearing its sequential access mode, managing a sequential index counter for RESVEC used for table comparisons and result spills, halting the sequencer or putting it into a power-saving sleep mode, managing certain special condition codes, etc.

Bulk Table Comparisons (using the cmprn instruction) implement the CE's only multi-cycle instruction; prior to executing cmprn, one or two 32-bit comparison values are loaded into general purpose registers. In the first cycle of a cmprn instruction one or two general-purpose registers are identified as the A-side and B-side comparison values (both can be the same register if desired), a starting index into RESVEC is set, four special condition codes associated with bulk table comparisons are cleared, an instruction-length counter is initialized to the instruction length "N", and the entire processor is set for cmprn mode. The next "N" 64-bit microcode words are interpreted as pairs of 32-bit values for comparison rather than as microcode; one 32-bit value is compared to the A-side register and the other is compared to the B-side register, and if either matches the associated bit in the (even,odd) bit pair pointed to by the RESVEC_INDEX is set; then the RESVEC_INDEX in incremented to point at the next bit pair, the length counter is decremented, and the next comparison value pair is fetched from CMEM. The process is repeated until the length counter reaches 0.

Associated with this process are the four condition-code bits MATCH_A, MATCH_B, MATCH_A_OR_B, and MATCH_A_AND_B, which indicate that at least one table value matched on the A-side, on the B-side, on either side, or on A and B-side together (as a 64-bit match), respectively.

Given this facility it is possible to compare one extracted value to (2*N) constants or to compare two values to N constants each, in a total of (N+1) cycles. These bulk table lookups are useful for rapidly searching small tables as part of predicate analysis; hash-table lookups are used for larger tables when it becomes more time-efficient to do so.

Another special condition-code is "Sticky-zero" or "SZ". It is used to cumulatively check status on a chain of equality comparisons of the form "if (A=X) and (B=Y) and (C=Z) and (D=W) then . . . " by first setting the SZ bit in the Condition Code Register using a special operation, then doing a series of equality comparisons or other arithmetic functions, then doing a conditional test of SZ; the bit stays set as long as the result of all intervening operations that set conditions codes have the "data equals zero" status. Any "data not equal to zero status" result in the series will cause SZ to clear and to stay clear.

A messaging facility between the CE and the PP is provided; the CE can set any of 4 status bits which cause status to become visible to the PP (Message-Out bits) and the PP can set any of 4 status bits (Message-In bits) which the CE can test as condition codes. These bits can be used for any messaging purpose as assigned by software.

Two other condition code bits are "RX_RING_RDY" and "RECLASS_RING_RDY", which are used by the RTU to indicate to the CE that there is a least one buffer pointer for it to process in the two buffer pointer rings on which it is a consumer; one ring is the "RX Ring" and always carries packets from the associated RX MAC to this CE, and the other is called the "Reclassification Ring" through which any party can schedule a packet to be processed on this CE.

In summary, the Classification Engine tests the two ring status bits and the 4 message bits in a dispatch loop, and calls the appropriate service routine when a condition is found to be active. (When no conditions are active the dispatch loop sets the CE into "sleep mode" to reduce power consumption.) The ring service routines fetch a packet buffer pointer from the associated ring, fetch some or all of the packet (only as much as the microcode will need to examine, or all of the packet if checksums are to be validated on the payload), then starts with the first protocol header and executes a series of application-specific operations to extract fields from the packet, identify and process arbitrary protocol headers, do table lookups via bulk comparisons or hash table searches as directed by the application, do checksum verifications as programmed, do boolean reduction on interim results, extract and optionally compute on arbitrary fields in the packet, and finally to write all results to a data structure in the per-packet result area that travels with the packet in the packet buffer in SDRAM. The results written include the set of single-bit predicate analysis results, hash search results (a pointer to the record that matches the key extracted from this packet or a pointer to where a hash record should be inserted if one does not exist and the application wants to create one, for any number of different tables with different keys), plus any extracted or computed values (such as index pointers to the start of each layer of protocol header) desired by the application. Microcode can be loaded into CMEM by the AP or PP, or by the CE itself once it has been loaded with its initial microcode.

The following pages include a block diagram of the CE, a table identifying the various microcode control bits, formats for the microcode, and tables of relevant values 1. CE Block Diagram FIG. 13 shows a block diagram of the Classification engine.

Figure 13:
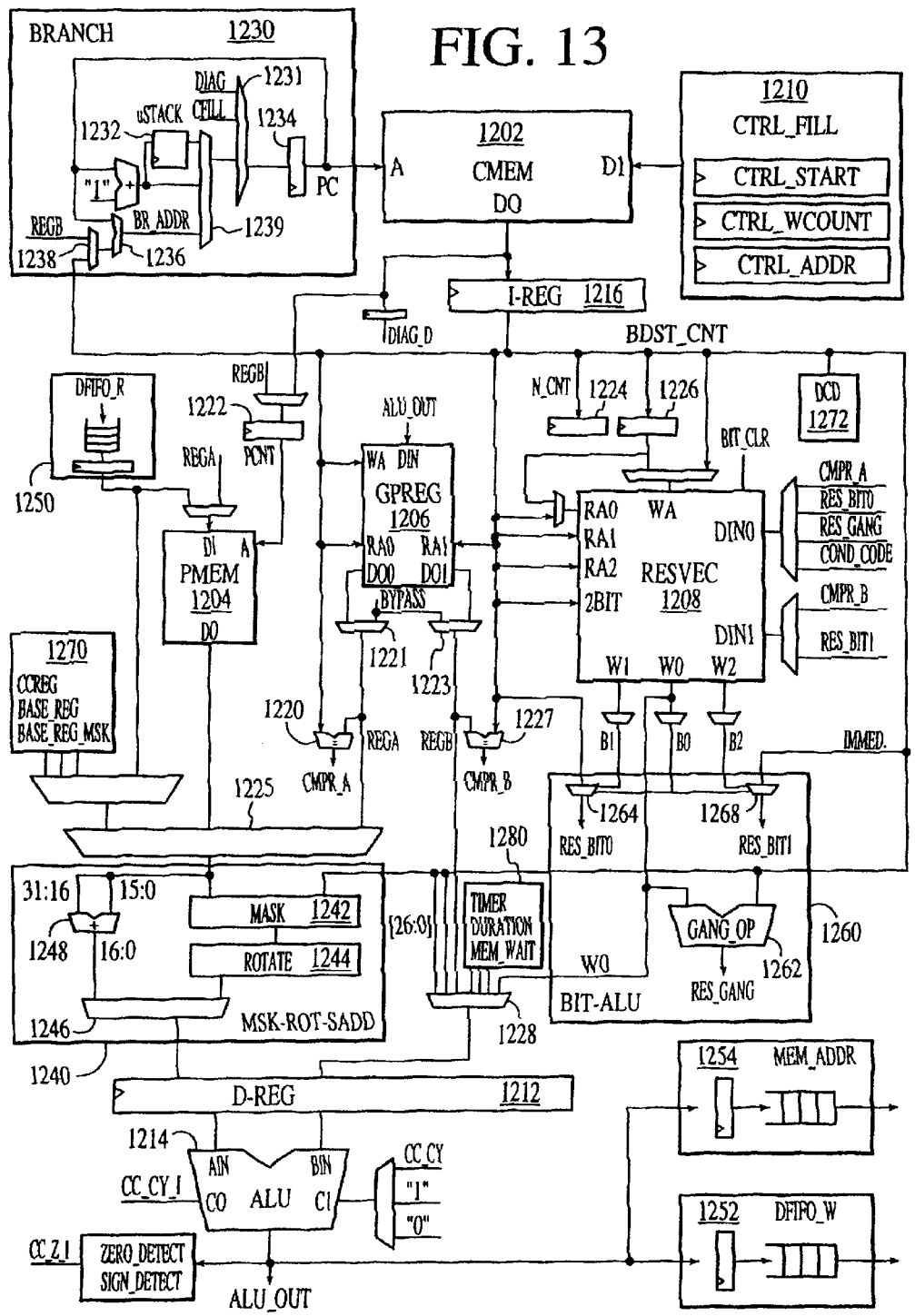
FIG. 13 is a classification engine block diagram related to the present invention.

1.1 Overview of the Classification Engine in FIG. 13.

The Classification Engine is a pipelined microsequencer. A 64-bit microword is fetched from Control Store CMEM 1202 using an address supplied by register PC 1234, and is stored in the instruction register I-REG 1216. This cycle is referred to as the Fetch cycle 1302.

The 64-bit microword in 1-Reg 1216 has 7 bits each dedicated to enabling the retirement of a result by causing registers to be loaded One of these bits is reserved for future enhancements, while 6 of them have specified functions as described in Table 16. This group of signals are known as the write enables WE[6:0]. The WE bits also have function-specific names as shown in Table 1; BRANCH_EN, REG_WE, CC_WE, RESVEC_WE, PMEM_WE, and SPECOP_EN.

BRANCH_EN enables conditional program flow changes if a condition test is met. It controls units in the Address Generation Unit 1230.

REG_WE enables retirement of 32-bit results in the word-oriented half of the machine to all of the general-purpose registers and special registers listed in Table 17. It also has side effects of incrementing the pmem 1204 index counter PCNT 1222 or dequeuing a word of data from DFIFO_R 1250 under certain circumstances.

CC_WE enables the writing of the arithmetic result bits in the condition code register.

PMEM_WE enables writes into packet memory PMEM 1204 RESVEC WE enables stores in the bit-oriented result vector RESVEC 1208.

SPECOP_EN enables special operations including writing to PCNT 1222, NCNT 1224,

BDST_CNT 1226, and other functions listed in Table 22.

Figure 14:
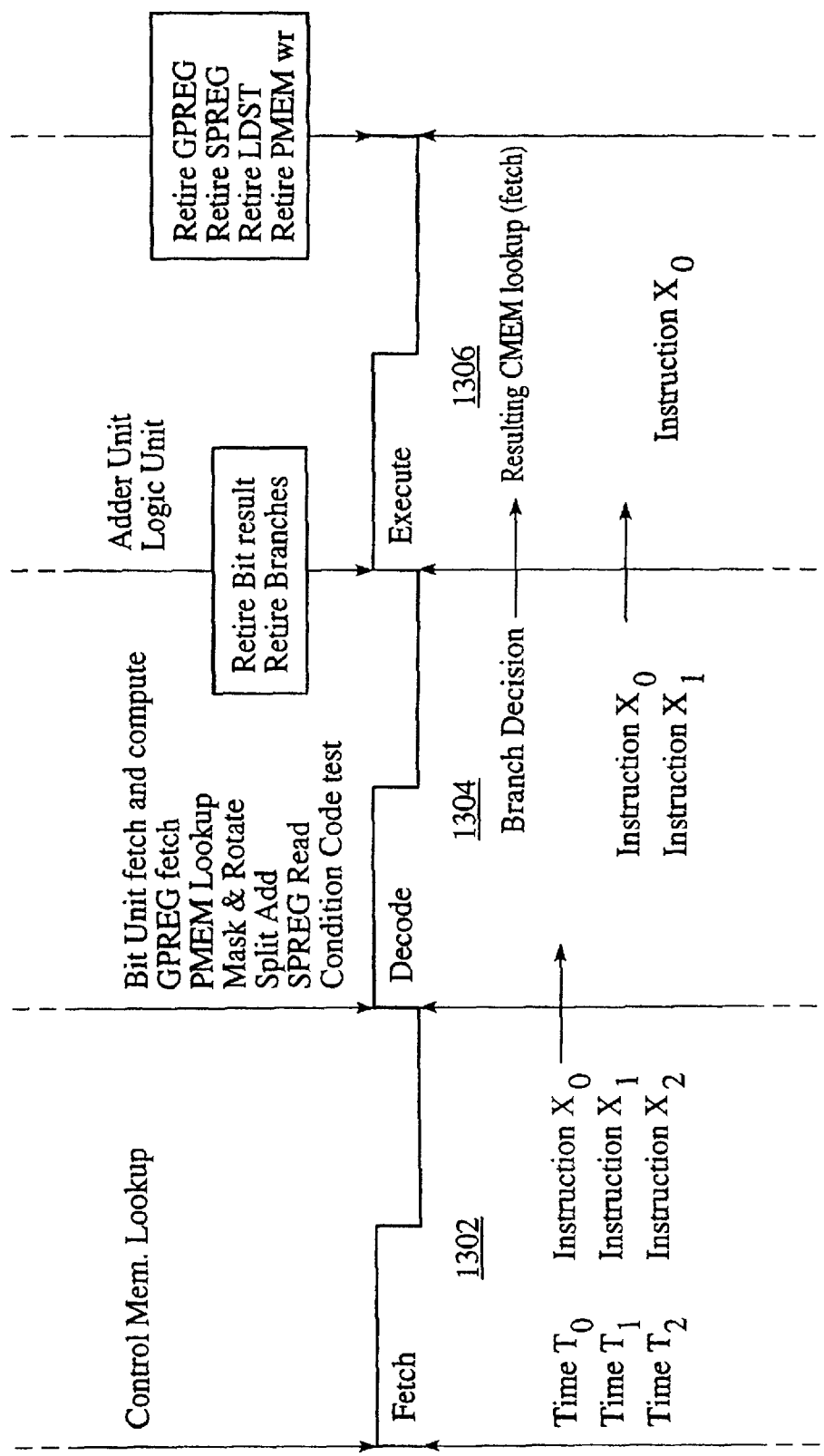
FIG. 14 is a pipeline timing diagram for the classification engine related to the present invention.

The pipeline is 3 stages deep as shown in FIG. 14. The Fetch stage 1302 has been described above. The Decode stage 1304 takes place from the output of I-REG 1216 to the inputs of D-REG 1212, PC 1234 and RESVEC 1208. The Execute stage 1306 takes place from the output of D-REG 1212 to the inputs of all general purpose registers and special purpose registers listed in table 17; ALUOUT can be written to GPREG 1206, MEM_ADDR 1254, DFIFO_W 1252, the CTRL_FILL registers 1210, and the special registers in block 1270. FIG. 14 shows in detail what occurs in each stage of the pipeline, and at what stage various types of results are retired. Pipeline stall conditions suppress all of the WE bits so that the same condition holds from once cycle to the next, until the stall condition clears. Since this stall condition affects all microcode-controlled changes of state in the CE, it is implicit in all subsequent discussion of operation of the pipeline and the effect of stalls needs no further discussion. The causes of pipeline stalls are described in subsequent sections.

1.2 Program Flow Control

The address generation unit 1230 determines what address will be used to fetch the next microword from CMEM. The Program Counter (PC) 1234 contains the address of the current instruction being fetched. If BRANCH_EN is a '0' then the next value of PC is an increment of the current value; with no branches the microsequencer fetches microwords sequentially from CMEM. When BRANCH_EN is asserted a test of condition codes listed in Table 21 is done as selected by bits CCSEL [4:0] and inverted by FALSE, both fields described in Table 16. If the condition test returns a "1" then the conditional branch will be taken, otherwise PC 1234 will be loaded with the increment of its current value. The bit REG is tested; if it is '0' then the address PC is added to the value of the bits BRANCH_ADDR[9:0] to generate the branch value of PC; if it is '1' then the address PC is added to the value on bus REGB[9:0] to generate the branch value. The bus REGB carries the output of GPREG 1206 port DO1, which carries the value of the general purpose register selected with bits RSRCB[2:0].

Next bit RET is tested. If it is a '1' then PC is loaded with the output of the microstack 1232, and the microstack's stack pointer is decremented by 1. The microstack 1232 is a Last-in, First-out LIFO structure used to support micro-subroutines, nested up to 8 deep. If RET was a '0' then PC is loaded with the calculated branch value described above instead, and CALL is examined. If CALL is a '1' then the microstack 1232 has its stack pointer incremented, and the incremented value of the previous PC is written into the microstack using the new value of the stack pointer. In this way the address stored in the microstack 1232 when a CALL is executed is the address of the next instruction that would have been executed sequentially if the branch had not succeeded; thus when calling a subroutine it is the address of the next instruction to return to after executing a RET to terminate the subroutine.

Since all program flow control decisions are made in the Decode stage 1304, the sequential instruction which follows is already in the fetch stage and is always executed This means that there is always a 1-cycle delay between fetching a successful BRANCH_EN instruction and its effect on PC. The instruction which follows a branch instruction, and is always executed regardless of the success or failure of the branch, is called a delay-slot instruction. A delay-slot instruction may not have BRANCH_EN set. The return value stored in the microstack 1232 after a successful CALL is the address of the instruction following the delay slot instruction of the CALL.

The microstack 1232 in the preferred embodiment of the invention consists of 8 registers with a multiplexer (mux) selecting one of them as the microstack output A single 3-bit counter is used as the stack pointer; it is decoded in such a way that the read address N is the write address (N+1) so that a read-and-decrement or write-and-increment can be executed in a single cycle. Attempting to execute a CALL when the microstack already has 8 valid entries in it, or attempting to execute a RET when the microstack has no valid entries in it, causes the pipeline to halt and signal STACK_ERROR status to the Policy Processor 244.

CCSEL, FALSE, BRANCH_ADDR, RSRCB, REG, CALL, and RET are all defined in Table 16.

1.3 32-Bit Operations

The Classification Engine has two distinct data domains; one is oriented around 32-bit data, and the other is oriented around 1-bit boolean data in RESVEC 1208 and the BitALU 1260. There are a few places where data is communicated between these two domains. This section describes the 32-bit domain.

The 32-bit domain centers around selecting the A-side and B-side operands which are then fed into AIN and BIN of the ALU 1214. The output ALUOUT from ALU 1214 is then written back to one of the 32-bit destinations, and optionally the arithmetic condition codes are set if CC_WE is '1'. The ALU 1214 is a 32-bit Arithmetic and Logic Unit which performs any of the arithmetic functions listed in Table 19 or any of the logic functions listed in Table 20 under control of the bits ALUOP[5:0] defined in Table 16.

GPREG 1206 is a 32-bit general-purpose register file comprising 8 32-bit registers. It has two read ports and one write port. Read port DO0 has the contents of the register selected by RSRCA[2:0], and read port DO1 has the contents of the register selected by RSRCB[2:0]. The register selected by RDST[2:0] is written to with the value of ALU_OUT if RDST[3] is '0' and REG_WE is '1'. In order to make newly-generated register values available in the subsequent instruction, the pipeline delay of writing into GPREG and reading out the new value is squashed through use of Bypass Multiplexers 1221 and 1223, which are used to forward ALU_OUT to busses REGA and REGB if RDST of the instruction in the execute stage matches RSRCA or RSRCB, respectively, in the instruction in the decode stage, thus hiding the pipeline delay. The A-side operand is selected among the A-side sources listed in Table 17 by multiplexer 1225. The selected data is then sent into the split-add-mask-and-rotate unit 1240. Bits[31:16] of the data are added to bits[15:0] of the data in the adder 1248, and the 17-bit result is concanated with zeros in bits [31:17] to create the split-add result. The selected data is also sent to the Mask Unit 1242 where it is bitwised AND'ed with MASK[31:0] if MSK[1] is a '1', or is passed through unmodified if MSK[1] is a '0'; the result from MASK 1242 is sent through the ROTATE barrel-shifter 1244 where the data is rotated right by the number of bits specified in ROT[4:0] in the micro-word. Finally, MSK[0] is used to select between the split-add result and the mask-rotate result in multiplexer 1246, and the result is presented to D-REG 1212 as the A-side operand for the execute stage 1306. The B-side operand is selected among the B-side sources listed in Table 18 using multiplexer 1228, and is presented to the D-REG 1212 as the B-side operand for the execute stage 1306.

RSRCA, RSRCB, ALUOP[5:0], RDST[3:0], MASK [31:0], MSK[1], MSK[0], ROT[4:0] are all described in Table 16.

1.4 PMEM

Packet Memory (PMEM) 1204 is a (32-bit by 512-entry) RAM with one read port and one write port used to hold some or all of the packet being processed, and also to hold arbitrary data generated by the program. PMEM 1204 can be written from two sources; DFIFO_R 1250, or the REGA bus from the general-purpose registers GPREG 1206, where the register is selected by RSRCA[2:0]; such writes occur when PMEM_WE is a '1' in the microword. PMEM is read as one of the A-side sources selectable as one of the "special register" sources.

PMEM 1204 addressing depends on the state bit USE_PCNT. When USE_PCNT is '0', then PMEM 1204 is addressed by PINDEX[10:2] from the microword. When USE_PCNT is '1' then the address to PMEM 1204, is provided by the counter/register PCNT 1222. USE_PCNT is set and cleared via special operations. When SPECOP_EN is '1' and LD_PCNT is '1', then PCNT_REG is examined. If it is a "1" then PCNT is loaded with the value of bits [10:2] of the general-purpose register in GPREG 1206 selected by RSRCB[2:0]; alternatively if PCNT_REG is a "0" then PCNT is loaded with the value of PNDEX [10:2] in the microword. In either case the state bit USE_PCNT is set. Additionally, bit PCNT_INC is examined, if it is a "1" then PCNT_INC_MODE is set, or if it is a "0" then PCNT_INC_MODE is cleared. The state bit PCNT_INC_MODE determines if PCNT 1222 holds a static value during the PCNT_MODE period, or if increments by one each time PMEM is written to or is used as a register source. USE_PCNT clears when an instruction has SPECOP_EN equal to "1" and UNLOCK_PCNT also equal to "1".

DFIFO_R. RSRCA[3:0], RSRCB[3:0], PINDEX[10:2] are all defined in Table 16, LD_PCNT, PCNT_REG, PCNT_INC, UNLOCK_PCNT are all defined in Table 22.

1.5 Interface to Memory 260

SDRAM Memory 260 can be read and written by the microcode. The memory interface visible to the microcode consists of the MEM_ADDR FIFO 1254, the write data FIFO DFIFO_W 1252, and the read data FIFO DFIFO_R 1250. Writes to memory 260 are called stores, and reads from memory 260 are called loads. Loads and stores can be of size 1, 2, 4, or 8 words of 32-bits each. The address of a memory access must be size-aligned for the specified burst; that is, the address for a 2-word memory access must be on an 8-byte boundary, the address of an 8-word access must be on a 32-byte boundary, etc.

To schedule a store, precisely the number of words for the specified size of transfer are written to the special register destination DFIFO_W 1252, then the address (along with control information MEM_SIZE[1:0] and MEM_DIR= STORE) are written into the address fifo MEM_ADDR 1254, which triggers the memory interface to issue the store. The microsequencer is decoupled from the memory system by the FIFOs 1252 and 1254, and thus can continue operation while the memory interface processes the store operation. The FIFOs 1254 and 1252 can hold up to 8 addresses and 16 words of data, respectively, so that in general more than one store operation can be outstanding without stalling the pipeline. The entire pipeline stalls when the execute stage 1306 operation is a write to either MEM_ADDR 1254 or to DFIFO_W 1252 and the target FIFO does not have room for another word. The situation will clear as the FIFO drains its current operation to memory 260 so the stall condition is transient.

To schedule a load, the address (along with control information MEM_SIZE[1:0] and MEM_DIR=LD) is written to special register destination MEM_ADDR, and some time later the microcode can obtain the requested data from the read data FIFO DFIFO_R 1250. Between the time that the microsequencer scheduled the load operation and the time the data is consumed, there is latency to access the memory system 260. The microcode can choose to execute any number of instructions between the time the load is scheduled in MEM_ADDR 1254 and the data is consumed from DFIFO_R 1250, since the loads are non-blocking. However, if the microcode attempts to read data from DFIFO_R 1250 and there is no data available, the pipeline will stall until such time as requested data has returned from memory 260. More than one load can be scheduled before any data is consumed; DFIFO_R 1250 has room for up to 16 doublewords (128 bytes) of data.

The microcode is responsible for ensuring that it never attempts to read data from DFIFO_R 1250 when no more words of read data have been scheduled, nor to issue a store address to MEM_ADDR 1254 when DFIFO_W 1252 has not been written with precisely the number of words specified in the size of the store. The microcode is also responsible for never oversubscribing DFIFO_R 1254, that is, scheduling more outstanding words of read data than DFIFO_R 1254 has room for. Any of these conditions is detected by error-checking logic in the CE which will halt the CE and report violations to the Policy Processor 244 if the memory system is used incorrectly.

1.6 Bit-Oriented Operations

RESVEC 1208 is a 1-bit by 512-entry register file with special characteristics. It has one write port and 3 read ports; this means that in any one instruction 3 bits can be read and one write can be issued. The write can be to one bit, or to an adjacent pair of bits whose address differs only in the least significant bit, referred to here as an even-odd bit pair. For certain operations RESVEC 1208 can also be accessed as a 32-bit by 16-entry register file.

When RESVEC_WE is a '1' and the microcode bit 2 BIT is a '0' then a single bit in RESVEC 1208 is written with the data presented on the DIN0 data input port; that data is selected from among 4 different sources under control of the RES0_SEL[1:0] bits in the microword. Alternatively if 2 BIT is a '1' then the DIN0 data is written to the even-numbered bit in the destination, and DIN1 selected from among two sources by RES1_SEL is written to the odd-numbered bit of the pair.

The destination address in RESVEC 1208 comes either from RES_BIT_DST[9:0] if state bit USE_WCNT is '0', or from BDST_CNT 1226 if USE_WCNT is '1'. USE_WCNT is set when SPECOP_EN is '1' and LD_BDST_CNT is a '1'. In that case BDST_CNT 1226 is written with the value RES_BIT_DST[9:1]. At the same time BDST_CNT 1226 is loaded, the bit BDST_CNT_MODE in the microword is examined. If it is '0' then BDST_CNT 1226 is set to increment by 2, if it is '1' then BDST_CNT 1226 is configured to increment by 32. The former is used in the special instruction CMPRN to sweep across sequential bit pairs in each cycle of the instruction and to write to them, while the latter is used for the RESVEC 1208 read address port RA0 to sequentially read 32-bit groups of RESVEC 1208 bits as the B-side special register RES_VEC.

The bit-oriented ALU 1260 contains two boolean logic units 1264 and 1268 and one gang operation unit 1262. Boolean logic unit 1264 takes the two bits selected by RES_BIT_SRC_A[9:0] and RES_BIT_SRC_B[9:0] and applies the boolean operation BITOPAB[3:0] as specified in table 20. The 1-bit result RES_BIT0 is one of the potential sources for write data port DIN0 on RESVEC 1208. Boolean logic unit 1268 similarly takes the operands selected by RES_BIT_SRC_A[9:0] and RES_BIT_SRC_C[9:0] and applies BITOPAC[3:0] in a substantially similar manner, generating the 1-bit result RES_BIT1 which may be selected as the DIN1 write data source if 2 BIT is '1'. Thus in one cycle up to two bitwise boolean operations can be executed if the two operations have one common operand. The GANGOP unit 1262 takes the 32 adjacent bits from RESVEC 1208 selected by RES_BIT_SRC_A[9:5] and treats them as a word operand. MASK [31:0] is used to select which bits of that word will contribute to the gang results, then an AND, OR, NAND, or NOR operation is performed on all of the selected bits as instructed in GANGOP[1:0], and the result bit RES_GANG is presented as one of the possible sources for DIN0 on RESVEC 1208.

The condition code selected by CCSEL[4:0] and optionally inverted with FALSE can also be selected as the data source for port DIN0.

The remaining sources for DIN0 and DIN1 on RESVEC 1208 are the CMPR_A, CMPR_B result bits from one cycle of a bulk comparison instruction CMPRN, described below.

RESVEC 1208 address fields for sources and destination are specified as 10 bits, even though only 9 bits are used in the preferred embodiment; the extra bit allows for a doubling of the size of RESVEC 1208 in future generations of the device.

Writes to RESVEC 1208 are retired at the end of the Decode stage 1304 and can thus be used immediately as an operand in the subsequent instruction, without need for bypassing as is done with GPREG 1206.

2BIT, RES0_SEL[1:0], RES1_SEL, BITOPAB, BITOPAC, GANGOP[1:0], RES_BIT_DST[9:0], RES_BIT_SRC_A[9:0], RES_BIT_SRC_B[9:0], RES_BIT_SRC_C[9:0], MASK[31:0], CCSEL[4:0], FALSE are all defined in Table 16.

LD_BDST_CNT, BDST_CNT_MODE are specified in Table 22.

1.7 Bulk Comparisons

When SPECOP_EN is '1' and LD_NCNT is also '1' the instruction cycle counter N_CNT 1224 is loaded with the value NCNT[6:0] (bits[22:16] of the microword) and the state bit CMPRN is set. LD_BDST_CNT is required to also be a '1' for this instruction, and BDST_CNT_MODE must be a '0'. BDST_CNT 1226 is loaded with the value RES_BIT_DST[9:1]. GPREG 1206 is locked with the A-side select RSRCA[2:0] and the B-side select RSRCB[2:0]. The bit CLEAR_HIT is required to be a '1' also in this instruction, which has the effect of setting the condition code register bits MTCH_A, MTCH_B, MTCH_AORB, MTCH_AANDB all to zero.

For the next N cycles, until N_CNT 1224 has decremented to zero, interpretation of the 64-bit microword is suppressed and all 64 bits are treated as data instead. In each of these cycles the microword bits [63:32] are compared to the selected A-side register value REGA using comparator 1220 to produce the result CMPR_A if they are equal; and microword bits [31:0] are compared to the selected B-side register value REGB using comparator 1227 to produce result CMPR_B if they are equal. Daring CMPRN the RESVEC unit 1208 is locked into a mode where 2 BIT is true and RES0_SEL and RES1_SEL select CMPR_A, CMPR_B respectively. The results CMPR_A and CMPR_B are stored to the even-odd pair of bits in RESVEC 1208 selected by BDST_CNT 1226, then BDST_CNT 1226 is incremented, NCNT 1224 is decremented, and the process repeats until NCNT 1224 equals zero. At that point the state bits USE_BDST_CNT and CMPRN clear and the pipeline goes back to normal operation where every microword is interpreted.

During every comparison cycle of the CMPRN instruction, if CMPR_A is a '1' then the condition code bit MTCH_A will set and will stay set. Similarly if CMPR_B is a '1' during any of those cycles then bit MTCH_B will set and will stay set. If either CMPR_A or CMPR_B is true during any of these cycles then condition code bit MTCH_AORB will set and will stay set. Finally, if CMPR_A and CMPR_B are both '1' during a CMPRN compare cycle, then MTCH_AANDB will set and will stay set to indicate that a 64-bit match was encountered.

By loading one or two registers in GPREG 1206 with comparison values prior to executing the CMPRN instruction, a single value can be compared to (2*N) values in a table, or two different values can each be compared to (N) values, in ((2*N)+1) execution cycles.

RES_BIT_DST[9:0], RSRCA[3:0], RSRCB[3:0], 2 BIT, RES0_SEL, RES1_SEL are specified in Table 16.

LD_NCNT, LD_BDST_CNT, CLEAR_HIT are specified in Table 22.

1.8 Special Operations

In addition to the special operations mentioned so far, there are other administrative functions which are enabled with SPECOP_EN and decoded from the bits specified in Table 22. Decode of these functions and any decode necessary for implementing the instruction set specified take place in the decoder block DCD 1272.

1.9 CMEM Fills

The microstore CMEM 1202 is filled either via a series of PIO write accesses from the Policy Processor 244 or Application Processor 302, or can be loaded by use of the CTRL_FILL unit 1210. The registers in CTRL_FILL 1210 are loaded with an address in memory 260, an address in CMEM 1202, and a count of the number of instructions to be loaded. With the CE pipeline halted, the CTRL_FILL unit will execute this transfer.

The transfer may be initiated by the Policy Processor 244, the Application Processor 302, or can be initiated by microcode running on the CE, in which case the CTRL_FILL 1210 registers appear as special register destinations as shown in Table 17, and the operation is triggered with an instruction which has SPECOP_EN equal to '1', and HALT and DO_CMEM_FILL asserted. After the transfer completes, microcode can then continue execution, including the newly downloaded code. The CE can only load and launch itself if microcode to do so is already resident in CMEM 1202 and if the host has configured the CE to allow it to do so.

HALT and DO_CMEM_FILL are specified in Table 22.

2. CE Programming Languages

CE programs can be written directly in binary; however for programmer convenience a microassembly language uasm has been developed which allows a microword to be constructed by declaring fields and their values in a symbolic form. The set of common microwords for the intended use of the CE have also been described in a higher-level CE Assembly Language called masm which allows the programmer to describe operations in a register-transfer format and to describe concurrent operations without having to worry about the details of microcode control of the underlying hardware. Both of these languages can be used by a programmer or can be generated automatically from a compiler which translates CE programs from a higher-level language such as NetBoost Classification Language (NCL).

V. Microprogramming Guide

The 64-bit CE instruction word is raw microcode; some bits enable retirement of operations by writing to one or more units, and the rest are used to steer different data paths and to provide control codes to various units in parallel. Depending on which results are retired, the fields in the microword have different meaning. There are 7 different ways that the microword is interpreted; even though all steering is really done in parallel, these 7 instruction formats show which sets of fields can be used without conflict.

There are 7 bits that are constant in all formats; these are the bits that enable stores into various units. These bits are {REG_WE, RESVEC_WE, CC_WE, reserved, PMEM_WE, BRANCH_EN, and SPECOP_EN }, which are assigned in that order to bits [63:57] of the microword and are described in Table 16. The remaining bits are assigned to control points as shown in FIG. 13 and are defined in the following sections.

As shown in FIG. 14, the CE is implemented as a 3-stage pipeline; each instruction passes through the three stages Fetch 1302, Decode 1304, and Execute 1306; at any time there are three different instructions being processed. The figure shows what processes occur in each stage of the pipeline, and helps illustrate behavior of the pipeline shown in FIG. 13. When the pipeline stalls all three stages stall together in lockstep.

Most word-oriented operations pass one operand through either the mask/shift unit or the split-add unit and then all word-oriented operations pass through the Execute-stage ALU before being retired. Any consumer of a newly-produced GPREG value actually receives a forwarded copy of the current ALU output via some bypass logic so that there is no delay between creation of a result and use of it in a subsequent operation. Similarly, use of condition codes for BRANCH (conditional flow control) or BSET (setting a selected RESVEC bit to the result of a condition code test), or reads of CC_REG (Condition Code Register) when the bits are being updated requires bypassing.

Other registers (e.g. BASE_REG) do not have forwarding so the software must delay one clock after writing them before using the result.

1. Microword Format Definitions 1.1 MOV, ALU, and LDST Operations

REG_WE is Set.

These instructions select 1 or 2 sources among GPREG and SPREG, do a mask/shift or split-add of the A-side operand, then pass them through the ALU and store the result to an SPREG or GPREG. Condition codes Z, N, V, SZ, and CY are optionally set by this operation if CC_WE is set.

destination to which the RES0 result is written; and if (optionally) 2 BIT is set, then RES_BIT_DST is treated as the pointer to an adjacent pair of bits where the first has an even address and the second has the next (odd) address. With 2 BIT the odd bit is written with the RES1 result.

Depending on the value of the field RES0_SEL, the RES0 result may come from a boolean operation BITOPAB performed on the operands selected by RES_BIT_SRC_A and RES_BIT_SRC_B, or the result of a GANG operation performed on bits in the group of 32 RESVEC bits selected by RES_BIT_SRC_A[9:5] and further selected by the "1" bits in the 32-bit immediate MASK field, or the selected and

TABLE 9

MOV and ALU formats

| 63 | | 57 | 56 | | 53 | 52 | 51 | 50 | | 46 | 45 | | 40 | 39 | | 36 | 35 | | 32 |
|---|---|---|---|---|---|---|---|---|---|---|---|---|---|---|---|---|---|---|---|
| WRITE_ENABLES[6:0] | | RDST[3:0] | | | MSK [1:0] | | | ROT[4:0] | | | ALUOP[5:0] | | | RSRCB[3:0] | | | RSRCA[3:0] | | |
| MASK or IMMED | | | | | | | | | | | | | | | | | | | |
| 31 | | | | | | | | | | | | | | | | | | | 00 |

TABLE 10

MOV and ALU formats with PMEM src

| 63 | | 57 | 56 | | 53 | 52 | 51 | 50 | | 46 | 45 | 44 | | | | 36 | 35 | | 32 |
|---|---|---|---|---|---|---|---|---|---|---|---|---|---|---|---|---|---|---|---|
| WRITE_ENABLES[6:0] | | RDST[3:0] | | | MSK [1:0] | | | ROT[4:0] | | | | 1 | PINDEX[10:2] | | | | RSRCA[3:0] | | |
| MASK or IMMED | | | | | | | | | | | | | | | | | | | |
| 31 | | | | | | | | | | | | | | | | | | | 00 |

Note that with PMEM[immediate_index] as a source the ALU is bypassed (except for sign and zero-detect); however mask/rotate or split-add are still available.

optionally inverted condition code bit selected by CCSEL and FALSE, or the A-side result of a bulk table comparison CMPR_A.

TABLE 11

LDST format

| 63 | | 57 | 56 | | 53 | 52 | 51 | 50 | | 46 | 45 | | 40 | 39 | | 36 | 35 | | 32 |
|---|---|---|---|---|---|---|---|---|---|---|---|---|---|---|---|---|---|---|---|
| WRITE_ENABLES[6:0] | | RDST[3:0] | | | MSK [1:0] | | | ROT[4:0] | | | ALUOP[5:0] | | | RSRCB[3:0] | | | RSRCA[3:0] | | |
| (a) | b | | IMMED_ADDR[27:0] | | | | | | | | | | | | | | | | |
| 31 30 29 | 27 | | | | | | | | | | | | | | | | | | 00 |

(a) SIZE[1:0]

(b) DIR 1.2 BIT_OP

Bitops and gangops have RESVEC_WE set. These instructions select a bit RES_BIT_DST in RESVEC as a If RES1 is being written to the odd bit of a pair, the RES1 result is selected by RES1_SEL to be either the result of the arbitrary boolean operation BITOPAC performed on the operands selected by RES_BIT_SRC_A and RES_BIT_SRC_C, or the B-side result of a bulk table comparison CMPR_B.

TABLE 12

BIT_OP Format

| 63 | | 57 56 | | 47 46 45 44 43 | 41 | | 37 36 | | 32 |
|---|---|---|---|---|---|---|---|---|---|
| WRITE_ENABLES[6:0] | | RES_BIT_DST[9:0] | | a b c | | RES_BIT_SRC_A[9:0] | | | |
| RES_BIT_SRC_B[9:0] | | | RES_BIT_SRC_C[9:0] | | | | BITOPAB[3:0] | BITOP_AC[3:0] | |
| | | d | CC_SEL[4:0] | | | | | | |
| 31 | | 27 26 | | 22 21 | 12 11 10 09 08 07 | | 04 03 | | 00 |

(a) RES0_SEL[1:0]
(b) 2 BIT
(c) RES1_SEL
(d) FALSE (selects gender of CCMUX output; 0=as is, 1=inverted)

1.3 GANG_OP

TABLE 13

GANG_OP Format

| 63 | | 57 56 | | 47 46 45 44 43 42 41 | | 37 | | 32 |
|---|---|---|---|---|---|---|---|---|---|
| WRITE_ENABLES[6:0] | | RES_BIT_DST[9:0] | | 1 0 0 a | | RES_BIT_SRC_A[9:5] | | | |
| MASK | | | | | | | | | |
| 31 | | | | | | | | | 00 |

(a) GANG_OP[1:0]

1.4 Branch

BRANCH_EN is always set in this format. Note that a register-to-register aluop can be folded into the same instruction as long as there are no other field conflicts.

TABLE 14

Branch Format

| 63 | 57 | | | | 39 | 36 | 32 |
|---|---|---|---|---|---|---|---|
| WRITE_ENABLES[6:0] | | | | | RSRC[3:0] | | |
| b c d a | CC_SEL[4:0] | RES_BIT_SRC_C[9:0] | | | BRANCH_ADDR[9:0] | | |
| 31 30 29 27 26 | 22 21 | | 12 | 09 | | | 00 |

(a) FALSE (selects gender of CCMUX output; 0=as is, 1=inverted)
(b) CALL
(c) RET
(d) REG (selects GPREG ('1') or immediate value ('0') for branch 1.5 SPECOP Special Operation bits (which are all qualified with SPECOP_EN) are defined in Section Table 22 on page 94. The instructions cmprn, setpcnt[i], and set_resvec_index also use some specop fields.

TABLE 15

SPECOP Format

| 63 | | | | | 57 | 56 | | | | 47 | 46 | 45 | 44 | 43 | | | 39 | | | 36 | 35 | | | 32 |
|---|---|---|---|---|---|---|---|---|---|---|---|---|---|---|---|---|---|---|---|---|---|---|---|---|
| WRITE_ENABLES[6:0] | | | | | RES_BIT_DST[9:0] or WCNT[9:0] | | | | | (a) | | b | c | | | | RSRCB[3:0] | | | | RSRCA[3:0] | | | |
| | | | | | | | | | | | | | | | | | -or- PINDEX[10:2] | | | | | | | |
| ? | * | * | * | * | * | * | * | * | N_CNT[6:0] | | | MSG[3:0] | | | * | * | * | * | * | * | * | * | * | * |
| 31 | | | | | | | 22 | | | 16 | | | | | | | | | | | | | | 00 |

(a) RES0_SEL[1:0] (for CMPRN)
(b) 2 BIT (for CMPRN)
(c) RES1_SEL (for CMPRN)

(*) The interpretation of these bits is defined in Table 22 of page 94.
(?) Undefined but reserved for future special operations 1.6 Control Field Definitions

TABLE 16

Control Fields

| Signals | Function | Bits |
|---|---|---|
| WE[6:0] | These are the fixed-format signals which retire results (unless the pipeline is stalled); they are:<br>[0] SPECOP_EN: enables special ops as defined in 9.2.5.<br>[1] BRANCH_EN: Enables a conditional program flow control operation<br>[2] PMEM_WE: Enables stores into PMEM<br>[3] reserved<br>[4] CC_WE: Enables store to CC_Z, CC_CY, CC_SZ, CC_V, CC_N<br>[5] RESVEC_WE: Enables stores to the result bit vector<br>[6] REG_WE: Enables stores of ALU_OUT into the GPREG file if(RDST[3] = 0), or into SPREG's if(RDST[3] = 1). | [63:57] |
| RSRCA[3:0] | Selects a GPREG to drive out on DOUT0 (using [2:0]) and selects between GPREG and SPREG sources on the mux to SPLIT-ADD and MASK using [3] | [35:32] |
| RSRCB[3:0] | Selects a GPREG to drive out on DOUT1 (using [2:0]) and selects between that and SPREG sources on the ALUB input mux | [39 36] |
| RDST[3:0] | Selects which GPREG to enable the WE onto with [2:0] if [3] == 0; and if [3] == 1, [2:0] is decoded to select which SPREG to write to. | [56:53] |
| ROT[4:0] | Steers the 32-bit barrel shifter | [50:46] |
| MSK[1] | If [1] then masking is enabled; if [0] then pass-thru | |
| MSK[0] | If [1] selects MASK/ROTATE output, if [0] selects SPLIT_ADD output, on ALUA input mux. | [51] |
| ALUOP[5:4] | [1x] selects ALUA input as ALU_OUT The reason for this is to enable a MOV from PMEM[index] with mask and rot; but we lose ALUOP due to bit overlays, so we can't use the ALU in the same instruction.<br>[00] selects ADDER output<br>[01] selects LOGIC output | [45:44] |
| ALUOP[3:0] | On LOGIC unit, these 4 bits are the mux inputs steered by the bit pairs. | [43:40] |
| ALUOP[1:0] | Selects CY_IN to ADDER:<br>[00] selects "0"<br>[01] selects "1" (for subtracts)<br>[1x] selects CC_REG_CY | [41:40] |
| ALUOP[2] | If '1', inverts ADDER input on the A port. | [42] |
| ALUOP[3] | If '1', inverts ADDER input on the B port. | [43] |
| IMMEDIATE | 32-bit immediate value used on ALUB input path; if (RDST == MEM_ADDR) then only bits [27:0] are used | [31:0] |
| MASK | 32-bit immediate value used in MASK and GANG_OP units for bit masking; AND'ed with the input value | [31:0] |
| PINDEX[10:2] | Used to address words in PMEM for MOV operations and for loading PCNT for sequential pmem operations. a.k.a. INDEX[8:0] | [44:36] |
| MEM_SIZE[1:0] | In LDST format, indicates the size to MEM_ADDR:<br>[00]: 1 word<br>[01]: 2 words (only aligned double-word allowed)<br>[10]: 4 words (aligned on a 16-byte boundary)<br>[11]: 8-word burst (aligned on an 8-word (32-byte) boundary)<br>Note that hardware masks the lower address bits to force size-alignment | [31:30] |
| MEM_DIR | In LDST format, [1] is a store, [0] is a load from memory | [29] |
| RES_BIT_SRC_A | Selects a bit of the 512-bit result vector; bit[9] is not connected, leaves room for | [41:32] |

TABLE 16-continued

Control Fields

| Signals | Function | Bits |
|---|---|---|
| [9:0] | future growth. Bits[8:5] select the word to port W0[31:0] on the file. Bits[4:0] select the bit within the word to port B0 | |
| RES_BIT_SRC_B [9:0] | Same as above, but to word W1 and bit B1. | [31:22] |
| RES_BIT_SRC_C [9:0] | Same as above, but to word W2 and bit B2. | [21:12] |
| RES_BIT_DST [9:0] | [9] is reserved for future growth. [8:5] are decoded to a row select, and [4:0] are decoded to a column select for enabling the bit write. | [56:47] |
| RES0_SEL[1:0] | Mux select for the DIN0 bit to RESVEC; [00]: CMPR_A [01]: RES_BIT0 [10]: RES_GANG [11]: COND_CODE as selected by {FALSE, CC_SEL[4:0]} | [46:45] |
| RES1_SEL | Mux select for the DIN1 bit to RESVEC, used if 2BIT is set; [0]: CMPR_B [1]: RES_BIT1 | [43] |
| 2BIT | Enables next-neighbor write to odd-numbered bits in RESVEC, for operations with two results (dbitop, cmprn) | [44] |
| BITOP_AB[3:0] | These bits are selected by {BIT1, BIT0} to provide arbitrary boolean functions on the bits: {00}->[01], {01}->[1], {10}->[2], {11}->[3] | [7:4] |
| GANG_OP[1] | Mux steering. '1'==AND, '0'==OR | [43] |
| GANG_OP[0] | Inverts result if '1' to create NAND or NOR | [42] |
| BRANCH[9:0] | If BRANCH condition passes, this is the signed relative branch offset in CMEM | [9:0] |
| CALL | Loads a copy of (PC+1) into the microstack; timed so that the address saved is one past the branch delay slot, and bumps microstack pointer | [31] |
| RET | Forces the contents of the microstack register into the PC reg and decrements the microstack pointer | [30] |
| BRANCH_REG | If '1', branch to REG_B output on a branch/call; if '0' branch to the immediate value | [29] |
| FALSE | If '1', invert the output of the CC_MUX | [27] |
| CC_SEL[4:0] | Selects a condition code bit for a branch decision | [26:22] |
| Special ops | Defined in "SPECOP bit assignments" on page 46 | |

2. Register Select Codes
2.1 A-Side Operands and Destination Registers

TABLE 17

Register Select Codes for Destinations and for A-side Sources

| REG[2:0] | REG[3] = 0, Src. or Dst. | REG[3] = 1, Dst. | REG[3] = 1, Src. |
|---|---|---|---|
| 0b000 | GPREG0 (g0) | NULL (discard) | CC_REG |
| 0b001 | GPREG1 (g1) | BASE_REG | BASE_REG |
| 0b010 | GPREG2 (g2) | DFIFO_W | DFIFO_R |
| 0b011 | GPREG3 (g3) | MEM_ADDR | BASE_REG_MSK |
| 0b100 | GPREG4 (g4) | | PMEM |
| 0b101 | GPREG5 (gS) | CEFADR | |
| 0b110 | GPREG6 (g6) | CESTART | |
| 0b111 | GPREG7 (g7) | CECNT | |

2.2 B-Side Operands

TABLE 18

Register Select Codes for B-side Sources

| REG[2:0] | REG[3] = 0 | REG[3] = 1 |
|---|---|---|
| 0b000 | GPREG0 (g0) | IMMEDIATE |
| 0b001 | GPREG1 (g1) | IMMED_ADDR[27:0] ([31:28] are 0x0) |
| 0b010 | GPREG2 (g2) | DURATION |
| 0b011 | GPREG3 (g3) | MEM_WAIT |
| 0b100 | GPREG4 (g4) | TIMER |
| 0b101 | GPREG5 (g5) | DIAG_REG |
| 0b110 | GPREG6 (g6) | |
| 0b111 | GPREG7 (g7) | RESVEC[1] |

[1] Indirect addressing of RESVEC: RESVEC accesses a word of the result vector pointed to by WCNT (which was loaded via a specop) and then autoincrements the index. After the RESVEC store to dfifo is completed a resvec_index_unlock must be executed to enable random access to RESVEC.

3. ALU and Logic Operations
3.1 Adder Op Codes

TABLE 19

ALUOP Bit Specifications for ADDER (ALUOP[4]=0)

| OPERATION | ALUOP[3:0] | <ALUop> Name |
|---|---|---|
| A + B | 0b0000 | ADD |
| A + B + CY | 0b0010 | ADC |
| A + B + 1 | 0b0001 | ADINC |
| A − B | 0b1001 | SUB |
| A − B − $\overline{CY}$ (A + $\overline{B}$ + CY) | 0b1010 | SUBB |
| A − B − 1 | 0b1000 | SBDEC |
| B − A | 0b0101 | SBR (Reverse) |
| B − A − 1 | 0b0100 | SBRDEC |
| B − A − $\overline{CY}$ ($\overline{A}$ + B + CY) | 0b0110 | SBRB |

3.2 Logic Op and BITOP Codes

TABLE 20

ALUOP Bit Specifications for LOGIC (ALUOP[4] = 1)

| OPERATION | ALUOP[3:0] | <ALUop> Name |
|---|---|---|
| AND | 0b1000 | AND |
| OR | 0b1110 | OR |
| XOR | 0b0110 | XOR |

TABLE 20-continued

ALUOP Bit Specifications for LOGIC (ALUOP[4] = 1)

| OPERATION | ALUOP[3:0] | <ALUop> Name |
|---|---|---|
| NAND | 0b0111 | NAND |
| NOR | 0b0001 | NOR |
| XNOR | 0b1001 | XNOR |
| INVERT_A | 0b0011 | INVA |
| INVERT_B | 0b0101 | INVB |
| PASS_A | 0b1100 | PASSA |
| PASS_B | 0b1010 | PASSB |
| ZERO | 0b0000 | ZERO |
| ONES | 0b1111 | ONES |
| A_AND_NOT_B | 0b0100 | AANDNB |
| B_AND_NOT_A | 0b0010 | BANDNA |
| B_OR_NOT_A | 0b1011 | BORNA |
| A_OR_NOT_B | 0b1101 | AORNB |

BITOP's and 32-bit Logic operations use the two operand bits as selects into a MUX which select among 4 bits provided in the instruction. The encoding for logic operations uses the value of each pair of operand bits {A,B} to select which bit of ALUOP[3:0] provides the result, When the logic operation is performed on bit operands from RESVEC the bits {bsrcb, bsrca} provide the same selection of bits from the BITOP field (that is, for bitopab we use {b1,b0} and for bitopac we use {b2,b0} as operands:

| Operand {b1,b0} or {b2,b0} (or bits of {opA,opB}) | {1,1} | {1,0} | {0,1} | {0,0} |
|---|---|---|---|---|
| BITOP (or ALUOP) bit selected as the result | BITOPAx[3] | BITOPAx[2] | BITOPAx[1] | BITOPAx[0] |

4. Condition Code Selects

Each of these values can be tested true or inverted based on bit "F" in the instruction.

TABLE 21

Condition Code MUX values

| CC_SEL | Bit | Notes |
|---|---|---|
| 0b00000 | TRUE | For unconditional branch |
| 0b00001 | CY | Last saved Carry (or a bypass of it if the preceeding instruction had CC_WE set) |
| 0b00010 | Z | Last saved Zero (or a bypass of it) |
| 0b00011 | N | Sign bit of last result (or a bypass of it) |
| 0b00100 | V | Signed overflow (CY^N) of last result (or a bypass of it) |
| 0b00101 | GT | CY && Z (unsigned Greater Than) |
| 0b00110 | LT | CY (unsigned Less Than) |
| 0b00111 | GE | CY \|\| Z (unsigned Greater Than or Equal) |
| 0b01000 | LE | CY \|\| Z (unsigned Less Than or Equal) |
| 0b01001 | SZ | STICKY_Z, set via a SPECOP. Each time CC_Z is written, this bit will clear if CC_Z_I is '0', otherwise it holds its previous value. |
| 0b01010 | RX_RING | RX Ring has at least one buffer for this CE |
| 0b01011 | RECLASS_RING | Reclassify Ring has at least one buffer for this CE |
| 0b01100 | PEND_RD_WAIT | There is a read pending for which some data has not yet arrived in DFIFO_R |
| 0b01101 | PEND_WR | DFIFO_W has at least one word in it |
| 0b01110 | PEND_ADDR | MEM_ADDR has at least one address in it |
| 0b01111 | RES_BIT | Selected bit of Result Vector (using bit2 (port C)) |

TABLE 21-continued

Condition Code MUX values

| CC_SEL | Bit | Notes |
|---|---|---|
| 0b10000 | MSG_IN_A | These are the message bits from the PP or AP to the microcode indicating that an action is to be taken (CTRL fill, hash insert or delete, etc). These are assigned by software convention. Note that when a BRANCH_cc is made on any of these bits the associated CCREG bit will clear when the branch is taken. |
| 0b10001 | MSG_IN_B | |
| 0b10010 | MSG_IN_C | |
| 0b10011 | MSG_IN_D | |
| 0b10100 | SGT | Z && N (Signed greater-than) |
| 0b10101 | SLT | Z && N (Signed less-than) |
| 0b10110 | SGE | Z \|\| N (Signed greater-than-or-equal) |
| 0b10111 | SLE | Z \|\| N (Signed less-than-or-equal) |
| 0b11000 | PEND_RD_DATA | At least one word is available in DFIFO_R |
| 0b11001 | MTCH_AORB | Any A- or B-side operand matched during a cmprn instruction |
| 0b11010 | MTCH_A | Any A-side operand matched during a cmprn instruction |
| 0b11011 | MTCH_B | Any B-side operand matched during a cmprn instruction |
| 0b11100 | MTCH_AANDB | Any 64-bit A-B pair operand matched during a cmprn instruction |

5. Special Operation Fields

These bits are enabled by SPECOP_EN.

TABLE 22

SPECOP bit assignments

| Bit | Name | Description |
|---|---|---|
| [0] | unlock_pcnt | Puts PCNT counter back into normal immediate-P-index mode |
| [1] | unlock_resvec_index | Puts RESVEC index counter back into normal immediate mode |
| [2] | inc_rx_index | Increments CE_CONS pointer in this CE's RX ring |
| [3] | inc_reclassify_index | Increments CE_CONS pointer in this CE's RECLASS ring |
| [4] | clear_hit | Clears CCREG[MTCH_A,MTCH_B, MTCH_AORB,MTCH_AANDB] |
| [5] | clear_duration | Sets the DURATION counter to 0x0 |
| [6] | reset_gpreg | Flash clear of GPREG[7:0] |
| [7] | reset_resvec0 | Flash clear of RESVEC[31:0]. Allows preservation of up to 32 global bit variables while clearing the rest |
| [8] | reset_resvec_15_1 | Flash clear of RESVEC[511:32] |
| [9] | setsz | Sets CC_REG[SZ] to '1' to start a chained-equality compare |
| [10] | do_cmem_fill | Triggers a CMEM fill sequence |
| [11] | halt | Sets CSR[HALT] and freezes the CE pipeline |
| [15:12] | set_msg[3:0] | Each bit sets one of the 4 MSG_OUT bits in CE_CSR |
| [24] | ld_ncnt | loads N-counter for CMPRN instruction |
| [25] | ld_bdst_cnt | loads BDST counter, sets RESVEC sequential mode (for CMPRN & resvec spills) |
| [26] | bdst_cnt_mode | '0' = count-by-2 for CMPRN, '1' = count-by-32 for resvec spill |

TABLE 22-continued

SPECOP bit assignments

| Bit | Name | Description |
|---|---|---|
| [27] | ld_pcnt | Writes either PINDEX[10:2] or REGB[10:2] into PCNT and sets PCNT autoincrement mode per PCNT_INC |
| [28] | pcnt_reg | With ld_pcnt, '0' = load with immediate, '1' = load from gpreg on B-side |
| [29] | pcnt_inc | With ld_pcnt, '1' = pcnt autoincrements, '0' = no increments |
| [30] | sleep | Freezes pipeline, sets CECSR[SLEEP], puts CMEM in power-down mode. Sleep mode persists until any of CECSR[RX_RING,RECLASS, MSG_IN[D:A]] causes a wakeup. |

6. Miscellany 6.1 Memory Scheduling Rules

A memory access is scheduled by writing the address/size/direction to the MEM_ADDR special register. The following rules apply to scheduling of memory accesses; violation of any of these rules will cause the pipeline to HALT with status of the cause of the error in the CE Control and Status Register (CECSR).

1) There must be at least one intervening instruction between a LD and use of the resulting data if no other read data is outstanding. A load followed by immediate consumption when the outstanding schedule is '0' will result in a deadlock.

2) A maximum of 16 slots of read data can be scheduled. A slot is a 2-word entry in DFIFO_R. A LD or LD2 consumes 1 slot, a LD4 consumes 2 slots, and a LD8 consumes 4 slots in DFIFO_R. The appropriate number of slots must be available before another {LD, LD2, LD4, LD8} is scheduled.

3) A maximum of 32 outstanding words of read data can be scheduled; data must be consumed to make room in DFFO_R before more can be scheduled.

4) Precisely the correct number of words of write data must be written to DFIFO_W prior to scheduling the store of that size.

6.2 Register Write-Use Rules

GPREG and RESVEC results can safely be accessed in the instruction after the data is written to them.

PCNT, WCNT, and NCNT are all loaded via use of a specop. They can safely be used immediately in the next instruction.

The specop unlock_pcnt takes effect immediately, so PMEM immediate index can safely be used in the next instruction. Likewise, specop unlock_resvec_index takes effect immediately, and random access to RESVEC can be used in the next instruction.

BASE_REG has a one-cycle write-use delay rule; if it is written to in instruction A, it cannot be used as a source operand in instruction A+1.

PMEM has a one cycle write-use delay rule for any particular address. If address addr is written to in instruction A, then addr may not be read in instruction A+1; however it is perfectly safe to read any other location in PMEM in cycle A+1.

Data written to special register NULL may not be read back because, well, it's gone, man.

6.3 PMEM Addressing

Packet Memory PMEM can be addressed by an immediate index provided in the microword, indirectly from the PCNT register, or indirectly with auto-increment of PCNT. Immediate indexing is the standard mode; use of PCNT is initiated with the Id_pcnt special operation, which also carries the mode bit pcnt_inc that can optionally be asserted. This special operation sets the state bits USE_PCNT and (optionally) PCNT_INC_MODE. USE_PCNT is cleared by the special operation uniock_pcnt.

PCNT can be loaded from an immediate value PINDEX provided in the Id_pcnt special operation, or from bits [10:2] of any GPREG specified in RSRCB if the specop bit pcnt_reg is set during the Id_pcnt.

6.4 Microstack

The microstack is written and the stack pointer is incremented every time a conditional CALL instruction succeeds. It is read and the stack pointer is decremented every time a conditional RET instruction succeeds. The address written is the address of the instruction following the delay slot of the call, since the delay slot is always executed. The microstack holds up to 8 entries. Calling to a depth greater than 8, or returning past the valid number of entries, causes a halt with a report of STACK_ERROR in the CECSR.

VI. Programming Model

This section describes the programming model and set of abstractions employed when creating an application for the NetBoost platform (i.e., the platform described in this patent application). An application on the NetBoost platform is to be considered a service, provided within the network, that may require direct knowledge or manipulation of network packets or frames. The programming model provides for direct access to low-level frame data, plus a set of library functions capable of reassembling low-level frame data into higher-layer messages or packets. In addition, the library contains functions capable of performing protocol operations on network or transport-layer messages.

An application developed for the NetBoost platform receives link-layer frames from an attached network interface, matches the frames against some set of selection criteria, and determines their disposition. Frame processing takes place as a sequence of serialized processing steps. Each step includes a classification and action phase. During the classification phase, frame data is compared against application-specified matching criteria called rules. When a rule's matching criteria evaluates true, its action portion specifies the disposition of the frame. Execution of the action portion constitutes the action Phase. Only the actions of rules with true matching criteria are executed.

Implementing an application for the NetBoost platform involves partitioning the application into two modules. Modules are a grouping of application code destined to execute in a particular portion of the NetBoost platform. There are two modules required: the application processor (AP) module, and the policy engine (PE) module. Application code in the AP module runs on the host processor, and is most appropriate for processing not requiring wire-speed access to network frames. Application code for the PE module comprises the set of classification rules written in the NetBoost Classification Language (NCL), and an accompanying set of compiled actions (C or C++ functions/objects). PE actions are able to manipulate network frames with minimal overhead, and are thus the appropriate mechanism for implementing fast and simple manipulation of frame data. The execution environment for PE action code is more restricted than that of AP code (no virtual memory or threads), but includes a library providing efficient implementation for common frame manipulation tasks (see Section VIII). A message passing facility allows for communication between PE action code and the AP module.

1. Application Structure

Figure 15:
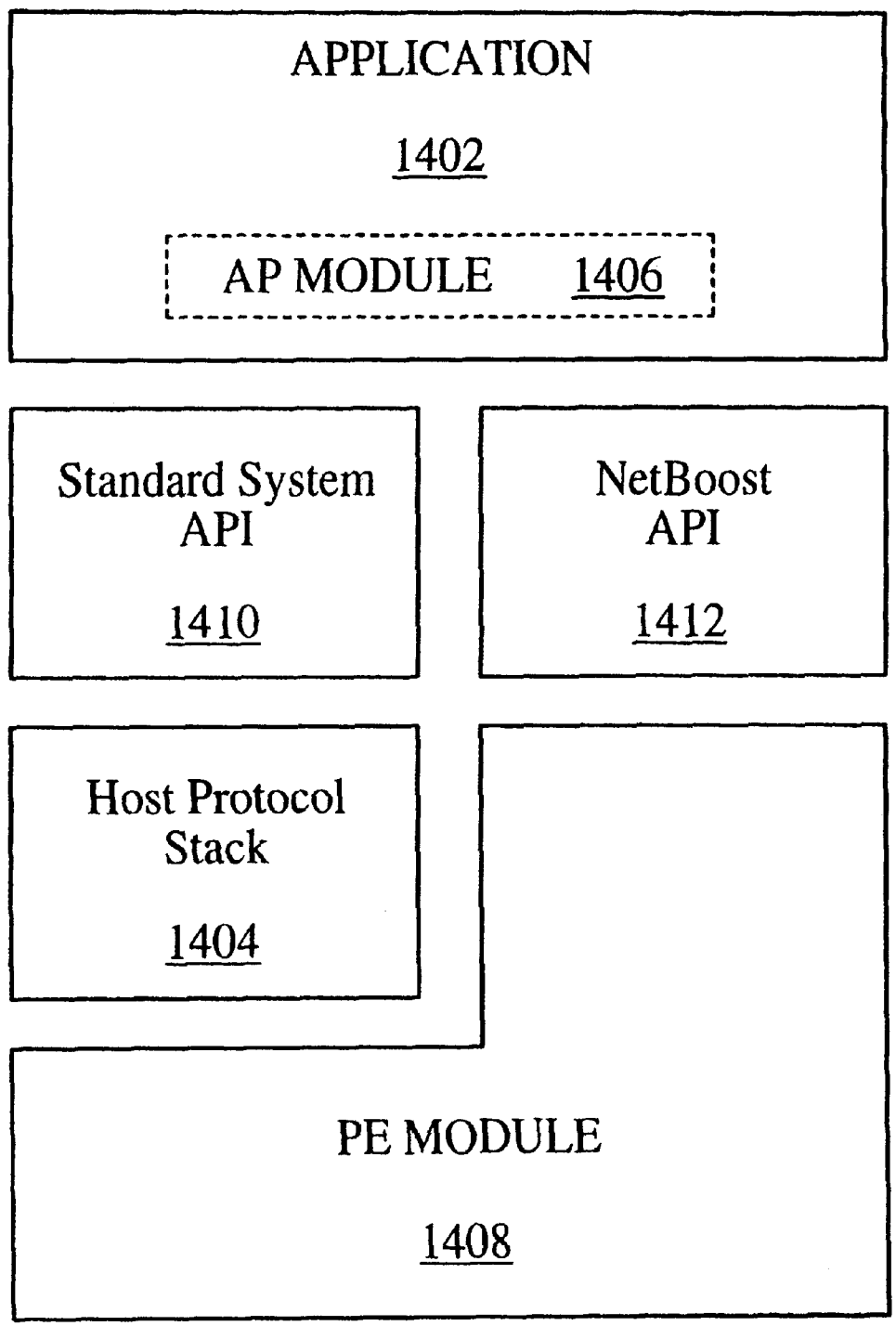
FIG. 15 is an application structure diagram related to the present invention.

FIG. 15 illustrates the NetBoost application structure.

Applications 1402 written for the NetBoost platform must be partitioned into the following modules and sub-modules, as illustrated in FIG. 15.

AP Module (—application processor (host) module) 1406

PE Module (—policy engine module) 1408

Classification rules—specified in NCL

Action implementation—object code provided by app developer

The AP module 1406 executes in the programming environment of a standard operating system and has access to all PEs 1408 available on the system, plus the conventional APIs implemented in the host operating system. Thus, the AP module 1406 has the capability of performing both frame-level processing (in conjunction with the PE), or traditional network processing using a standard API.

The PE 1408 module is subdivided into a set of classification rules and actions. Classification rules are specified in the NetBoost Classification Language (NCL) and are compiled on-the-fly by a fast incremental compiler provided by NetBoost. Actions are implemented as relocatable object code provided by the application developer. A dynamic linker/loader included with the NetBoost platform is capable of linking and loading the classification rules with the action implementations and loading these either into the host (software implementation) or hardware PE (hardware implementation) for execution.

The specific division of functionality between AP and PE modules 1406 and 1408 in an application is left entirely up to the application designer. Preferably, the AP module 1406 should be used to implement initialization and control, user interaction, exception handling, and infrequent processing of frames requiring special attention. The PE module 1408 preferably should implement simple processing on frames (possibly including the reconstruction of higher-layer messages) requiring extremely fast execution. PE action code runs in a run-to-completion real-time environment without memory protection, similar to an interrupt handler in most conventional operating systems. Thus, functions requiring lengthy processing times should be avoided, or executed in the AP module 1406. In addition, other functions may be loaded into the PE to support actions, asynchronous execution, timing, or other processing (such as upcalls/downcalls, below). All code loaded into the PE has access to the PE runtime environment, provided by the ASL.

The upcall/downcall facility provides for communication between PE actions and AP functions. An application may use upcalls/downcalls for sharing information or signaling between the two modules. The programmer may use the facility to pass memory blocks, frame contents, or other messages constructed by applications in a manner similar to asynchronous remote procedure calls.

2. Basic Building Blocks

This section describes the C++ classes needed to develop an application for the NetBoost platform. Two fundamental classes are used to abstract the classification and handling of network frames:

ACE, representing classification and action steps

Target, representing possible frame destinations

2.1 ACEs

The ACE class (short for Action-Classification-Engine) abstracts a set of frame classification criteria and associated actions, upcall/downcall entrypoints, and targets. They are simplex: frame processing is uni-directional. An application may make use of cascaded ACEs to achieve serialization of frame processing. ACEs are local to an application.

ACEs provide an abstraction of the execution of classification rules, plus a container for holding the rules and actions. ACEs are instantiated on particular hardware resources either by direct control of the application or by the plumber application.

Figure 16:
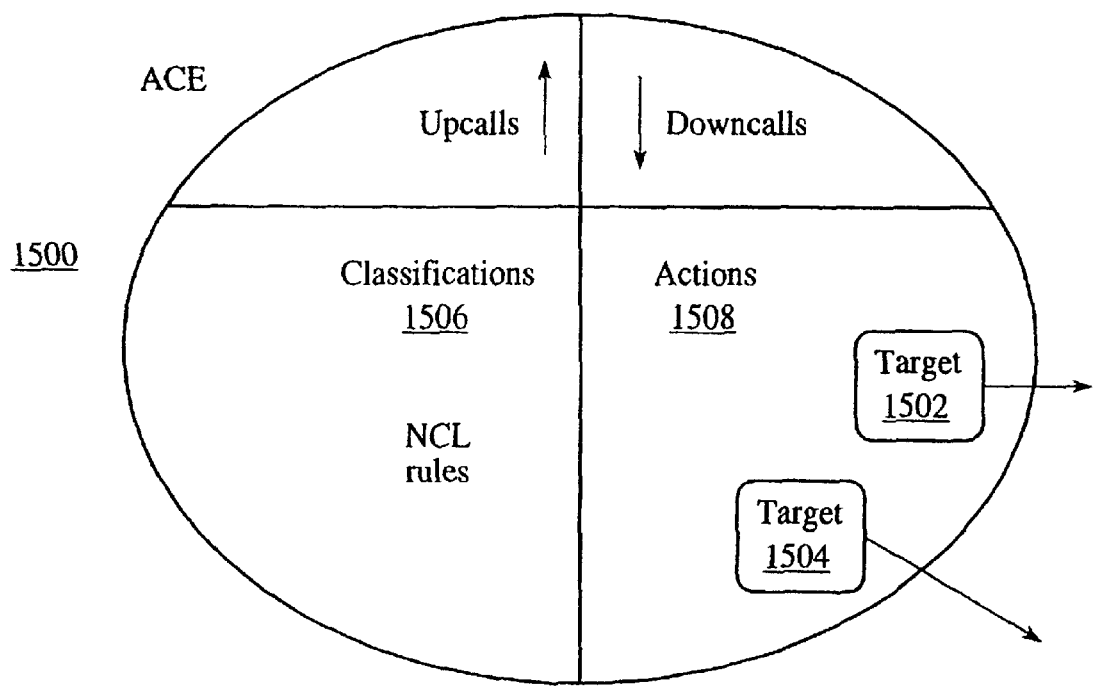
FIG. 16 is a diagram showing an Action Classification Engine (ACE) related to the present invention.

An ACE 1500 is illustrated in FIG. 16:

The ACE is the abstraction of frame classification rules 1506 and associated actions 1508, destinations for processed frames, and downcall/upcall entrypoints. An application may employ several ACEs, which are executed in a serial fashion, possibly on different hardware processors.

FIG. 16 illustrates an ACE with two targets 1502 and 1504. The targets represent possible destinations for frames and are described in the following section.

Frames arrive at an ACE from either a network interface or from an ACE. The ACE classifies the frame according its rules. A rule is a combination of a predicate and action. A rule is said to be "true" or to "evaluate true" or to be a "matching rule" if its predicate portion evaluates true in the Boolean sense for the current frame being processed. The action portion of each matching rule indicates what processing should take place.

The application programmer specifies rule predicates within an ACE using Boolean operators, packet header fields, constants, set membership queries, and other operations defined in the NetBoost Classification Language (NCL), a declarative language described in Section VII. A set of rules (an NCL program) may be loaded or unloaded from an ACE dynamically under application control. In certain embodiments, the application developer implements actions in a conventional high level language. Special external declaration statements in NCL indicate the names of actions supplied by the application developer to be called as the action portion for matching rules.

Actions are function entry-points implemented according to the calling conventions of the C programming language (static member functions in C++ classes are also supported). The execution environment for actions includes a C and C++ runtime environment with restricted standard libraries appropriate to the PE execution environment. In addition to the C environment, the ASL library provides added functionality for developing network applications. The ASL provides support for handling many TCP/IP functions such as IP fragmentation and re-assembly, Network Address Translation (NAT), and TCP connection monitoring (including stream reconstruction). The ASL also provides support for encryption and basic system services (e.g. timers, memory management).

During classification, rules are evaluated first-to-last. When a matching rule is encountered, its action executes and returns a value indicating whether it disposed of the frame. Disposing of a frame corresponds to taking the final desired action on the frame for a single classification step (e.g. dropping it, queueing it, or delivering it to a target). If an action executes but does not dispose of the current frame, it returns a code indicating the frame should undergo further rule evaluations in the current classification step. If any action disposes of the frame, the classification phase terminates. If all rules are evaluated without a disposing action, the frame is delivered to the default target of the ACE.

2.2 Targets

Targets specify possible destinations for frames (an ACE or network interface). A target is said to be bound to either an ACE or network interface (in the outgoing direction), otherwise it is unbound. Frames delivered to unbound targets are dropped. Target bindings are manipulated by a plumbing application in accordance with the present invention.

Figure 17:
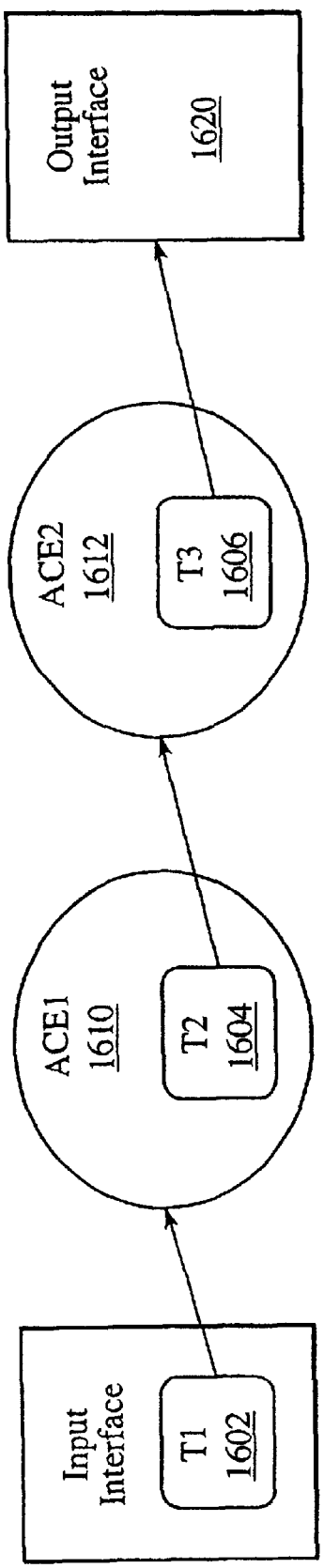
FIG. 17 shows a cascade of ACEs related to the present invention.

FIG. 17 shows a cascade of ACEs. ACEs use targets as frame destinations. Targets 1 and 2 (illustrated at 1602 and 1604) are bound to ACEs 1 and 2 (illustrated at 1610 and 1612), respectively. Target 3 (at 1606) is bound to a network interface (1620) in the outgoing direction. Processing occurs serially from left to right. Ovals indicate ACEs, hexagons indicate network interfaces. Outgoing arcs indicate bound targets. An ACE with multiple outgoing arcs indicates an ACE that performs a demultiplexing function: the set of outgoing arcs represent the set off all frame destinations in the ACE, across all actions. In this example, each ACE has a single destination (the default target). When several hardware resources are available for executing ACEs (e.g. in the case of the NetBoost hardware platform), ACEs may execute more efficiently (using pipelining). Note, however, that when one ACE has finished processing a frame, it is given to another ACE that may execute on the same hardware resource.

3. Complex Configurations

As described above, a single application may employ more than one ACE. Generally, processing bidirectional network data will require a minimum of two ACEs. Four ACEs may be a common configuration for a system providing two network interfaces and an application wishing to install ACEs at the input and output for each interface (e.g. in the NetBoost hardware environment with one PE).

Figure 18:
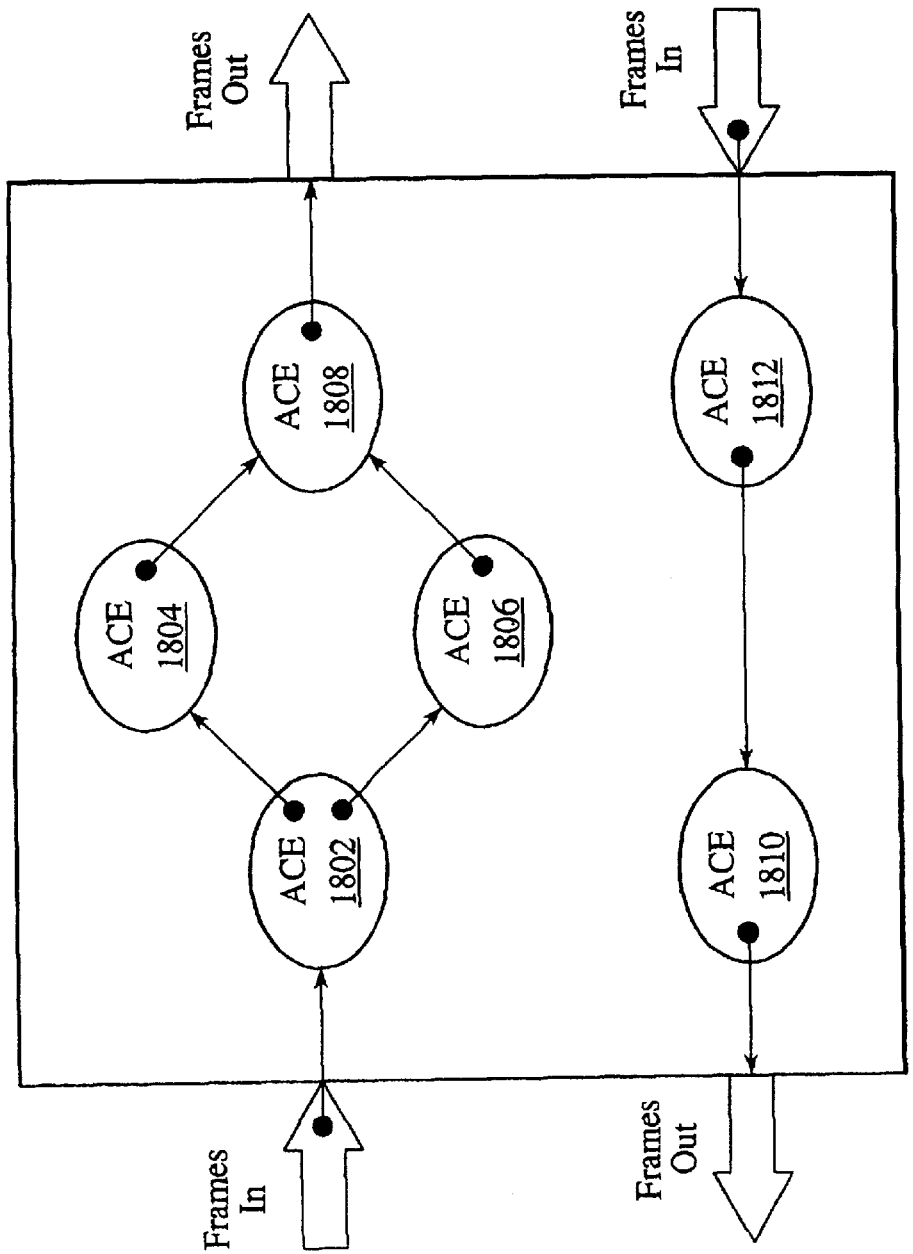
FIG. 18 shows a system architecture related to the present invention.

FIG. 18 illustrates an application employing six ACEs 1802, 1804, 1806, 1808, 1810 and 1812. Shaded circles represent targets. Two directions of processing are depicted, as well as an ACE with more than one output arc and an ACE with more than one input arc. The arcs represent possible destinations for frames.

An ACE depicted with more than one outgoing arc may represent the processing of a single frame, or in certain circumstances, the replication (copying) of a frame to be sent to more than one downstream ACE simultaneously. Frame replication is used in implementing broadcast and multicast forwarding (e.g. in layer 2 bridging and IP multicast forwarding). The interconnection of targets to downstream objects is typically performed by the plumber application described in the next section.

4. Software Architecture

Figure 19:
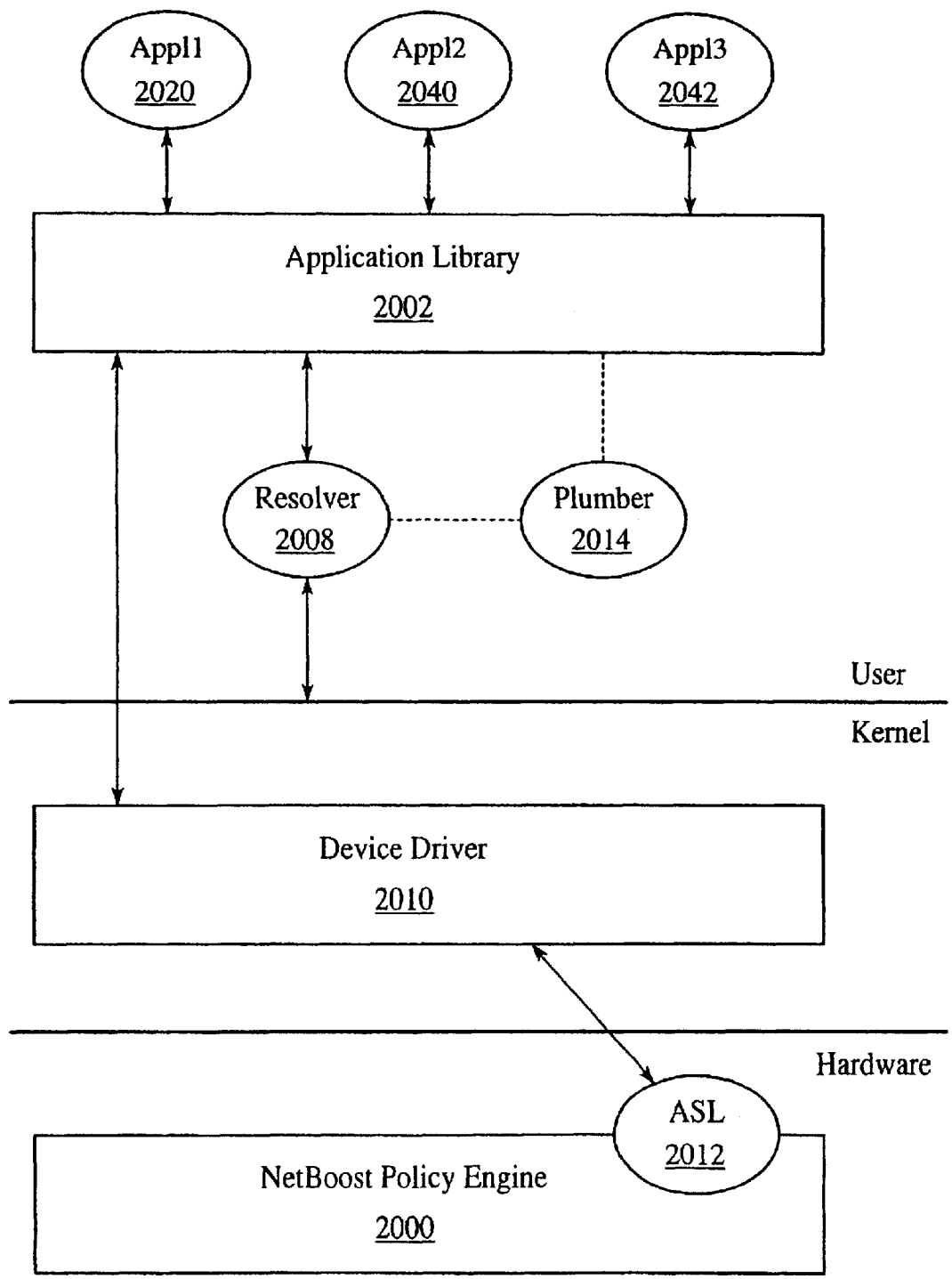
FIG. 19 shows an application deploying six ACEs related to the present invention.

This section describes the major components comprising the NetBoost software implementation. The software architecture provides for the execution of several applications performing frame-layer processing of network data, and includes user-level, kernel-level, and embedded processor-level components (for the hardware platform). The software architecture is illustrated FIG. 19.

The layers of software comprising the overall architecture are described bottom-up. The first layer is the NetBoost Policy Engine 2000 (PE). Each host system may be equipped with one or more PEs. In systems equipped with NetBoost hardware PEs, each PE will be equipped with several frame classifiers and a processor responsible for executing action code. For systems lacking the hardware PE, all PE functionality is implemented in software. The PE includes a set of C++ library functions comprising the Action Services Library (ASL) which may be used by action code in ACE rules to perform messaging, timer-driven event dispatch, network packet reassembly or other processing.

The PE interacts with the host system via a device driver 2010 and ASL 2012 supplied by NetBoost. The device driver is responsible for supporting maintenance operations to NetBoost PE cards. In addition, this driver is responsible for making the network interfaces supplied on NetBoost PE cards available to the host system as standard network interfaces. Also, specialized kernel code is inserted into the host's protocol stack to intercept frames prior to receipt by the host protocol stack (incoming) or transmission by conventional network interface cards (outgoing).

The Resolver 2008 is a user-level process started at boot time responsible for managing the status of all applications using the NetBoost facilities In addition, it includes the NCL compiler and PE linker/loader. The process responds to requests from applications to set up ACEs, bind targets, and perform other maintenance operations on the NetBoost hardware or software-emulated PE.

The Application Library 2002 (having application 1, 2& 3 shown at 2020, 2040, 2042) is a set of C++ classes providing the API to the NetBoost system It allows for the creation and configuration of ACEs, binding of targets, passing of messages to/from the PE, and the maintenance of the name-to-object bindings for objects which exist in both the AP and PE modules.

The plumber 2014 is a management application used to set up or modify the bindings of every ACE in the system (across all applications). It provides a network administrator the ability to specify the serial order of frame processing by binding ACE targets to subsequent ACEs. The plumber is built using a client/server architecture, allowing for both local and remote access to specify configuration control. All remote access is authenticated and encrypted.

VII. Classification Language

The NetBoost Classification Language (NCL) is a declarative high level language for defining packet filters. The language has six primary constructs: protocol definitions, predicates, sets, set searches, rules and external actions. Protocol definitions are organized in an object-oriented fashion and describe the position of protocol header fields in packets. Predicates are Boolean functions on protocol header fields and other predicates. Rules consist of a predicate/action pair having a predicate portion and an action portion where an action is invoked if its corresponding predicate is trae. Actions refer to procedure entrypoints implemented external to the language.

Individual packets are classified according to the predicate portions of the NCL rules. More than one rule may be true for any single packet classification. The action portion of rules with true predicates are invoked in the order the rules have been specified. Any of these actions invoked may indicate that no further actions are to be invoked. NCL provides a number of operators to access packet fields and execute comparisons of those fields. In addition, it provides a set abstraction, which can be used to determine containment relationships between packets and groups of defined objects (e.g. determining if a particular packet belongs to some TCP/IP flow or set of flows), providing the ability to keep persistent state in the classification process between packets.

Standard arithmetic, logical and bit-wise operators are supported and follow their equivalents in the C programming language. These operators provide operations on the fields of the protocols headers and result in scalar or Boolean values. An include directive allows for splitting NCL programs into several files.

1. Names and Data Types

The following definitions in NCL constants have names: protocols, predicates, fields, sets, searches on sets, and rules (defined later subsequent sections). A name is formed using any combination of alphanumeric characters and underscores except the first character must be an alphabetic character. Names are case sensitive. For example, set_tcp_udp IsIP isIPv6 set_udp_ports

The above examples are all legal names. The following examples are all illegal names:

6_byte_ip set_tcp+udp ip_src&dst

The first is illegal because it starts with a numeric character; the other two are illegal because they contain operators.

Protocol fields (see Section 6) are declared in byte-oriented units, and used in constructing protocols definitions. All values are big-endian. Fields specify the location and size of portions of a packet header. All offsets are relative to a particular protocol. In this way it is possible to specify a particular header field without knowing the absolute offset of the any particular protocol header. Mask and shift operations support the accessing of non-byte-sized header fields. For example, dst {ip[16:4]} ver {(ip[0:1] & 0xf0)>>4}

In the first line, the 4-byte field dst is specified as being at byte offset 16 from the beginning of the IP protocol header In the second example, the field ver is a half-byte sized field at the beginning of the IP header.

2. Operators

Arithmetic, logical and bit-wise binary operators are supported Table 23 lists the arithmetic operators and grouping operator supported:

TABLE 23

Arithmetic operators

| Operator | Description |
|---|---|
| ( ) | Grouping operator |
| + | Addition |
| - | Subtraction |
| << | Logical left shift |
| >> | Logical right shift |

The arithmetic operators result in scalar quantities, which are typically used for comparison. These operators may be used in field and predicate definitions. The shift operations do not support arithmetic shifts. The shift amount is a compile time constant. Multiplication, division and modulo operators are not supported. The addition and subtraction operations are not supported for fields greater than 4 bytes.

Logical operators are supported that result in Boolean values. Table 24 provides the logical operators that are supported by the language.

TABLE 24

Logical operators

| Operator | Description |
|---|---|
| && | Logical AND |
| \| \| | Logical OR |
| ! | Not |
| > | Greater Than |
| >= | Greater Than or Equal To |
| < | Less Than |
| <= | Less Than or Equal To |
| == | Equal To |
| != | Not Equal |

Bit-wise operators are provided for masking and setting of bits. The operators supported are as follows:

TABLE 25

Bit-wise operators

| Operators | Description |
|---|---|
| & | Bit-wise AND |
| \| | Bit-wise OR |
| ^ | Bit-wise Exclusive OR |
| ~ | Bit-wise One's Compliment |

The precedence and the associativity of all the operators listed above are shown in Table 26. The precedence is listed in decreasing order.

TABLE 26

Operator precedence

| Precedence | Operators | Associativity |
|---|---|---|
| High | ( )[ ] | Left to right |
| . | !~ | Right to left |
| . | +– | Left to right |
| . | << >> | Left to right |
| . | < <= > >= | Left to right |
| . | == != | Left to right |
| . | & | Left to right |
| . | ^ | Left to right |
| . | \| | Left to right |
| . | && | Left to right |
| Low | \|\| | Left to right |

3. Field Formats

The language supports several standard formats, and also domain specific formats, for constants, including the dotted-quad form for IP version 4 addresses and colon-separated hexadecimal for Ethernet and IP version 6 addresses, in addition to conventional decimal and hexadecimal constants Standard hexadecimal constants are defined as they are in the C language, with a leading 0x prefix.

For data smaller than 4 bytes in length, unsigned extension to 4 bytes is performed automatically. A few examples are as shown below:

TABLE 27

Constant formats

| 0x11223344 | Hexadecimal form |
|---|---|
| 101.230.135.45 | Dot separated IP address form |
| ff:12:34:56:78:9a | colon separated MAC address form |

4. Comments

C and C++ style comments are supported. One syntax supports multiple lines, the other supports comments terminating with a newline. The syntax for the first form follows the C language comment syntax using /* and */ to demark the start and end of a comment, respectively. The syntax for the second form follows the C++ comment syntax, using // to indicate the start of the comment. Such comments end at the end of the line. Nesting of comments is not allowed in the case of the first form. In the second case, everything is discarded to the end of the line, so nesting of the second form is allowed. Comments can occur anywhere in the program. A few examples of comments are shown below, ---
Diagram 1: Legal comments
---
```
/* Comment in a single line */
        // Second form of the comment:    compiler ignores to end-of-line
/* Comments across multiple line
    second line
third line */
        // Legal comment // still ignored to end-of-line
/*      First form       // Second form, but OK
*/
```
---

The examples above are all legal. The examples shown in Diagram 11 (below) are illegal.

---
Diagram 2: Illegal comments
---
```
/*              space */
/               new line
* Testing */
/*      Nesting   /*      Second level */
*/
//      space
/       new line
/
//      /* Nesting
*/
```
---

The first comment is illegal because of the space between / and *, and the second one because of the new-line. The third is illegal because of nesting. The fourth is illegal because of the space between the '/' chars and the next one because of the new-line. The last one is illegal because the /* is ignored, causing the */ to be in error of nesting of the first form of the comment in the second form.

5. Constant Definitions and Include Directives

The language provides user-definable symbolic constants. The syntax for the definition is the keyword #define, then the name followed by the constant. No spaces are allowed between # and define. The constant can be in any of the forms described in the next subsection of this patent application The definition can start at the beginning of a line or any other location on a line as long as the preceding characters are either spaces or tabs. For example, ---
Diagram 3: Sample of constant definition usage
---
```
#define     TELNET PORT_NUM    23     // Port number for telnet
    #define         IP_ADDR    10.4.7.18
#define     MAC_ADDR           cd.ee.f0.34.74.93
```
---

The language provides the ability to include files within the compilation unit so that pre-existing code can be reused. The keyword #include is used, followed by the filename enclosed in double quotes. The # must start on a new-line, but may have spaces immediately preceding the keyword. No space are allowed between # and the include. The filename is any legal filename supported by the host. For example, ---
Diagram 4: Sample include directives
---
```
#include    "myproto.def"      // Could be protocol definitions
    #include    "stdrules.rul"  // Some standard rules
#include    "newproto.def"      /* New protocol definitions */
```
---

6. Protocol Definitions

NCL provides a convenient method for describing the relationship between multiple protocols and the header fields they contain. A protocol defines fields within a protocol header, intrinsics (built-in functions helpful in processing headers and fields), predicates (Boolean functions on fields and other predicates), and the demultiplexing method to high-layer protocols. The keyword protocol identifies a protocol definition and its name. The name may later be referenced as a Boolean value which evaluates true if the protocol is activated (see 6.2). The declarations for fields, intrinsics and demultiplexing are contained in a protocol definition as illustrated below.

6.1 Fields

Fields within the protocol are declared by specifying a field name followed by the offset and field length in bytes. Offsets are always defined relative to a protocol. The base offset is specified by the protocol name, followed by colon separated offset and size enclosed in square brackets. This syntax is as shown below:

---
field_name{ protocol name[offset:size] }
---

Fields may be defined using a combination of byte ranges within the protocol header and shift/mask or grouping operations. The field definitions act as access methods to the areas within in the protocol header or payload. For example, fields within a protocol named MyProto might be specified as follows:

```
dest_addr      { MyProto[6:4] }
bit_flags      { (MyProto[10:2] & 0x0ff0) >> 8 }
```

In the first example, field dest_addr is declared as a field at offset 6 bytes from the start of the protocol MyProto and 4 bytes in size. In the second example, the field bit_flags is a bit field because it crosses a byte boundary, two bytes are used in conjunction with a mask and right shift operation to get the field value.

6.2 Intrinsics

Intrinsics are functions listed in a protocol statement, but implemented internally. Compiler-provided intrinsics are declared in the protocol definition (for consistency) using the keyword intrinsic followed by the intrinsic name. Intrinsics provide convenient or highly optimized functions that are not easily expressed using the standard language constructs. One such intrinsic is the IP checksum. Intrinsics may be declared within the scope of a protocol definition or outside, as in the following examples:

Diagram 5: Sample intrinsic declarations

```
protocol foo {
    _field defs_
    intrinsic chksumvalid { }
}
intrinsic now
```

The first example indicates chksumvalid intrinsic is associated with the protocol foo. Thus, the expression foo.chksumvalid could be used in the creation of predicates or expressions defined later. The second example indicates a global intrinsic called now that may be used anywhere within the program. Intrinsics can return Boolean and scalar values.

In a protocol definition, predicates are used to define frequently used Boolean results from the fields within the protocol being defined. They are identified by the keyword predicate. Predicates are described in section 7.

6.3 Demux

The keyword demux in each protocol statement indicates how demultiplexing should be performed to higher-layer protocols. In effect, it indicates which subsequent protocol is "activated", as a function of fields and predicates defined within the current set of activated protocols.

Evaluation of the Boolean expressions within a protocol demux statement determines which protocol is activated next. Within a demux statement, the first expression which evaluates to true indicates that the associated protocol is to be activated at a specified offset relative to the first byte of the present protocol. The starting offset of the protocol to be activated is specified using the keyword at. A default protocol may be specified using the keyword default. The first case of the demux to evaluate true indicates which protocol is activated next. All others are ignored. The syntax for the demux is as follows:

Diagram 6: Demux syntax sample

```
demux {
    boolean_exp { protocol_name at offset }
```

-continued

Diagram 6: Demux syntax sample

```
    default { protocol_name at offset }
}
```

Diagram 7 shows an example of the demux declaration

Diagram 7: Sample protocol demux

```
demux {
    (length == 10)         { proto_a at offset_a }
    (flags && predicate_x) { proto_b at offset_b }
    default                { proto_default at offset_default }
}
```

In the above example, protocol proto_a is "activated" at offset offset_a if the expression length equals ten. Protocol proto_b is activated at offset offset_b if flags is true, predicate x is true and length is not equal to 10. predicate x is a pre-defined Boolean expression. The default protocol is proto_default, which is defined here so that packets not matching the predefined criteria can be processed. The fields and predicates in a protocol are accessed by specifying the protocol and the field or predicate separated by the dot operator. This hierarchical naming model facilitates easy extension to new protocols. Consider the IP protocol example shown below.

Diagram 8: Protocol Sample: IP

```
protocol ip {
    vers             { (ip[0:1] & 0xf0) >> 4 }
    hlength          { ip[0:1] & 0x0f }
    hlength_b        { hlength << 2 }
    tos              { ip[1:1] }
    length           { ip[2:2] }
    id               { ip[4:2] }
    flags            { (ip[6:1] & 0xe0) >> 5 }
    fragoffset       { ip[6:2] & 0x1fff }
    ttl              { ip[8:1] }
    proto            { ip[9:1] }
    chksum           { ip[10:2] }
    src              { ip[12:4] }
    dst              { ip[16:4] }
    intrinsic chksumvalid    {}
    intrinsic genchksum {}
    predicate bcast          { dst == 255.255.255.255 }
    predicate mcast          { (dst & 0xf0000000) == 0xe0000000 }
    predicate frag           { fragoffset != || (flags & 2) != 0 }
    demux {
        ( proto == 6 )   { tcp at hlength_b }
        ( proto == 17 )  { udp at hlength_b }
        ( proto == 1 )   { icmp at hlength_b }
        ( proto == 2 )   { igmp at hlength_b }
        default          { unknownIP at hlength_b }
    }
}
```

Here, ip is the protocol name being defined. The protocol definition includes a number of fields which correspond to portions of the IP header comprising one or more bytes. The fields vers, hlength, flags and fragoffset have special operations that extract certain bits from the IP header.hlength_b holds the length of the header in bytes computed using the hlength field (which is in units of 32-bit words).

bcast,mcast, and fragarepredicates which may be useful in defining other rules or predicates. Predicates are defined in Section 7.

This protocol demuxes into four other protocols, excluding the default, under different conditions. In this example, the demultiplexing key is the protocol type specified by the of the IP proto field. All the protocols are activated at offset hlength_b relative to the start of the IP header.

When a protocol is activated due to the processing of a lower-layer demux statement, the activated protocol's name becomes a Boolean that evaluates true (it is otherwise false). Thus, if the IP protocol is activated, the expression ip will evaluate to a true Boolean expression. The fields and predicates in a protocol are accessed by specifying the protocol and the field, predicate or intrinsic separated by the dot operator. For example:

Diagram 9: Sample references ip.length
ip.bcast
ip.chksumvalid

Users can provide additional declarations for new fields, predicates and demux cases by extending previously-defined protocol elements. Any name conflicts will be resolved by using the newest definitions. This allows user-provided definitions to override system-supplied definitions updates and migration. The syntax for extensions is the protocol name followed by the new element separated by the dot (.) operator. Following the name is the definition enclosed in delimiters as illustrated below:

Diagram 10: Sample protocol extension xx.newfield { xx[10:4] }
predicate xx.newpred { xx[8:2] != 10 }
xx.demux {
    (xx[6:2] == 5 ) { newproto at 20 }
}

In the first example, a new field called newfield is declared for the protocol xx. In the second, a new predicate called newpred is defined for the protocol xx. In the third example, a new higher-layer protocol newproto is declared as a demultiplexing for the protocol xx. The root of the protocol hierarchy is the reserved protocol frame, which refers to the received data from the link-layer. The redefinition of the protocol frame is not allowed for any protocol definitions, but new protocol demux opertions can be added to it.

The intrinsics provided are listed in Table 28:

TABLE 28

List of intrinsics

| Intrinsic Name | Functionality |
|---|---|
| ip.chksumvalid | Check the validity of the ip header checksum, return boolean value |
| tcp.chksumvalid | Check the validity of the tcp pseudo checksum, return boolean value |
| udp.chksumvalid | Check the validity of udp pseudo checksum, return boolean value |

7. Predicates

Predicates are named Boolean expressions that use protocol header fields, other Boolean expressions, and previously-defined predicates as operands. The syntax for predicates is as follows:

predicate predicate_name {boolean_expression }

For example, predicate isTcpSyn {tcp && (tcp.flags & 0x02)!=0}
predicate isNewTelnet {isTcpSyn && (tcp.dport==23)}

In the second example, the predicate isTcpSyn is used in the expression to evaluate the predicate isNewTelnet.

8. Sets

The language supports the notion of sets and named searches on sets, which can be used to efficiently check whether a packet should be considered a member of some application-defined equivalence class. Using sets, classification rules requiring persistent state may be constructed. The classification language only supports the evaluation of set membership; modification to the contents of the sets are handled exclusively by actions in conjunction with the ASL. A named search defines a particular search on a set and its name may be used as a Boolean variable in subsequent Boolean expressions. Named searches are used to tie precomputed lookup results calculated in the classification phase to actions executing in the action phase.

A set is defined using the keyword set followed by an identifier specifying the name of the set. The number of keys for any search on the set is specified following the name, between < and >. A set definition may optionally include a hint as to the expected number of members of the set, specified using the keyword size_hint. The syntax is as follows:

Diagram 11: Declaring a set set set_name < nkeys > {
    size_hint { expected_population }
}

The size hint does not place a strict limit on the population of the set, but as the set size grows beyond the hint value, the search time may slowly increase.

Predicates and rules may perform named searches (see the following section for a discussion of rules). Named searches are specified using the keyword search followed by the search name and search keys. The search name consists of two parts: the name of the set to search, and the name of the search being defined. The keys may refer to arbitrary expressions, but typically refer to fields in protocols. The number of keys defined in the named search must match the number of keys defined for the set. The named search may be used in subsequent predicates as a Boolean values where "true" indicates a record is present in the associated set with the specified keys. An optional Boolean expression may be included in a named search using the requires keyword. If the Boolean expression fails to evaluate true, the search result is always "false". The syntax for named searches is as follows:

Diagram 12: Named search search set_name.search_name (key1, key2) {
    requires { boolean_expression }
}

Consider the following example defining a set of transport-layer protocol ports (tcp or udp):

---
Diagram 13: Sharing a set definition
---
```
#define MAX_TCP_UDP_PORTS_SET_SZ 200
/* TUPORTS: a set of TCP or UDP ports */
set tuports<1>, {
    size_hint { MAX_TCP_UDP_PORTS_SET_SZ }
}
search tuports.tcp_sport (tcp.sport)
search tuports.tcp_dport (tcp.dport)
search tuports.udp_sport (udp.sport)
search tuports.udp_dport (udp.dport)
```
---

This example illustrates how one set may be used by multiple searches. The set tuports might contain a collection of port numbers of interest for either protocol, TCP/IP or UDP/IP. The four named searches provide checks as to whether different TCP or UDP source or destination port numbers are present in the set. The results of named searches may be used as Boolean values in expressions, as illustrated below:

---
Diagram 14: Using shared sets
---
```
predicate tcp_sport_in {tuports.tcp_sport}
predicate tcp_port_in {tuports.tcp_sport && tuports.tcp_dport }
predicate udp_sdports_in {
    tuports.udp_sport | |tuports.udp_dport
}
```
---

In the first example, a predicate tcp_sport_in is defined to be the Boolean result of the named search tuports.tcp_sport, which determines whether or not the tcp.sport field (source port) of a TCP segment is in the set tuports. In the second example, both the source and destination ports of the TCP protocol header are searched using named searches. In the third case, membership of either the source or destination ports of a UDP datagram in the set is determined.

9. Rules and Actions

Rules are a named combination of a predicate and action. They are defined using the keyword rule. The predicate portion is a Boolean expression consisting of any combination of individual Boolean subexpressions or other predicate names. The Boolean value of a predicate name corresponds to the Boolean value of its associated predicate portion. The action portion specifies the name of the action which is to be invoked when the predicate portion evaluates "true" for the current frame. Actions are implemented external to the classifier and supplied by application developers. Arguments can be specified for the action function and may include predicates, named searches on sets, or results of intrinsic functions. The following illustrates the syntax:

---
Diagram 15: Rule syntax
---
```
rule rule_name { predicate } {
    external_action_func (arg1, arg2, ...)
}
```
---

The argument list defines the values passed to the action code executed externally to NCL. An arbitrary number of arguments are supported.

---
Diagram 16: Telnet/FTP example
---
```
set set_ip_tcp_ports <3> {
    size_hint { 100 }
}
set set_ip_udp_ports <3> {
    size_hint { 100 }
}
search set_ip_tcp_ports.tcp_dport ( ip.src, ip.dst, tcp.dport ) {
    requires {ip && tcp}
}
search set_ip_udp_ports.udp_dport ( ip.src, ip.dst, udp.dport ) {
    requires {ip && udp}
}
predicate ipValid { ip && ip.chksumvalid && (ip.hlen > 5) &&
    (ip.ver = = 4) }
predicate newtelnet { (tcp.flags & 0x02) && (tcp.dport == 23) }
predicate tftp { (udp.dport == 21) && set_ip_udp_ports.udp_ports }
rule telnetNewCon { ipValid && newtelnet && set_ip_tcp_ports.tcp_dport }
    { start_telnet ( set_ip_tcp_ports.tcp_dport) }
rule tftppkt {ipValid && tftp }
    { is_tftp_pkt ( udp.dport ) }
rule addnewtelnet { newtelnet }
    { add_to_tcp_pkt_count ( ) }
```
---

In the above example, two sets are defined. One contains source and destination IP addresses, plus TCP ports. The other set contains IP addresses and UDP ports. Two named searches are defined. The first search uses the IP source and destination addresses and the TCP destination port number as keys. The second search uses the IP source and destination addresses and UDP destination port as keys. The predicate ipValid checks to make sure the packet is an IP packet with valid checksum, has a header of acceptable size, and is IP version 4. The predicate newtelnet determines if the current TCP segment is a SYN packet destined for a telnet port. The predicate tftp determines if the UDP destination port corresponds to the TFTP port number and the combination of IP source and destination addresses and destination UDP port number is in the set ip_udp_ports. The rule telnetNewCon determines if the current segment is a new telnet connection, and specifies that the associated external function start_telnet will be invoked when this rule is true. The function takes the search result as argument. The rule tftppkt checks whether the packet belongs to a TFTP association. If so, the associated action is_tftp_pkt will be invoked with udp.dport as the argument. The third checks if the current segment is a new telnet connection and defines the associated action function add_to_tcp_pkt_count.

10. With Clauses

A with clause is a special directive providing for conditional execution of a group of rules or predicates. The syntax is as follows:

---
Diagram 17: With clause syntax sample
---
```
with boolean_expression {
    predicate pred_name { any_boolean_exp }
    rule rule_name { any_boolean_exp } { action_reference }
}
```
---

If the Boolean expression in the with clause evaluates false, all the enclosed predicates and rules evaluate false. For example, if we want to evaluate the validity of an IP datagram and use it in a set of predicates and rules, these can be encapsulated using the with clause and a conditional, which could be the checksum of the IP header. Nested with clauses are allowed, as illustrated in the following example:

---
Diagram 18: Nested with clauses
---
```
predicate tcpValid { tcp && tcp.chksumalid }
#define TELNET          23          // port number for telnet
with ipValid {
    predicate tftp              { (udp.dport == 21) &&
                                    ip_udp_ports.udp_dport }
    with tcpValid {    /* Nested with */
        predicate newtelnet      { (tcp.flags & 0x02) &&
                                    tcp.dport == TELNET }
        rule telnetNewCon { newtelnet && ip_tcp_ports.tcp_dport }
                          { start_telnet( ip_tcp_sport.tcp_dport) }
    }
    rule tftppkt { tftp && ip_udp_ports.udp_dport }
                 { is_tftp_pkt ( udp.dport ) }
}
```
---

11. Protocol Definitions for TCP/IP

The following NCL definitions are used for processing of TCP/IP and related protocols.

```
/*************************** FRAME (base unit) ***************************/
protocol frame {
// status words written by NetBoost Ethernet MACs
        rxstatus                { frame[0x180:4] }  // receive status
        rxstamp                 { frame[0x184:4] }  // receive time stamp
        txstatus                { frame[0x188:4] }  // xmit status (if sent out)
        txstamp                 { frame[0x18C:4] }  // xmit time stamp (if sent)
        predicate rxerror       { (rxstatus & 0x80000000) }
                  length        { (rxstatus & 0x07FF0000) >> 16 }  // frame len
                  source        { (rxstatus & 0x00000F00) >> 8 }   // hardware origin
                  offset        { (rxstatus & 0x000000FF) }        // start of frame
        predicate txok          { (txstatus & 0x80000000) != 0 }   // tx success
        demux {
                  rxerror       { frame_bad at 0 }
                  // source 0: NetBoost onboard MAC A ethernet packet
                  // source 1: NetBoost onboard MAC B ethernet packet
                  // source 2: Other rxstatus-encodable ethernet packet
                  (source < 3)  { ether at 0x180 + offset }
                  default       { frame_bad at 0 }
        }
}
protocol frame_bad {
}
/*********************** ETHERNET *********************************/
#define ETHER_IPTYPE0x0800
#define ETHER_ARPTYPE       0x0806
#define ETHER_RARPTYPE      0x8035
protocol ether {
        dst                     { ether[0:6] }      // source ethernet address
        src                     { ether[6:6] }      // destination ethernet address
        typelen                 { ether[12:2] }     // length or type, depends on encap
        snap        { ether[14:6] }                 // SNAP code if present
        type        { ether[20:2] }                 // type for 8023 encaps
        // We are only interested in a specific subset of the possible
        // 802.3 encapsulations; specifically, those where the 802.2 LLC area
        // contains DSAP=0xAA, SSAP=0xAA, and CNTL=0x03; followed by
        // the 802.2 SNAP ar3ea contains the ORG code 0x000000. In this
        // case, the 7802.2 SNAP "type" field contains one of our ETHER
        // type values defined above.
        predicate   issnap      { (typelen <= 1500) && (snap == 0xAAAA03000000) }
                    offset      { 14 + (issnap << 3) }
        demux {
                typelen == ETHER_ARPTYPE                    { arp at offset }
                typelen == ETHER_RARPTYPE                   { arp at offset }
                typelen == ETHER_IPTYPE                     { ip at offset }
                issnap && (type == ETHER_ARPTYPE)           { arp at offset }
```

```
            issnap && (type == ETHER_RARPTYPE)              { arp at offset }
            issnap && (type == ETHER_IPTYPE)                { ip at offset }
            default                                         { ether_bad at 0 }
        }
    }
}
protocol ether_bad {
}
/*************** ARP PROTOCOL *********************/
#define ARPHRD_ETHER           1    /* ethernet hardware format */
#define ARPHRD_FRELAY         15    /* frame relay hardware format */
#define ARPOP_REQUEST          1    /* request to resolve address */
#define ARPOP_REPLY            2    /* response to previous request */
#define ARPOP_REVREQUEST       3    /* request protocol address given hardware */
#define ARPOP_REVREPLY         4    /* response giving protocol address */
#define ARPOP_INVREQUEST       8    /* request to identify peer */
#define ARPOP_INVREPLY         9    /* response identifying peer */
protocol arp {
    htype       { arp[0:2] }
    ptype       { arp[2:2] }
    hsize       { arp[4:1] }
    psize       { arp[5:1] }
    op                          { arp[6:2] }
    varhdr                      { 8 }
    predicate   ethip4          { (op <= ARPOP_REVREPLY) && (htype == ARPHRD_ETHER) &&
                                  (ptype == ETHER_IPTYPE) && (hsize == 6) && (psize == 4) }
    demux {
        ethip4                  { ether_ip4_arp at varhdr }
        default                 { unimpl_arp at 0 }
    }
}
protocol unimpl_arp {
}
protocol ether_ip4_arp {
    shaddr                      { ether_ip4_arp[0:6] }
    spaddr                      { ether_ip4_arp[6:4] }
    thaddr      { ether_ip4_arp[10:6] }
    tpaddr      { ether_ip4_arp[16:4] }
}
/******************* IP v4 *********************/
protocol ip {
    verhl       { ip[0:1] }
            ver         { (verhl & 0xf0) >> 4 }
            hl          { (verhl & 0x0f) }
            hlen        { hl << 2 }
    tos                         { ip[1:1] }
    length      { ip[2:2] }
    id                          { ip[4:2] }
    ffo                         { ip[6:2] }
            flags       { (ffo & 0xe000) >> 13 }
            fragoff     { (ffo & 0x1fff) }
    ttl                         { ip[8:1] }
    proto       { ip[9:1] }
    cksum                       { ip[10:2] }
    src                         { ip[12:4] }
    dst                         { ip[16:4] }
    // varible length options start at offset 20
    predicate   dbcast          { dst == 255.255.255.255 }
    predicate   sbcast          { src == 255.255.255.255 }
    predicate   smcast          { (src & 0xF0000000) == 0xE0000000 }
    predicate   dmcast          { (dst & 0xF0000000) == 0xE0000000 }
    predicate   dontfr          { (flags & 2) != 0 }     // "do not fragment this packet"
    predicate   morefr          { (flags & 1) != 0 }     // "not last frag in datagram"
    predicate   isfrag          { morefr || fragoff }
    predicate   options         { hlen > 20 }
    intrinsic   chksumvalid     { }
    predicate   okhwlen         { (frame.length - ether.offset) >= length }
    predicate   invalid         { (ver != 4) || (hlen < 20) ||
                                  ((frame.length - ether.offset) < length) ||
                                  (length < hlen) || !chksumvalid }
    predicate   badsrc          { sbcast || smcast }
    demux {
        // Demux expressions are evaluated in order, and the
        // first one that matches causes a demux to the protocol;
        // once one matches, no further checks are made, so the
        // cases do not have to be precisely mutually exclusive.
        invalid                 { ip_bad at 0 }
        badsrc                  { ip_badsrc at 0 }
        (proto == 1)            { icmp at hlen }
        (proto == 2)            { igmp at hlen }
```

```
            (proto == 6)        { tcp at hlen }
            (proto == 17)       { udp at hlen }
            default             { ip_unknown_transport at hlen }
        }
}
protocol ip_bad {
}
protocol ip_badsrc {
}
protocol ip_unknown_transport {
}
/*********************** UDP ******************************/
protocol udp {
        sport           { udp[0:2] }
        dport           { udp[2:2] }
        length          { udp[4:2] }
        cksum               { udp[6:2] }
        intrinsic   chksumvalid         { } /* undefined if a frag */
        predicate   valid               {ip.isfrag || chksumvalid }
}
/*********************** TCP ******************************/
protocol tcp {
        sport           { tcp[0:2] }
        dport           { tcp[2:2] }
        seq                 { tcp[4:4] }
        ack                 { tcp[8:4] }
        hlf                 { tcp[12:2] }
                    hl      { (hlf & 0xf000) >> 12 }
                    hlen    { hl << 2 }
                    flags   { (hlf & 0x003f) }
        win                 { tcp[14:2] }
        cksum               { tcp[16:2] }
        urp                 { tcp[18:2] }
        intrinsic   chksumvalid         { } /* undefined if IP Fragment */
        predicate   valid               { ip.isfrag || ((hlen >= 20) && chksumvalid) }
        predicate   opt_present         { hlen > 20 }
}
/*********************** ICMP ******************************/
protocol icmp {
        type            { icmp[0:1] }
        code            { icmp[1:1] }
        cksum               { icmp[2:2] }
}
/*********************** IGMP ******************************/
protocol igmp {
        vertype             { igmp[0:1] }
                    ver     { (vertype & 0xf0) >> 4 }
                    type    { (vertype & 0x0f) }
        reserved            { igmp[1:1] }
        cksum               { igmp[2:2] }
        group       { igmp[4:4] }
}
```

VIII. ASL

The Application Services Library (ASL) provides a set of library functions available to action code that are useful for packet processing. The complete environment available to action code includes: the ASL; a restricted C/C++ library and runtime environment; one or more domain specific extensions such as TCP/IP.

The Restricted C/C++Libraries And Runtime Environment

Action code may be implemented in either the ANSI C or C++ programming languages. A library supporting most of the functions defined in the ANSI C and C++ libraries is provided. These libraries are customized for the NetBoost PE hardware environment, and as such differ slightly from their equivalents in a standard host operating system. Most notably, file operations are restricted to the standard error and output streams (which are mapped into upcalls).

In addition to the C and C++ libraries available to action code, NetBoost supplies a specialized C and C++ runtime initialization object module which sets up the C and C++ run-time environments by initializing the set of environment variables and, in the case of C++, executing constructors for static objects.

1. ASL Functions

The ASL contains class definitions of potential use to any action code executing in the PE. It includes memory allocation, management of API objects (ACEs, targets), upcall/downcall support, set manipulation, timers, and a namespace support facility. The components comprising the ASL library are as follows:

Basic Scalar Types

The library contains basic type definitions that include the number of bits represented. These include int8 (8 bit integers), int16 (16 bit integers), int32 (32 bit integers), and int64 (64 bit integers). In addition, unsigned values (uint8, uint16, uint32, uint64) are also supported.

Special Endian-Sensitive Scalar Types

The ASL is commonly used for manipulating the contents of packets which are generally in network byte order. The ASL provides type definitions similar to the basic scalar types, but which represent data in network byte order. Types in network byte order as declared in the same fashion as the basic scalar types but with a leading n prefix (e.g. nuint16 refers to an unsigned 16 bit quantity in network byte order).

The following functions are used to convert between the basic types (host order) and the network order types:

uint32 ntohl(nuint32 n); // network to host (32 bit)
uint16 ntohs(nuint16 n); // network to host (16 bit)
nuint32 htonl(uint32 h); // host to network (32 bit)
nuint16 htons(uint16 h); // host to network (16 bit)

Macros and Classes for Handling Errors and Exceptions in the ASL

The ASL contains a number of C/C++ macro definitions used to aid in debugging and code development (and mark fatal error conditions). These are listed below:

ASSERT Macros (asserts boolean expression, halts on failure)

CHECK Macros (asserts boolean, returns from current real-time loop on failure)

STUB Macros (gives message, c++file name and line number)

SHO Macros (used to monitor value of a variable/ expression during execution)

Exceptions

The ASL contains a number of functions available for use as exception handlers. Exceptions are a programming construct used to delivery error information up the call stack The following functions are provided for handling exceptions:

NBaction_err and NBaction_warn functions to be invoked when exceptions are thrown.

OnError class, used to invoke functions during exception handling, mostly for debugger breakpoints.

ACE Support

Ace objects in the ASL contain the per-Ace state information. To facilitate common operations, the base Ace class' pass and drop targets are provided by the base class and built when an Ace instance is constructed. If no write action is taken on a buffer that arrives at the Ace (i.e. none of the actions of matching rules indicates it took ownership), the buffer is sent to the pass target. The pass and drop functions (i.e. target take functions, below) may be used directly as actions within the NCL application description, or they may be called by other actions. Member functions of the Ace class include: pass( ), drop( ), enaRule( )—enable a rule, disRule( )—disable a rule.

Action Support:

The init_actions( ) call is the primary entry point into the application's Action code. It is used by the ASL startup code to initialize the PE portion of the Network Application. It is responsible for constructing an Ace object of the proper class, and typically does nothing else. Example syntax:

INITF init_actions(void* id, char* names Image* obj)

```
INITF init_actions(void* id, char* name, Image* obj)
{
        return new ExampleAce(id, name, obj);
}
```

The function should return a pointer to an object subclassed from the Ace class, or a NULL pointer if an Ace could not be constructed. Throwing an NBaction_err or NBaction_warn exception may also be appropriate and will be caught by the initialization code. Error conditions will be reported back to the Resolver as a failure to create the Ace.

Return Values from Action Code/Handlers

When a rule's action portion is invoked because the rule predication portion evaluated true, the action function must return a code indicating how processing should proceed. The action may return a code indicating it has disposed of the frame (ending the classification phase), or it may indicate it did not dispose of the frame, and further classification (rule evaluations) should continue. A final option available is for the action to return a defer code, indicating that it wishes to modify a frame, but that the frame is in use elsewhere. The return values are defined as C/C++ pre-processor definitions:

define RULE_DONE . . .

Actions should return RULE_DONE to terminate processing of rules and actions within the context of the current Ace; for instance, when a buffer has been sent to a target, or stored for later processing.

define RULE_CONT . . .

Actions should return RULE_CONT if they have merely observed the buffer and wish for additional rules and actions within the context of the current ace to be processed.

define RULE_DEFER . . .

Actions should return RULE_DEFER if they wish to modify a packet within a buffer but the buffer notes that the packet is currently busy elsewhere.

Predefined Actions

The common cases of disposing of a frame by either dropping it or sending it on to the next classification entity for processing is supported by two helper functions available to NCL code and result in calling the functions Ace::pass( ) or Ace::drop( ) within the ASL: action_pass (predefined action), passes frame to 'pass target', always returns RULE_DONE action_drop (predefined action), passes frame to 'drop target', always returns RULE_DONE User-Defined Actions Most often, user-defined actions are used in an Ace. Such actions are implemented with the following calling structure.

The ACTNF return type is used to set up linkage. Action handlers take two arguments: pointer to the current buffer being processed, and the Ace associated with this action. Example:

```
ACTNF do_mcast (Buffer *buf, ExAce *ace) {
    ace->mcast_ct ++;
    cout << ace->name( ) << ": " << ace->mcast_ct << endl;
    return ace->drop(buf);
}
```

Thus, the Buffer* and ExAce* types are passed to the handler. In this case, ExAce is derived from the base Ace class:

```
#include "NBaction/NBaction.h"
class ExAce : public Ace {
public:
    ExAce(ModuleId id, char *name, Image *obj)
    : Ace(id, name, obj), mcast_ct(0) { }
    int mcast_ct;
};
INITF init_actions(void *id, char *name, Image *obj) {
    return new ExAce(id, name, obj);
}
```

Buffer Management (Buffer Class)

The basic unit of processing in the ASL is the Buffer. All data received from the network is received in buffers, and all data to be transmitted must be properly formatted into buffers. Buffers are reference-counted. Contents are typed (more specifically, the type of the first header has a certain type [an integer/enumerated type]). Member functions of the Buffer class support common trimming operations (trim head, trim tail) plus additions (prepend and append date). Buffers are assigned a time stamp upon arrival and departure (if they are transmitted). The member function rxTime( ) returns receipt time stamp of the frame contained in the buffer. The txTime( ) gives transmission complete time stamp of the buffer if the frame it contains has been transmitted. Several additional member functions and operators are supported: new( )—allocates buffer from pool structure (see below), headerBase( )—location of first network header, headeroffset( )—reference to byte offset from start of storage to first network header, packetSize( )—number of bytes in frame, headerType( )—type of first header, packetPadHeadSize ( )—free space before net packet, packetPadTailSize ( )—free space after net packet, prepend( )—add data to beginning, append( )—add data to end, trim_head( )—remove data from head, trim_tail( )—remove data from end, {rx, tx} Time( )—see above, next( )—reference to next buffer on chain, incref( )—bump reference count, decref( )—decrement reference count, busy( )—indicates buffer being processed, log( )—allows for adding info the 'transaction log' of a buffer which can indicate what has processed it.

Targets

Target objects within an Ace indicate the next hardware or software resource that will classify a buffer along a selected path. Targets are bound to another Ace within the same application, an Ace within a different application, or a built in resource such as decryption. Bindings for Targets are set up by the plumber (see above). The class includes the member function take( ) which sends a buffer to the next downstream entity for classification.

Targets have an associated module and Ace (specified by a "ModuleId" object and an Ace*). They also have a name in the name space contained in the resolver, which associates Aces to applications.

Upcall

An upcall is a form of procedure call initiated in the PE module and handled in the AP module. Upcalls provide communication between the "inline" portion of an application and its "slower path" executing in the host environment. Within the ASL, the upcall facility sends messages to the AP. Messages are defined below. The upcall class contains the member function call( )—which takes objects of type Message* and sends them asynchronously to AP module.

DowncallHandler

A downcall is a form of procedure call initiated in the AP module and handled in the PE module. Downcalls provide the opposite direction of communication than upcalls. The class contains the member function direct( ) which provides a pointer to the member function of the Ace class that is to be invoked when the associated downcall is requested in the AP. The Ace member function pointed to takes a Message * type as argument.

Message

Messages contain zero, one, or two blocks of message data, which are independently constructed using the MessageBlock constructors (below). Uninitialized blocks will appear at the Upcall handler in the AP module as zero length messages. Member functions of the Message class include: msg1( ), msg2( ), len1( ), len2( )—returns addresses and lengths of the messages [if present]. Other member functions: clr1( ), clr2( ), done( )—acknowledge receipt of a message and free resources.

MessageBlock

The MessageBlock class is used to encapsulate a region of storage within the Policy Engine memory that will be used in a future Upcall Message. It also includes a method to be called when the service software has copied the data out of that storage and no longer needs it to be stable (and can allow it to be recycled). Constructor syntax is as follows:

MessageBlock(char *msg, int len=0, DoneFp done=0);
MessageBlock(Buffer *buf);
MessageBlock(int len, int off=0);

The first form specifies an existing data area to be used as the data source. If the completion callback function (DoneFp) is specified, it will be called when the data has been copied out of the source area. Otherwise, no callback is made and no special actions are taken after the data is copied out of the message block. If no length is specified, then the base pointer is assumed to point to a zero-terminated string; the length is calculated to include the null termination. The second form specifies a Buffer object; the data transferred is the data contained within the buffer, and the relative alignment of the data within the 32-bit word is retained. The reference count on the buffer is incremented when the MessageBlock is created, and the callback function is set to decrement the reference count when the copy out is complete. This will have the effect of marking the packet as "busy" for any actions that check for busy buffers, as well as preventing the buffer from being recycled before the copy out is complete. The third form requests that MessageBlock handle dynamic allocation of a region of memory large enough to hold a message of a specified size. Optionally, a second parameter can be specified that gives the offset from the 32-bit word alignment boundary where the data should start. The data block will retain this relative byte offset throughout its transfer to the Application Processor. This allows, for instance, allocating a 1514-byte data area with 2-byte offset, building an Ethernet frame within it, and having any IP headers included in the packet land properly aligned on 32-bit alignment boundaries.

Sets

Sets are an efficient way to track a large number of equivalence classes of packets, so that state can be kept for all packets that have the same values in specific fields. For instance, the programmer might wish to count the number of packets that flow between any two specific IP address pairs, or keep state for each TCP stream. Sets represent collections of individual members, each one of which matches buffers with a specific combination of field values. If the programmer instead wishes to form sets of the form "the set of all packets with IP header lengths greater than twenty bytes," then the present form of sets are not appropriate; instead, a Classification Predicate should be used.

In NCL, the only information available regarding a set is whether or not a set contained a record corresponding to a vector of search keys. Within the ASL, all other set operations are supported: searches, insertions, and removals. For searches conducted in the CE, the ASL provides access to additional information obtained during the search operation: specifically, a pointer to the actual element located (for successful searches), and other helpful information such as an insertion pointer (on failure). The actual elements stored in each set are of a class constructed by the compiler, or are of a class that the software vendor has subclassed from that class. The hardware environment places strict requirements on the alignment modulus and alignment offset for each set element.

As shown in the NCL specification, a single set may be searched by several vectors of keys, resulting in multiple search results that share the same target element records. Each of these directives results in the construction of a function that fills the key fields of the suitable Element subclass from a buffer.

Within the ASL, the class set is used to abstract a set. It serves as a base class for compiler generated classes specific to the sets specified in the NCL program (see below).

Search

The Search class is the data type returned by all set searching operations, whether provided directly by the ASL or executed within the classification engine. Member functions: ran( )—true if the CE executed this search on a set, hit( )—true if the CE found a match using this search, miss( )—inverse of hit( ) but can return a cookie making inserts faster, toElement( )—converts successful search result to underlying object, inserts—insert an object at the place the miss( ) function indicates we should.

Element

Contents of sets are called elements, and the NCL compiler generates a collection of specialized classes derived from the Element base class to contain user-specified data within set elements. Set elements may have an associated timeout value, indicating the maximum amount of time the set element should be maintained. After the time out is reached, the set element is automatically removed from the set. The time out facility is useful for monitoring network activity such as packet flows that should eventually be cleared due to inactivity.

Compiler_Generated Elt_<setname> Classes

For each set directive in the NCL program, the NCL compiler produces an adjusted subclassoftheElement class called Elt_<setname>, substituting the name of the set for <setname>. This class is used to define the type of elements of the specified set Because each set declaration contains the number of keys needed to search the set, this compiler-generated class is specialized from the element base class for the number of words of search key being used.

Compiler-Generated Set_<setname> Classes

For each set directive in the NCL program, the NCL compiler produces an adjusted subclass of the Element class called Set_<setname>, substituting the name of the set for <setname>. This class is used to define the lookup functions of the specified set. The NCL compiler uses the number of words of key information to customize the parameter list for the lookup function; the NCL size_hint is used to adjust a protected field within the class. Aces that needing to manipulate sets should include an object of the customized Set class as a member of their Ace.

Events

The Event class provides for execution of functions at arbitrary times in the future, with efficient rescheduling of the event and the ability to cancel an event without destroying the event marker itself. A calendar queue is used to implement the event mechanism. When constructing objects of the Event class, two optional parameters may be specified: the function to be called (which must be a member function of a class based on Event), and an initial scheduled time (how long in the future, expressed as a Time object). When both parameters are specified, the event's service function is set and the event is scheduled. If the Time parameter is not specified, the Event's service function is still set but the event is not scheduled. If the service function is not set, it is assumed that the event will be directed to a service function before it is scheduled in the future. Member functions of this class include: direct( )—specifies what function to be executed at expiry, schedule( )—indicates how far in the future for event to trigger, cancel( )—unschedule event, curr( )—get time of currently running event.

Rate

The Rate class provides a simple way to track event rates and bandwidths in order to watch for rates exceeding desired values. The Rate constructor allows the application to specify arbitrary sampling periods. The application can (optionally) specify how finely to divide the sampling period. Larger divisors result in more precise rate measurement but require more overhead, since the Rate object schedules Events for each of the shorter periods while there are events within the longer period. Member functions of this class include: clear( )—reset internal state, add( )—bumps event count, count( )—gives best estimate of current trailing rate of events over last/longer period Time The Time class provides a common format for carrying around a time value. Absolute, relative, and elapsed times are all handled identically. As conversions to and from int64 (a sixty-four bit unsigned integer value) are provided, all scalar operators are available for use; in addition, the assignment operators are explicitly provided. Various other classes use Time objects to specify absolute times and time intervals. For maximum future flexibility in selection of storage formats, the actual units of the scalar time value are not specified; instead, they are stored as a class variable. Extraction of meaningful data should be done via the appropriate access methods rather than by direct arithmetic on the Time object.

Class methods are available to construct Time objects for specified numbers of standard time units (microseconds, milliseconds, seconds, minutes, hours, days and weeks); also, methods are provided for extraction of those standard time periods from any Time object. Member functions include: curr( )—returns current real time, operators: +=, -=, *=, /=, %=, <<=, >>=, |=, ^=, &=, accessors+builders: usec( ), msec( ), secs( ), mins( ), hour( ), days( ), week( ), which access or build Time objects using the specified number of microseconds, milliseconds, seconds, minutes, hours, days, and weeks, respectively.

Memory Pool

The Pool class provides a mechanism for fast allocation of objects of fixed sizes at specified offsets from specified power-of-two alignments, restocking the raw memory resources from the PE module memory pool as required. The constructor creates an object that describes the contents of the memory pool and contains the configuration control information for how future allocations will be handled.

Special 'offset' and 'restock' parameters are used. The offset parameter allows allocation of classes where a specific member needs to be strongly aligned; for example, objects from the Buffer class contain an element called hard that must start at the beginning of a 2048-byte-aligned region. The restock parameter controls how much memory is allocated from the surrounding environment when the pool is empty. Enough memory is allocated to contain at least the requested number of objects, of the specified size, at the specified offset from the alignment modulus. Member function include: take( )—allocate a chunk, free( )—return a chunk to the pool.

Tagged Memory Pool

Objects that carry with them a reference back to the pool from which they were taken are called tagged. This is most useful for cases when the code that frees the object will not necessarily know what pool it came from. This class is similar to normal Memory Pools, except for internal details and the calling sequence for freeing objects back into the pool. The tagged class trades some additional space overhead for the flexibility of being able to free objects without knowing which Tagged pool they came from; this is similar to the overhead required by most C library malloc implementations. If the object has strong alignment requirements, the single added word of overhead could cause much space to be wasted between the objects. For instance, if the objects were 32 bytes long and were required to start on 32-byte boundaries, the additional word would cause another 28 bytes of padding to be wasted between adjacent objects.

The Tagged class adds a second (static) version of the take method, which is passed the size of the object to be allocated. The Tagged class manages an appropriate set of pools based on possible object sizes, grouping objects of similar size together to limit the number of pools and allow sharing of real memory between objects of slightly different sizes. Member functions include: take( )—allocate a chunk, free( )—return a chunk to the pool.

Dynamic

This class takes care of overloading the new and delete operators, redirecting the memory allocation to use a number of Tagged Pools managed by the NBACTION DLL. All classes derived from Dynamic share the same set of Tagged Pools; each pool handles a specific range of object sizes, and objects of similar sizes will share the same Tagged Pool. The dynamic class has no storage requirements and no virtual functions. Thus, declaring objects derived from Dynamic will not change the size or layout of your objects (just how they are allocated). Operators defined include: new( )—allocate object from underlying pool, delete( )—return to underlying pool.

Name Dictionary

The Name class keeps a database of named objects (that are arbitrary pointers in the memory address space of the ASL. It provides mechanisms for adding objects to the dictionary, finding objects by name, and removing them from the dictionary. It is implemented with a Patricia Tree (a structure often used in longest prefix match in routing table lookups). Member functions include: find( )—look up string, name( )—return name of dictionary.

2. ASL Extensions for TCP/IP

The TCP/IP Extensions to the Action Services Library (ASL) provides a set of class definitions designed to make several tasks common to TCP/IP-based network-oriented applications easier. With functions spanning several protocol layers, it includes operations such as IP fragment reassembly and TCP stream reconstruction. Note that many of the functions that handle Internet data make use of 16 and 32-bit data types beginning with 'n' (such as nuint16 and nuint32). These data types refer to data in network byte order (i.e. big endian). Functions used to convert between host and network byte such as htonl( ) (which converts a 32-bit word from host to network byte order), are also defined.

3. The Internet Class

Functions of potential use to any Internet application are grouped together as methods of the Internet class. These functions are declared static within the class, so that they may be used easily without requiring an instantiation of the Internet class.

Internet Checksum Support

The Internet Checksum is used extensively within the TCP/IP protocols to provide reasonably high assurance that data has been delivered correctly. In particular, it is used in IP (for headers), TCP and UDP (for headers and data), ICMP (for headers and data), and IGMP (for headers).

The Internet checksum is defined to be the 1's complement of the sum of a region of data, where the sum is computed using 16-bit words and 1's complement addition.

Computation of this checksum is documented in a number of RFCs (available from ftp://ds.internic.net/rfc): RFC 1936 describes a hardware implementation, RFC 1624 and RFC 1141 describe incremental updates, RFC 1071 describes a number of mathematical properties of the checksum and how to compute it quickly. RFC 1071 also includes a copy of IEN 45 (from 1978), which describes motivations for the design of the checksum.

The ASL provides the following functions to calculate Internet Checksums:

cksum

Description

Computes the Internet Checksum of the data specified. This function works properly for data aligned to any byte boundary, but may perform (significantly) better for 32-bit aligned data.

Syntax static nuint16 Internet::cksum(u_char* base, int len);

| Parameters | | |
| --- | --- | --- |
| Parameter | Type | Description |
| base | unsigned char* | The starting address of the data. |
| len | int | The number of bytes of data. |

Return Value

Returns the Internet Checksum in the same byte order as the underlying data, which is assumed to be in network byte order (big endian).

psum

Description

Computes the 2's-complement sum of a region of data taken as 16-bit words. The Internet Checksum for the specified data region may be generated by folding any carry bits above the low-order 16 bits and taking the 1's complement of the resulting value.

Syntax static uint32 Internet::psum(u_char* base, int len);

| Parameters | | |
| --- | --- | --- |
| Parameter | Type | Description |
| base | unsigned char* | The starting address of the data. |
| len | int | The number of bytes of data. |

Return Value

Returns the 2's-complement 32-bit sum of the data treated as an array of 16-bit words.

incrcksum

Description

Computes a new Internet Checksum incrementally. That is, a new checksum is computed given the original checksum for a region of data, a checksum for a block of data to be replaced, and a checksum of the new data replacing the old data. This function is especially useful when small regions of packets are modified and checksums must be updated appropriately (e.g. for decrementing IP ttl fields or rewriting address fields for NAT).

Syntax static uint16
   Internet::incrcksum(nuint16 ocksum, nuint16 odsum,
     nuint16 ndsum);

Parameters

| Parameter | Type | Description |
|---|---|---|
| ocksum | nuint16 | The original checksum. |
| odsum | nuint16 | The checksum of the old data. |
| ndsum | nuint16 | The checksum of the new (replacing) data. |

Return Value
　Returns the computed checksum.
asum
Description
　The function asum computes the checksum over only the IP source and destination addresses.
Syntax
static uint16 asum(IP4Header* hdr);

Parameters

| Parameter | Type | Description |
|---|---|---|
| hdr | IP4Header* | Pointer to the header. |

Return Value
　Returns the checksum.
apsum
Description
　The function apsum behaves like asum but includes the address plus the two 16-bit words immediately following the IP header (which are the port numbers for TCP and UDP).
Syntax
static uint16 apsum(IP4Header* hdr);

Parameters

| Parameter | Type | Description |
|---|---|---|
| hdr | IP4Header* | Pointer to the header. |

Return Value
　Returns the checksum.
apssum
Description
　The function apssum behaves like apsum, but covers the IP addresses, ports, plus TCP sequence number.
Syntax
static uint16 apssum(IP4Header* hdr);

Parameters

| Parameter | Type | Description |
|---|---|---|
| hdr | IP4Header* | Pointer to the header. |

Return Value
　Returns the checksum.
apasum
Description
　The function apasum is behaves like apssum, but covers the TCP ACK field instead of the sequence number field.

Syntax
static uint16 apasum(IP4Header* hdr);

Parameters

| Parameter | Type | Description |
|---|---|---|
| hdr | IP4Header* | Pointer to the header. |

Return Value
　Returns the checksum.
apsasum
Description
　The function apsasum behaves like apasum but covers the IP addresses, ports, plus the TCP ACK and sequence numbers.
Syntax
static uint16 apsasum(IP4Header* hdr);

Parameters

| Parameter | Type | Description |
|---|---|---|
| hdr | IP4Header* | Pointer to the header. |

Return Value
　Returns the checksum.

4. IP Support

This section describes the class definitions and constants used in processing IP-layer data. Generally, all data is stored in network byte order (big endian). Thus, care should be taken by the caller to ensure computations result in proper values when processing network byte ordered data on little endian machines (e.g. in the NetBoost software-only environment on pc-compatible architectures).

5. IP Addresses

The IP4Addr class defines 32-bit IP version 4 addresses.
Constructors
Description
　The class IP4Addr is the abstraction of an IP (version 4) address within the ASL. It has two constructors, allowing for the creation of the IPv4 addresses given an unsigned 32-bit word in either host or network byte order. In addition, the class is derived from nuint32, so P addresses may generally be treated as 32-bit integers in network byte order.
Syntax
IP4Addr(nuint32 an);
IP4Addr(uint32 ah);

Parameters

| Parameter | Type | Description |
|---|---|---|
| an | nuint32 | Unsigned 32-bit word in network byte order. |
| ah | uint32 | Unsigned 32-bit word in host byte order. |

Return Value
　None.

EXAMPLE

The following simple example illustrates the creation of addresses:
include "NBip.h"
uint32 myhaddr=(128<<24)(32<<16)|(12<<8)|4;
nuint32 mynaddr=htonl((128<<24)|(32<<16)|(12<<8)|4);

IP4Addr ip1(myhaddr);
IP4Addr ip2(mynaddr);
This example creates two IP4Addr objects, each of which refer to the IP address 128.32.12.4. Note the use of the htonl( ) ASL function to convert the host 32-bit word into network byte order.

6. IP Masks

Masks are often applied to IP addresses in order to determine network or subnet numbers, CIDR blocks, etc. The class IP4Mask is the ASL abstraction for a 32-bit mask, available to be applied to an IPv4 address (or for any other use).

Constructor
Description
   Instantiates the IP4Mask object with the mask specified.
Syntax
IP4Mask(nuint32 mn);
IP4Mask(uint32 mh);

Parameters

| Parameter | Type | Description |
| --- | --- | --- |
| mh | uint32 | 32-bit mask in host byte order |
| mn | nuint32 | 32-bit mask in network byte order |

Return Value
None.
leftcontig
Description
   Returns true if all of the 1-bits in the mask are left-contiguous, and returns false otherwise.

Syntax
bool leftcontig( );
Parameters
   None.
Return Value
   Returns true if all the 1-bits in the mask are left-contiguous.
bits
Description
   The function bits returns the number of left-contiguous 1-bits in the mask (a form of "population count").
Syntax
int bits( );
Parameters
   None.
Return Value
   Returns the number of left-contiguous bits in the mask. Returns −1 if the 1-bits in the mask are not left-contiguous.

EXAMPLE

```
#inlude NBip.h
uint32 mymask = 0xffffff80; // 255.255.255.128 or /25
IP4Mask ipm(mymask);
int nbits = ipm.bits( );
if (nbits >= 0) {
    sprintf(msgbuf, "Mask is of the form /%d", nbits);
} else {
    sprintf(msgbuf, "Mask is not left-contiguous!");
}
```

This example creates a subnet mask with 25 bits, and sets up a message buffer containing a string which describes the form of the mask (using the common "slash notation" for subnet masks).

7. IP Header

The IP4Header class defines the standard IP header, where sub-byte sized fields have been merged in order to reduce byte-order dependencies. In addition to the standard IP header, the class includes a number of methods for convenience. The class contains no virtual functions, and therefore pointers to the IP4Header class may be used to point to IP headers received in live network packets.

The class contains a number of member functions, some of which provide direct access to the header fields and others which provide computed values based on header fields. Members which return computed values are described individually; those functions which provide only simple access to fields are as follows:

| Function | Return Type | Description |
| --- | --- | --- |
| vhl( ) | nuint8& | Returns a reference to the byte containing the IP version and header length |
| tos( ) | nuint8& | Returns a reference to the IP type of service byte |
| len( ) | nuint16& | Returns a reference to the IP datagram (fragment) length in bytes |
| id( ) | nuint16& | Returns a reference to the IP identification field (used for fragmentation) |
| offset( ) | nuint16& | Returns a reference to the word containing fragmentation flags and fragment offset |
| ttl( ) | nuint8& | Returns a reference to the IP time-to-live byte |
| proto( ) | nuint8& | Returns a reference to the IP protocol byte |
| cksum( ) | nuint16& | Returns a reference to the IP checksum |
| src( ) | IP4Addr& | Returns a reference to the IP source address |
| dst( ) | IP4Addr& | Returns a reference to the IP destination address |

The following member functions of the IP4Header class provide convenient methods for accessing various information about an IP header.

optbase
Description
   Returns the location of the first IP option in the IP header (if present).
Syntax
unsigned char* optbase( );
Parameters
   None.
Return Value
   Returns the address of the first option present in the header. If no options are present, it returns the address of the first byte of the payload.

hl
Description
The first form of this function returns the number of 32-bit words in the IP header. The second form modifies the header length field to be equal to the specified length
Syntax
int hl( );
void hl(int h);

Parameters

| Parameter | Type | Description |
|---|---|---|
| h | int | Specifies the header length (in 32-bit words) to assign to the IP header |

Return Value
The first form of this function returns the number of 32-bit words in the IP header.
hlen
Description
The function hlen returns the number of bytes in the IP header (including options).
Syntax
int hlen( );
Parameters
None.
Return Value
Returns the number of bytes in the IP header including options.
ver
Description
The first form of this function ver returns the version field of the IP header (should be 4).
The second form assigns the version number to the IP header.
Syntax
int ver( );
void ver(int v);

Parameters

| Parameter | Type | Description |
|---|---|---|
| v | int | Specifies the version number. |

Return Value
The first form returns the version field of the IP header
payload
Description
The function payload returns the address of the first byte of data (beyond any options present).
Syntax
unsigned char* payload( );
Parameters
None.
Return Value
Returns the address of the first byte of payload data in the IP packet.
psum
Description
The function psum is used internally by the ASL library, but may be useful to some applications. It returns the 16-bit one's complement sum of the source and destination IP addresses plus 8-bit protocol field [in the low-order byte]. It is useful in computing pseudo-header checksums for UDP and TCP.

Syntax
uint32 psum( );
Parameters
None.
Return Value
Returns the 16-bit one's complement sum of the source and destination IP addresses plus the 8-bit protocol field.
Definitions
In addition to the IP header itself, a number of definitions are provided for manipulating fields of the IP header with specific semantic meanings

| Define | Value | Description |
|---|---|---|
| Fragmentation | | |
| IP_DF | 0x4000 | Don't fragment flag, RFC 791, p. 13. |
| IP_MF | 0x2000 | More fragments flag, RFC 791, p. 13. |
| IP_OFFMASK | 0x1FFF | Mask for determining the fragment offset from the IP header offset( ) function. |
| Limitations | | |
| IP_MAXPACKET | 65535 | Maximum IP datagram size. |

IP Service Type
The following table contains the definitions for IP type of service byte (not commonly used):

| Define | Value | Reference |
|---|---|---|
| IPTOS_LOWDELAY | 0x10 | RFC 791, p. 12. |
| IPTOS_THROUGHPUT | 0x08 | RFC 791, p. 12. |
| IPTOS_RELIABILITY | 0x04 | RFC 791, p. 12. |
| IPTOS_MINCOST | 0x02 | RFC 1349. |

IP Precedence
The following table contains the definitions for IP precedence. All are from RFC 791, p. 12 (not widely used).

| Define | Value |
|---|---|
| IPTOS_PREC_NETCONTROL | 0xE0 |
| IPTOS_PREC_INTERNETCONTROL | 0xC0 |
| IPTOS_PREC_CRITIC_ECP | 0xA0 |
| IPTOS_PREC_FLASHOVERRIDE | 0x80 |
| IPTOS_PREC_FLASH | 0x60 |
| IPTOS_PREC_IMMEDIATE | 0x40 |
| IPTOS_PREC_PRIORITY | 0x20 |
| IPTOS_PREC_ROUTINE | 0x00 |

Option Definitions
The following table contains the definitions for supporting IP options. All definitions are from RFC 791, pp. 15–23.

| Define | Value | Description |
|---|---|---|
| IPOPT_COPIED(o) | ((o)&0x80) | A macro which returns true if the option 'o' is to be copied upon fragmentation. |
| IPOPT_CLASS(o) | ((o)&0x60) | A macro giving the option class for the option 'o' |
| IPOPT_NUMBER(o) | ((o)&0x1F) | A macro giving the option number for the option 'o' |
| IPOPT_CONTROL | 0x00 | Control class |

-continued

| Define | Value | Description |
|---|---|---|
| IPOPT_RESERVED1 | 0x20 | Reserved |
| IPOPT_DEBMEAS | 0x40 | Debugging and/or measurement class |
| IPOPT_RESERVED2 | 0x60 | Reserved |
| IPOPT_EOL | 0 | End of option list. |
| IPOPT_NOP | 1 | No operation. |
| IPOPT_RR | 7 | Record packet route. |
| IPOPT_TS | 68 | Time stamp. |
| IPOPT_SECURITY | 130 | Provide s, c, h, tcc. |
| IPOPT_LSRR | 131 | Loose source route. |
| IPOPT_SATID | 136 | Satnet ID. |
| IPOPT_SSRR | 137 | Strict source route. |
| IPOPT_RA | 148 | Router alert. |

Options Field Offsets

The following table contains the offsets to fields in options other than EOL and NOP.

| Define | Value | Description |
|---|---|---|
| IPOPT_OPTVAL | 0 | Option ID. |
| IPOPT_OLEN | 1 | Option length. |
| IPOPT_OFFSET | 2 | Offset within option. |
| IPOPT_MINOFF | 4 | Minimum value of offset. |

7. Fragments and Datagrams

The IP protocol performs adaptation of its datagram size by an operation known as fragmentation. Fragmentation allows for an initial (large) IP datagram to be broken into a sequence of IP fragments, each of which is treated as an independent packet until they are received and reassembled at the original datagram's ultimate destination. Conventional IP routers never reassemble fragments but instead route them independently, leaving the destination host to reassemble them. In some circumstances, however, applications running on the NetBoost platform may wish to reassemble fragments themselves (e.g. to simulate the operation of the destination host).

8. IP Fragment class

Within the ASL, a fragment represents a single IP packet (containing an IP header), which may or not be a complete IP layer datagram. In addition, a datagram within the ASL represents a collection of fragments. A datagram (or fragment) is said to be complete if it represents or contains all the fragments necessary to represent an entire IP-layer datagram.

The IP4 Fragment class is defined as follows.

Constructors

Description

The IP4 Fragment class provides the abstraction of a single IP packet placed in an ASL buffer (see the description of the Buffer elsewhere in this chapter). It has two constructors intended for use by applications.

The first of these allows for specifying the buffer containing an IP fragment as the parameter bp. The location of the of the IP header within the buffer is the second argument. This is the most commonly-used constructor when processing IP fragments in ACE action code.

The second form of the constructor performs the same steps as the first form, but also allocates a new Buffer object and copies the IP header pointed to by iph into the new buffer (if specified). This form of the constructor is primarily intended for creation of IP fragments during IP datagram fragmentation. If the specified header contains IP options, only those options which are copied during fragmentation are copied.

Syntax

IP4Fragment(Buffer* bp, IP4Header* iph);
IP4Fragment(int maxiplen, IP4Header* protohdr=0);

| Parameters | | |
|---|---|---|
| Parameter | Type | Description |
| bp | Buffer* | The starting address of the buffer containing the IP fragment |
| maxiplen | int | The maximum size of the fragment being created; used to size the allocated Buffer. |
| protohdr | IP4Header* | The IP4 header to copy into the buffer, if provided. If the header contains IP options, only those options normally copied during fragmentation are copied. |

Return Value

None.

Destructor

Description

Frees the fragment.

Syntax

~IP4 Fragment( );

Parameters

None.

Return Value

None.

hdr

Description

The function hdr returns the address of the IP header of the fragment.

Syntax

IP4Header* hdr( );

Parameters

None.

Return Value

Returns the address of the IP4Header class at the beginning of the fragment.

payload

Description

The function payload returns the address of the first byte of data in the IP fragment (after the basic header and options).

Syntax u_char* payload( );

Parameters

None.

Return Value

Returns the address of the first byte of data in the IP fragment.

buf

Description

The function buf returns the address of the Buffer structure containing the IP fragment.

Syntax

Buffer* buf( );

Parameters

None.

Return Value

Returns the address of the Buffer structure containing the IP fragment. This may return NULL if there is no buffer associated with the fragment.

next

Description

Returns a reference to the pointer pointing to the next fragment of a doubly-linked list of fragments. This is used to link together fragments when they are reassembled (in Datagrams), or queued, etc. Typically, fragments are linked together in a doubly-linked list fashion with NULL pointers indicating the list endpoints.

Syntax

IP4 Fragment*& next( );

Parameters

None.

Return Value

Returns a reference to the internal linked-list pointer prev

Description

Like next, but returns a reference to pointer to the previous fragment on the list.

Syntax

IP4Fragment*& prev( );

Parameters

None.

Return Value

Returns a reference to the internal linked-list pointer.

first

Description

The function first returns true when the fragment represents the first fragment of a datagram.

Syntax bool first( );

Parameters

None.

Return Value

Returns true when the fragment represents the first fragment of a datagram.

fragment

Description

Fragments an IP datagram comprising a single fragment. The fragment( ) function allocates Buffer structures to hold the newly-formed IP fragments and links them together. It returns the head of the doubly-linked list of fragments. Each fragment in the list will be limited in size to at most the specified MTU size The original fragment is unaffected.

Syntax

IP4Datagram* fragment(int mtu);

| | | Parameters |
|---|---|---|
| Parameter | Type | Description |
| mtu | int | The maximum transmission unit MTU size limiting the maximum fragment size |

Returns a pointer to an IP4Datagram object containing a doubly-linked list of IP4Fragment objects Each fragment object is contained within a Buffer class allocated by the ASL library. The original fragment object (the one fragmented) is not freed by this function. The caller must free the original fragment when it is no longer needed.

complete

Description

The function complete returns true when the fragment represents a complete IP datagram.

Syntax bool complete( );

Parameters

None.

Return Value

Returns true when the fragment represents a complete IP datagram (that is, when the fragment offset field is zero and there are no additional fragments).

optcopy

Description

The static method opt copy is used to copy options from one header to another during IP fragmentation. The function will only copy those options that are supposed to be copied during fragmentation (i.e. for those options x where the macro IPOPT_COPIED(x) is non zero (true)).

Syntax
static int optcopy(IP4Header* src, IP4Header* dst);

Parameters

| Parameter | Type | Description |
|---|---|---|
| src | IP4Header* | Pointer to the source IP header containing options |
| dst | IP4Header* | Pointer to the destination, where the source header should be copied to |

Return Value
Returns the number of bytes of options present in the destination IP header.

9. IP Datagram Class

The class IP4Datagram represents a collection of P fragments, which may (or may not) represent a complete IP4 datagram. Note that objects of the class IP4Datagram include a doubly-linked list of IP4Fragment objects in sorted order (sorted by IP offset). When IP fragments are inserted into a datagram (in order to perform reassembly), coalescing of data between fragments is not performed automatically. Thus, although the IP4Datagram object may easily determine whether it contains a complete set of fragments, it does not automatically reconstruct a contiguous buffer of the original datagram's contents for the caller.

This class supports the fragmentation, reassembly, and grouping of IP fragments. The IP4Datagram class is defined as follows:

Constructors
Description
The class has two constructors.
The first form of the constructor is used when creating a fresh datagram (typically for starting the process of reassembly).
The second form is useful when an existing list of fragments are to be placed into the datagram immediately at its creation.

Syntax
IP4Datagram( );
IP4Datagram(IP4Fragment* frag);

Parameters

| Parameter | Type | Description |
|---|---|---|
| frag | IP4Fragment* | Pointer to a doubly linked list of fragments used to create the datagram object |

Return Value
None.

Destructor
Description
The destructor calls the destructors for each of the fragments comprising the datagram and frees the datagram object.

len
Description
The len function returns the entire length (in bytes) of the datagram, including all of its comprising fragments. Its value is only meaningful if the datagram is complete.

Syntax
int len( );

Parameters
None.

Return Value
Returns the length of the entire datagram (in bytes). If the datagram contains multiple fragments, only the size of the first fragment header is included in this value.

fragment
Description
The fragment function breaks an IP datagram into a series of IP fragments, each of which will fit in the packet size specified by mtu. Its behavior is equivalent to the IP4 Fragment: fragment (int mtu) function described previously.

Syntax
IP4Datagram* fragment(int mtu);

Parameters
See IP4Fragment: fragment (int mtu) above.

Return Value
See IP4Fragment: fragment (int mtu) above.

insert
Description
The function insert inserts a fragment into the datagram. The function attempts to reassemble the overall datagram by checking the IP offset and ID fields.

Syntax
int insert(IP4Fragment* frag);

Parameters

| Parameter | Type | Description |
|---|---|---|
| frag | IP4Fragment* | Pointer to the fragment being inserted. |

Return Value

Because this function can fail/act in a large number of ways, the following definitions are provided to indicate the results of insertions that were attempted by the caller. The return value is a 32-bit word where each bit indicates a different error or unusual condition. The first definition below, IPD_INSERT_ERROR is set whenever any of the other conditions are encountered. This is an extensible list which may evolve to indicate new error conditions in future releases:

| Define | Description |
| --- | --- |
| IPD_INSERT_ERROR | 'Or' of all other error bits. |
| IPD_INSERT_OH | Head overlapped. |
| IPD_INSERT_OT | Tail overlapped. |
| IPD_INSERT_MISMATCH | Payload mismatch. |
| IPD_INSERT_CKFAIL | IP header checksum failed (if enabled) | nfrags
Description
The function nfrags returns the number of fragments currently present in the datagram.
Syntax
int nfrags( );
complete
Description
The function complete returns true when all fragments comprising the original datagram are present.
Syntax
bool complete( ),
Parameters
None.
Return Value
Returns a boolean value indicating when all fragments comprising the original datagram are present.
head
Description
The function head returns the address of the first IP fragment in the datagram's linked list of fragments.
Syntax
IP4Fragment* head( );
Parameters
None.
Return Value
Returns the address of the first IP fragment in the datagram's linked list of fragments.
10. UDP Support
The UDP protocol provides a best-effort datagram service. Due to its limited complexity, only the simple UDP header definitions are included here. Additional functions operating on several protocols (e.g. UDP and TCP NAT) are defined in subsequent sections.

11. UDP Header
The UDPHeader class defines the standard UDP header. It is defined in NBudp.h. In addition to the standard UDP header, the class includes a single method for convenience in accessing the payload portion of the UDP datagram. The class contains no virtual functions, and therefore pointers to the UDPHeader class may be used to point to UDP headers received in live network packets.

The class contains a number of member functions, most of which provide direct access to the header fields. A special payload function may be used to obtain a pointer immediately beyond the UDP header. The following table lists the functions providing direct access to the header fields:

| Function | Return Type | Description |
| --- | --- | --- |
| sport( ) | nuint16& | Returns a reference to the source UDP port number |
| dport( ) | nuint16& | Returns a reference to the destination UDP port number |
| len( ) | nuint16& | Returns a reference to the UDP length field |
| cksum( ) | nuint16& | Returns a reference to the UDP pseudoheader checksum. UDP checksums are optional; a value of all zero bits indicate no checksum is was computed. |

The following function provides convenient access to the payload portion of the datagram, and maintains consistency with other protocol headers (i.e. IP and TCP).
payload
Description
The function payload returns the address of the first byte of data (beyond the UDP header).
Syntax
unsigned char* payload( );
Parameters
None.
Return Value
Returns the address of the first byte of payload data in the UDP packet.
12. TCP Support
The TCP protocol provides a stateful connection-oriented stream service. The ASL provides the TCP-specific definitions, including the TCP header, plus a facility to monitor the content and progress of an active TCP flow as a third party (i.e. without having to be an endpoint). For address and port number translation of TCP, see the section on NAT in subsequent sections of this document.
13. TCP Sequence Numbers
TCP uses sequence numbers to keep track of an active data transfer. Each unit of data transfer is called a segment, and each segment contains a range of sequence numbers In TCP, sequence numbers are in byte units. If a TCP connection is open and data transfer is progressing from computer A to B, TCP segments will be flowing from A to B and acknowledgements will be flowing from B toward A. The acknowledgements indicate to the sender the amount of data the receiver has received. TCP is a bi-directional protocol, so that data may be flowing simultaneously from A to B and from B to A. In such cases, each segment (in both directions) contains data for one direction of the connection and acknowledgements for the other direction of the connection. Both sequence numbers (sending direction) and acknowledgement numbers (reverse direction) use TCP sequence numbers as the data type in the TCP header. TCP sequence numbers are 32-bit unsigned numbers that are allowed to wrap beyond 2^32-1. Within the ASL, a special class called TCPSeq defines this class and associated operators, so that objects of this type may be treated like ordinary scalar types (e.g. unsigned integers).

14. TCP Header

The TCPHeader class defines the standard TCP header. In addition to the standard TCP header, the class includes a set of methods for convenience in accessing the payload portion of the TCP stream. The class contains no virtual functions, and therefore pointers to the TCPHeader class may be used to point to TCP headers received in live network packets.

The class contains a number of member functions, most of which provide direct access to the header fields. A special payload function may be used to obtain a pointer immediately beyond the TCP header The following table lists the functions providing direct access to the header fields:

| Function | Return Type | Description |
|---|---|---|
| sport( ) | nuint16& | Returns a reference to the source TCP port number |
| dport( ) | nuint16& | Returns a reference to the destination TCP port number |
| seq( ) | TCPSeq& | Returns a reference to the TCP sequence number |
| ack( ) | TCPSeq& | Returns a reference to the TCP acknowledgement number |
| off( ) | nuint8 | Returns the number of 32-bit words in the TCP header (includes TCP options) |
| flags( ) | nuint8& | Returns a reference to the byte containing the 6 flags bits (and 2 reserved bits) |
| win( ) | nuint16& | Returns a reference to the window advertisement field (unscaled) |
| cksum( ) | nuint16& | Returns a reference to the TCP pseudoheader checksum. TCP checksums are not optional. |
| udp( ) | nuint16& | Returns a reference to the TCP urgent pointer field |

The following functions provides convenient access to other characteristics of the segment:

payload

Description

The function payload returns the address of the first byte of data (beyond the TCP header).

Syntax unsigned char* payload( );

Parameters

None.

Return Value

Returns the address of the first byte of payload data in the TCP packet.

window

Description

The function window returns the window advertisement contained in the segment, taking into account the use of TCP large windows (see RFC 1323).

Syntax uint32 window(int wshift)

| Parameters | | |
|---|---|---|
| Parameter | Type | Description |
| wshift | int | The "window shift value" (number of left-shift bit positions to scale window field) |

Return Value

Returns the receiver's advertised window in the segment (in bytes). This function is to be used when RFC1323-style window scaling is in use.

optbase

Description

The function optbase returns the address of the first option in the TCP header, if any are present. If no options are present, it returns the address of the first payload byte (which may be urgent data if the URG bit is set in the flags field).

Syntax u_char* optbase( )

Parameters

None.

Return Value

Returns the address of the first byte of data beyond the urgent pointer field of the TCP header.

hlen

Description

The first form of this function ver returns the TCP header length in bytes. The second form assigns the TCP header length to the number of bytes specified.

Syntax int hlen( );
void hlen(int bytes);

| Parameters | | |
|---|---|---|
| Parameter | Type | Description |
| bytes | int | Specifies the number of bytes present in the TCP header |

Return Value

The first form returns the number of bytes in the TCP header.

Definitions

In addition to the TCP header itself, a number of definitions are provided for manipulating options in TCP headers:

| Define | Value | Description |
| --- | --- | --- |
| TCP Options | | |
| TCPOPT_EOL | 0 | End of Option List |
| TCPOPT_NOP | 1 | No operation (used for padding) |
| TCPOPT_MAXSEG | 2 | Maximum segment size |
| TCPOPT_SACK_PERMITTED | 4 | Selective Acknowledgements available |
| TCPOPT_SACK | 5 | Selective Acknowledgements in this segment |
| TCPOPT_TIMESTAMP | 8 | Time stamps |
| TCPOPT_CC | 11 | for T/TCP (see RFC 1644) |
| TCPOPT_CCNEW | 12 | for T/TCP |
| TCPOPT_CCECHO | 13 | for T/TCP |

15. TCP Following

TCP operates as an 11-state finite state machine Most of the states are related to connection establishment and teardown. By following certain control bits in the TCP headers of segments passed along a connection, it is possible to infer the TCP state at each endpoint, and to monitor the data exchanged between the two endpoints.

Defines

The following definitions are for TCP state monitoring, and indicate states in the TCP finite state machine:

The TCPSegInfo Class

The TCPSegInfo class is a container class for TCP segments that have been queued during TCP stream reconstruction and may be read by applications (using the ReassemblyQueue::read function, defined below). When segments are queued, they are maintained in a doubly-linked list sorted by sequence number order. Note that the list may contain "holes". That is, it may contain segments that are not adjacent in the space of sequence numbers because some

| Define | Value | Description |
| --- | --- | --- |
| TCPS_CLOSED | 0 | Closed |
| TCPS_LISTEN | 1 | Listening for connection. |
| TCPS_SYN_SENT | 2 | Active open, have sent SYN. |
| TCPS_SYN_RECEIVED | 3 | Have sent and received SYN. |
| TCPS_ESTABLISHED | 4 | Established. |
| TCPS_CLOSE_WAIT | 5 | Received FIN, waiting for closed. |
| TCPS_FIN_WAIT_1 | 6 | Have closed, sent FIN. |
| TCPS_CLOSING | 7 | Closed exchanged FIN; awaiting FIN ACK. |
| TCPS_LAST_ACK | 8 | Had FIN and close; await FIN ACK. |
| TCPS_FIN_WAIT_2 | 9 | Have closed, FIN is acked. |
| TCPS_TIME_WAIT | 10 | In 2*MSL quiet wait after close. |
| TCPS_HAVERCVDSYN(s) | ((s) >= TCPS_SYN_RECEIVED) | True if state s indicates a SYN has been received |
| TCPS_HAVEESTABLISHED(s) | ((s) >= TCPS_ESTABLISHED) | True if state s indicates have established ever |
| TCPS_HAVERCVDFIN(s) | ((s) >= TCPS_TIME_WAIT) | True if state s indicates a FIN ever received |

Note 1: States less than TCPS_ESTABLISHED indicate connections not yet established.
Note 2: States greater than TCPS_CLOSE_WAIT are those where the user has closed.
Note 3: States greater than TCPS_CLOSE_WAIT and less than TCPS_FIN_WAIT_2 await ACK OF FIN.

Note 1: States less than TCPS_ESTABLISHED indicate connections not yet established.
Note 2: States greater than TCPS_CLOSE_WAIT are those where the user has closed.
Note 3: States greater than TCPS_CLOSE_WAIT and less than TCPS_FIN_WAIT_2 await ACK of FIN.

data is missing in between. In addition, because retransmitted TCP segments can potentially overlap one another's data areas, the starting and ending sequence number fields (start seq_ and endseq_) may not correspond to the starting sequence number The class contains the following fields, all of which are declared public:

| Field | Type | Description |
| --- | --- | --- |
| prev_ | TCPSegInfo* | Pointer to the next TCPSegInfo object of the forward linked list; NULL if no more |
| next_ | TCPSegInfo* | Pointer to the previous TCPSegInfo object of the reverse linked list; NULL if no previous segment exists |
| segment_ | IP4Datagram* | Pointer to the datagram containing the TCP segment |
| startseq_ | TCPSeq | The starting sequence number for the segment |
| endseq_ | TCPSeq | The ending sequence number for the segment |
| startbuf_ | u_char* | Pointer to the byte whose sequence number is specified by the startseq_ field |
| endbuf_ | u_char* | Pointer to the byte whose sequence number is specified by the endseq_ field |
| flags_ | uint32 | Flags field for the segment (reserved as of the EA2 release) |

The ReassemblyQueue Class

The ReassemblyQueue class is a container class used in reconstructing TCP streams from TCP segments that have been "snooped" on a TCP connection. This class contains a list of TCPSegInfo objects, each of which corresponds to a single TCP segment. The purpose of this class is not only to contain the segments, but to reassemble received segments as they arrive and present them in proper sequence number order for applications to read. Applications are generally able to read data on the connection in order, or to skip past some fixed amount of enqued data.

Constructor
Description

A ReassemblyQueue object is used internally by the TCP stream reconstruction facility, but may be useful to applications in generaly under some circumstances. It provides for reassembly of TCP streams based on sequence numbers contained in TCP segments. The constructor takes an argument specifying the next sequence number to expect. It is updated as additional segments are inserted into the object. If a segment is inserted which is not contiguous in sequence number space, it is considered "out of order" and is queued in the object until the "hole" (data between it and the previous in-sequence data) is filled.

Syntax
ReassemblyQueue(TCPSeq& rcvnxt)

| | | Parameters |
| --- | --- | --- |
| Parameter | Type | Description |
| rcvnxt | TCPSeq& | A reference to the next TCP sequence number to expect. The sequence number referred to by rcvnxt is updated by the add function (see below) to always indicate the next in-order TCP sequence number expected |

Return Value
    None.
Defines
    The following definitions are provided for insertion of TCP segments into a ReassemblyQueue object, and are used as return values for the add function defined below. Generally, acceptable conditions are indicated by bits in the low-order half-word, and suspicious or error conditions are indicated in the upper half-word.

| Define | Value | Description |
| --- | --- | --- |
| RQ_OK | 0x00000000 | Segment was non-overlapping and in-order |
| RQ_OUTORDER | 0x00000001 | Segment was out of order (didn't match next expected sequence number) |
| RQ_LOW_OLAP | 0x00000002 | Segment's sequence number was below next expected but segment extended past next expected |
| RQ_HIGH_OLAP | 0x00000004 | Segment's data overlapped another queued segment's data |
| RQ_DUP | 0x00000008 | Completely duplicate segment |
| RQ_BAD_HLEN | 0x00010000 | Bad header length (e.g. less than 5) |
| RQ_BAD_RSVD | 0x00020000 | Bad reserved field (reserved bits are non-zero) |
| RQ_FLAGS_ALERT | 0x00040000 | Suspicious combination of flags (e.g. RST on or all on, etc) |
| RQ_FLAGS_BADURP | 0x00080000 | Bad urgent pointer | add
Description
    The add function inserts an IP datagram or complete IP fragment containing a TCP segment into the reassembly queue. The TCP sequence number referenced by rcvnxt in the constructor is updated to reflect the next in-sequence sequence number expected.
Syntax
int add(IP4Datagram* dp, TCPSeq seq, uint32 dlen);
int add(IP4Fragment* fp, TCPSeq seq, uint32 dlen);

| | | Parameters |
| --- | --- | --- |
| Parameter | Type | Description |
| fp | IP4Fragment* | Pointer to an unfragmented IP fragment containing a TCP segment |
| dp | IP4Datagram* | A pointer to a complete IP datagram containing a TCP segment |
| seq | TCPSeq | Initial sequence number for the TCP segment |
| dlen | uint32 | Usable length of the TCP segment |

Return Value
    Returns a 32-bit integer with the possible values indicated above (definitions beginning with RQ_).

empty
Description
    The empty function returns true if the reassembly queue contains no segments.

Syntax
bool empty( )
Parameters
    None.
Return Value
    Returns true if the reassembly queue contains no segments.
clear
Description
    The clear function removes all queued segments from the reassembly queue and frees their storage.
Syntax
void clear( )
Parameters
    None.
Return Value
    None.
read
Description
    The read function provides application access to the contiguous data currently queued in the reassembly queue. The function returns a linked list of TCPSegInfo objects. The list is in order sorted by sequence number beginning with the first in-order sequence number and continues no further than the number of bytes specified by the caller. Note that the caller must inspect the value filled in by the call to determine how many byte worth of sequence number space is consumed by the linked list. This call removes the segments returned to the caller from the reassembly queue.

Syntax

TCPSegInfo* read(int& len);

Parameters

| Parameter | Type | Description |
| --- | --- | --- |
| len | int& | Contains the number of bytes worth of in-sequence data the application is interested in reading from the reassembly queue. The underlying integer is modified by this call to indicate the number of bytes actually covered by the list of segments returned. The call is guaranteed to ever return a larger number of bytes than requested. |

Return Value

Returns a pointer to the first TCPSegInfo object in a doubly-linked list of objects each of which point to TCP segments that are numerically adjacent in TCP sequence number space.

The TCPEndpoint Class

The TCPEndpoint class is the abstraction of a single endpoint of a TCP connection. In TCP, a connection is identified by a 4-tuple of two IP addresses and a two port numbers. Each endpoint is identified by a single IP address and port number. Thus, a TCP connection (or "session"—see below) actually comprises two endpoint objects. Each endpoint contains the TCP finite state machine state as well as a ReassemblyQueue object, used to contain queued data. The TCPEndpoint class is used internally by the TCPSession class below, but may be useful to applications in certain circumstances.

Constructor

Description

The TCPEndpoint class is created in an empty state and is unable to determine which endpoint of a connection it represents. The user should call the init function described below after object instantiation to begin use of the object.

Syntax

TCPEndpoint( )

Parameters

None.

Return Value

None.

Destructor

Description

Deletes all queued TCP segments and frees the object's memory.

Syntax

~TCPEndpoint( )

Parameters

None.

Return Value

None.

reset

Description

Resets the endpoint internal state to closed and clears any queued data.

Syntax

~TCPEndpoint( )

Parameters

None.

Return Value

None.

state

Description

Returns the current state in the TCP finite state machine associated with the TCP endpoint.

Syntax int state( )

Parameters

None.

Return Value

Returns an integer indicating the internal state according to the definitions given above (defines beginning with TCPS_)

init

Description

The init function provides initialization of a TCP endpoint object by specifying the P address and port number the endpoint is acting as. After this call has been made, subsequent processing of IP datagrams and fragments containing TCP segments (and ACKs) is accomplished by the process calls described below.

Syntax void init(IP4Addr* myaddr, uint16 myport);

Parameters

| Parameter | Type | Description |
| --- | --- | --- |
| myaddr | IP4Addr* | A pointer to the IP address identifying this TCP endpoint |
| myport | nuint16 | The port number (in network byte order) of port number identifying this TCP endpoint |

Return Value

None.

process

Description

The process function processes an incoming or outgoing TCP segment relative to the TCP endpoint object. The first form of the function operates on a datagram which must be complete; the second form operates on a fragment which must also be complete. Given that the TCPEndpoint object is not actually the literal endpoint of the TCP connection itself, it must infer state transitions at the literal endpoints based upon observed traffic. Thus, it must monitor both directions of the TCP connection to properly follow the state at each literal endpoint.

Syntax int process(IP4Datagram* pd);
int process(IP4Fragment* pf);

Parameters

| Parameter | Type | Description |
|---|---|---|
| pd | IP4Datagram* | A pointer to a complete IP datagram containing a TCP segment |
| pf | IP4Fragment* | Pointer to an unfragmented IP fragment containing a TCP segment |

Return Value

Returns a 32-bit integer with the same semantics defined for ReassemblyQueue::add (see above).

The TCPSession Class

The TCPSession class is the abstraction of a complete, bidirectional TCP connection. It includes two TCP endpoint objects, which each include a reassembly queue. Thus, provided the TCPSession object is able to process all data sent on the connection in either direction it will have a reasonably complete picture of the progress and data exchanged across the connection.

Constructor

Description

The TCPSess ion object is created by the caller when a TCP segment arrives on a new connection. The session object will infer from the contents of the segment which endpoint will be considered the client (the active opener—generally the sender of the first SYN), and which will be considered the server (the passive opener—generally the sender of the first SYN+ACK). In circumstances of simultaneous active opens (a rare case when both endpoints send SYN packets), the notion of client and server is not well defined, but the session object will behave as though the sender of the first SYN received by the session object is the client. In any case, the terms client and server are only loosely defined and do not affect the proper operation of the object.

Syntax

TCPSession(IP4Datagram* dp);
TCPSession(IP4Fragment* fp);

Return Value

None.

Destructor

Description

Deletes all TCP segments queued and frees the object's memory

Syntax

~TCPSession( )

Parameters

None.

Return Value

None.

process

Description

The process function processes a TCP segment on the connection. The first form of the function operates on a datagram which must be complete; the second form operates on a fragment which must also be complete. This function operates by passing the datagram or fragment to each endpoint's process function.

Syntax int process(IP4Datagram* pd);
int process(IP4Fragment* pf);

Parameters

| Parameter | Type | Description |
|---|---|---|
| pd | IP4Datagram* | A pointer to a complete IP datagram containing the first TCP segment on the connection |
| pf | IP4Fragment* | Pointer to a complete IP fragment containing a the first TCP segment on the connection |

Parameters

| Parameter | Type | Description |
|---|---|---|
| pd | IP4Datagram* | A pointer to a complete IP datagram containing a TCP segment |
| pf | IP4Fragment* | Pointer to an unfragmented IP fragment containing a TCP segment |

Return Value

Returns a 32-bit integer with the same semantics defined for ReassemblyQueue::add (see above). The value returned will be the result of calling the add function of the reassembly queue object embedded in the endpoint object corresponding to the destination address and port of the received segment.

16. Network Address Translation (NAT)

Network Address Translation (NAT) refers to the general ability to modify various fields of different protocols so that the effective source, destination, or source and destination entities are replaced by an alternative. The definitions to perform NAT for the IP, UDP, and TCP protocols are defined within the ASL. The NAT implementation uses incremental checksum computation, so performance should not degrade in proportion to packet size.

17. IP NAT

IP address translation refers to the mapping of an IP datagram (fragment) with source and destination IP address (s1,d1) to the same datagram (fragment) with new address pair (s2, d2). A source-rewrite only modifies the source address (d1 is left equal to d2). A destination rewrite implies only the destination address is rewritten (s1 is left equal to s2). A source and destination rewrite refers to a change in both the source and destination IP addresses. Note that for IP NAT, only the IP source and/or destination addresses are rewritten (in addition to rewriting the IP header checksum). For traffic such as TCP or UDP, NAT functionality must include modification of the TCP or UDP pseudoheader checksum (which covers the IP header source and destination addresses plus protocol field). Properly performing NAT on TCP or UDP traffic, requires attention to these details.

18. IP NAT Base Class

The class IPNat provides a base class for other IP NAT classes. Because of the pure virtual function rewrite, applications will not create objects of type IP4Nat directly, but rather use the objects of typeIP4SNat, IP4DNat, and IP4SDNat defined below.

rewrite

Description

This pure-virtual function is defined in derived classes. It performs address rewriting in a specific fashion implemented by the specific derived classes (i.e. source, destination, or source/destination combination). The rewrite call, as applied to a fragment, only affects the given fragment. When applied to a datagram, each of the fragment headers comprising the datagram are re-written.

Syntax
virtual void rewrite(IP4Datagram*fp)=0;
virtual void rewrite(IP4Fragment*fp)=0;

Parameters

| Parameter | Type | Description |
|---|---|---|
| dp | IP4Datagram* | Pointer to the datagram to rewrite |
| fp | IP4Fragment* | Pointer to the single fragment to rewrite |

Return Value
None.

There are three classes available for implementing IP NAT, all of which are derived from the base class IP4Nat. The classes IP4SNat, IPDNat, and IPSDNat define the structure of objects implementing source, destination, and source/destination rewriting for IP datagrams and fragments.

19. IP4SNat Class

The IP4SNat class is derived from the IP4Nat class. It defines the class of objects implementing source rewriting for IP datagrams and fragments.
Constructor
Description
Instantiates the IP4 SNat object.
Syntax
IP4SNat (IP4Addr* newsrc);

Parameters

| Parameter | Type | Description |
|---|---|---|
| newsrc | IP4Addr* | Pointer to the new source address for IP NAT. |

Return Value
None.
rewrite
Description
Defines the pure virtual rewrite functions in the parent class.
Syntax
void rewrite(IP4Datagram* dp);
void rewrite(IP4Fragment* fp);

Parameters

| Parameter | Type | Description |
|---|---|---|
| dp | LP4Datagram* | Pointer to the datagram to be rewritten (all fragment headers are modified) |
| fp | IP4Fragment* | Pointer to the fragment to rewrite (only the single fragment header is modified) |

20. IP4DNat Class

The IP4DNat class is derived from the IP4Nat class. It defines the class of objects implementing destination rewriting for IP datagrams and fragments.

Constructor
Description
Instantiates the IP4DNat object.
Syntax
IP4DNat(IP4Addr* newdst);

Parameters

| Parameter | Type | Description |
|---|---|---|
| newdst | IP4Addr* | Pointer to the new destination address for IP NAT. |

Return Value
None.
rewrite
Description
Defines the pure virtual rewrite functions in the parent class.
Syntax
void rewrite(IP4Datagram* dp);
void rewrite(IP4Fragment* fp);

Parameters

| Parameter | Type | Description |
|---|---|---|
| dp | IP4Datagram* | Pointer to the datagram to be rewritten (all fragment headers are modified) |
| fp | IP4Fragment* | Pointer to the fragment to rewrite (only the single fragment header is modified) |

Return Value
None.

21. IP4SDNat Class

The IP4SDNat class is derived from the IP4Nat class. It defines the class of objects implementing source and destination rewriting for IP datagrams and fragments.

Constructor
Description
Instantiates the IP4SDNat object.
Syntax
IP4SDNat (IP4Addr* newsrc, IP4Addr* newdst);

Parameters

| Parameter | Type | Description |
|---|---|---|
| nesrc | IP4Addr* | Pointer to the new source address for IP NAT. |
| newdst | IP4Addr * | Pointer to the new destination address for IP NAT. |

Return Value
None.
rewrite
Description
Defines the pure virtual rewrite functions in the parent class.

Syntax
void rewrite(IP4Datagram* dp);
void rewrite(IP4Fragment* fp);

Parameters

| Parameter | Type | Description |
|---|---|---|
| dp | IP4Datagram* | Pointer to the datagram to be rewritten (all fragment headers are modified) |
| fp | IP4Fragment* | Pointer to the fragment to rewrite (only the single fragment header is modified) |

Return Value
None.

EXAMPLE

For fragments, only the single fragment is modified. For datagrams, all comprising fragments are updated. The following simple example illustrates the use of one of these objects:

Assuming ipa1 is an address we wish to place in the IP packet's destination address field, buf points to the ASL buffer containing an IP packet we wish to rewrite, and iph points the IP header of the packet contained in the buffer:
IPDNat *ipd=new IPDNat(&ipa1); // create IP DNat object
IP4Fragment ipf(buf, iph); // create IP fragment object
ipd->rewrite(&ipf); // rewrite fragment's header The use of other IP NAT objects follows a similar pattern.

22. UDP NAT

The organization of the UDP NAT classes follows the IP NAT classes very closely. The primary difference is in the handling of UDP ports. For UDP NAT, the optional rewriting of port numbers (in addition to IP layer addresses) is specified in the constructor.

23. UDPNat Base Class

The class UDPNat provides a base class for other UDP NAT classes. The constructor is given a value indicating whether port number rewriting is enabled. Because of the pure virtual function rewrite, applications will not create objects of type UDPNat directly, but rather use the objects of type UDPSNat, UDPDNat, and UDPSDNat defined below Constructor
Description
The constructor is given a value indicating whether port number rewriting is enabled.
Syntax
UDPNat(bool doports);

Parameters

| Parameter | Type | Description |
|---|---|---|
| doports | bool | Boolean value indicating whether the port number rewriting is enabled. A true value indicates port number rewriting is enabled. |

Return Value
None.
rewrite
Description
This pure-virtual function is defined in derived classes. It performs address rewriting in a specific fashion implemented by the specific derived classes (i.e. source, destination, or source/destination combination). The rewrite call, as applied to a fragment, only affects the given fragment. When applied to a datagram, each of the fragment headers comprising the datagram are re-written.

Syntax virtual void rewrite(IP4Datagram*fp)=0;
virtual void rewrite(IP4Fragment*fp)=0;

| Parameters | | |
|---|---|---|
| Parameter | Type | Description |
| dp | IP4Datagram* | Pointer to the datagram to rewrite |
| fp | IP4Fragment* | Pointer to the single fragment to rewrite |

Return Value

None.

ports

Description

The first form of this function returns true if the NAT object is configured to rewrite port numbers. The second form of this function configures the object to enable or disable port number rewriting using the values true and false, respectively.

Syntax bool ports( );
void ports(bool p);

| Parameters | | |
|---|---|---|
| Parameter | Type | Description |
| p | bool | Boolean containing whether port rewriting is enabled. |

Return Value

The first form of this function returns true if the NAT object is configured to rewrite UDP port numbers.

24. UDPSNat Class

The UDPSNat class is derived from the UDPNat class. It defines the class of objects implementing source address and (optionally) port number rewriting for complete and fragmented UDP datagrams.

Constructors

Description

The single-argument constructor is used to create UDP NAT objects that rewrite only the addresses in the IP header (and update the IP header checksum and UDP pseudo-header checksum appropriately). The two-argument constructor is used to create NAT objects that also rewrite the source port number in the UDP header. For fragmented UDP datagrams, the port numbers will generally be present in only the first fragment.

Syntax

UDPSNat(IP4Addr* newsaddr, nuint16 newsport);
UDPSNat(IP4Addr* newsaddr);

Parameters

| Parameters | | |
|---|---|---|
| Parameter | Type | Description |
| newsaddr | IP4Addr* | Pointer the new source address to be used |
| newsport | nuint16 | The new source port number to be used |

Return Value

None.

rewrite

Description

Defines the pure virtual rewrite functions in the parent class.

Syntax void rewrite(IP4Datagram* dp);
void rewrite(IP4Fragment* fp);

| Parameters | | |
|---|---|---|
| Parameter | Type | Description |
| dp | IP4Datagram* | Pointer to the datagram to be rewritten (all fragment headers are modified) |
| fp | IP4Fragment* | Pointer to the fragment to rewrite (only the single fragment header is modified). Should only be called when the fragment represents a complete UDP/IP datagram. |

Return Value

None.

25. UDPDNat Class

The UDPDNat class is derived from the UDPNat class. It defines the class of objects implementing destination address and (optionally) port number rewriting for complete and fragmented UDP datagrams.

Constructors

Description

The single-argument constructor is used to create UDP NAT objects that rewrite only the addresses in the IP header (and update the IP header checksum and UDP pseudo-header checksum appropriately). The two-argument constructor is used to create NAT objects that also rewrite the destination port number in the UDP header. For fragmented UDP datagrams, the port numbers will generally be present in only the first fragment.

Syntax

UDPSNat(IP4Addr* newdaddr, nuint16 newdport);
UDPSNat(IP4Addr* newdaddr);

| Parameters | | |
|---|---|---|
| Parameter | Type | Description |
| newdaddr | IPAddr* | Pointer the new destination address to be used |
| newdport | nuint16 | The new destination port number to be used |

Return Value

None.

rewrite

Description

Defines the pure virtual rewrite functions in the parent class.

Syntax
void rewrite(IP4Datagram* dp);
void rewrite(IP4Fragment* fp);

| | | Parameters |
|---|---|---|
| Parameter | Type | Description |
| dp | IP4Datagram* | Pointer to the datagram to be rewritten (all fragment headers are modified) |
| fp | IP4Fragment* | Pointer to the fragment to rewrite (only the single fragment header is modified). Should only be called when the fragment represents a complete UDP/IP datagram. |

Return Value
None.

26. UDPSDNat Class

The UDPSDNat class is derived from the UDPNat class. It defines the class of objects implementing source and destination address and (optionally) port number rewriting for complete and fragmented UDP datagrams.

Constructors

Description

The two-argument constructor is used to create UDP NAT objects that rewrite only the addresses in the IP header (and update the IP header checksum and UDP pseudo-header checksum appropriately). The four-argument constructor is used to create NAT objects that also rewrite the source and destination port number in the UDP header. For fragmented UDP datagrams, the port numbers will generally be present in only the first fragment.

Syntax
UDPSNat(IP4Addr* newsaddr, nuint16 newsport, IP4Addr* newdaddr, nuint16 newdport);
UDPSNat(IP4Addr* newsaddr, IP4Addr* newdaddr);

| | | Parameters |
|---|---|---|
| Parameter | Type | Description |
| newsaddr | IP4Addr* | Pointer the new source address to be used |
| newsport | nuint16 | The new source port number to be used |
| newdaddr | IP4Addr* | Pointer the new destination address to be used |
| newdport | nuint16 | The new destination port number to be used |

Return Value
None.

rewrite

Description

Defines the pure virtual rewrite functions in the parent class.

Syntax
void rewrite(IP4Datagram* dp);
void rewrite(IP4Fragment* fp);

| | | Parameters |
|---|---|---|
| Parameter | Type | Description |
| dp | IP4Datagram* | Pointer to the datagram to be rewritten (all fragment headers are modified) |

| | | Parameters |
|---|---|---|
| Parameter | Type | Description |
| fp | IP4Fragment* | Pointer to the fragment to rewrite (only the single fragment header is modified). Should only be called when the fragment represents a complete UDP/IP datagram. |

Return Value
None.

27. TCPNAT

The structure of the TCP NAT support classes follow the UDP classes very closely. The primary difference is in the handling of TCP sequence and ACK numbers.

28. TCPNat Base Class

The class TCPNat provides a base class for other TCP NAT classes. The constructor is given a pair of values indicating whether port number, sequence number, and acknowledgement number rewriting is enabled. Sequence number and ACK number rewriting are coupled such that enabling sequence number rewriting for source-rewriting will modify the sequence number field of the TCP segment, but enabling sequence number rewriting for destination-rewriting will instead modify the ACK field. This arrangement makes it possible to perform NAT on TCP streams without unnecessary complexity in the TCP NAT interface. Because of the pure virtual function rewrite, applications will not create objects of type TCPNat directly, but rather use the objects of type TCPSNat, TCPDNat, and TCPSDNat defined below.

Constructor

Description

The constructor is given a value indicating whether port number rewriting is enabled.

Syntax
TCPNat(bool doports, bool doseqs);

| | | Parameters |
|---|---|---|
| Parameter | Type | Description |
| doports | bool | Boolean value indicating whether the port number rewriting is enabled. A true value indicates port number rewriting is enabled. |
| doseqs | bool | Boolean value indicating whether the sequence/ACK number rewriting is enabled. A true value indicates sequence/ACK number rewriting is enabled. |

Return Value
None.

rewrite

Description

This pure-virtual function is defined in derived classes It performs address rewriting in a specific fashion implemented by the specific derived classes (i.e. source, destination, or source/destination combination). The rewrite call, as applied to a fragment, only affects the given fragment. When applied to a datagram, each of the fragment headers comprising the datagram are rewritten.

Syntax
virtual void rewrite(IP4Datagram* dp)=0;
virtual void rewrite(IP4Fragment* fp)=0;

Parameters

| Parameter | Type | Description |
|---|---|---|
| dp | IP4Datagram* | Pointer to the datagram to rewrite |
| fp | IP4Fragment* | Pointer to the single fragment to rewrite |

Return Value
None.
ports
Description
The first form of this function returns true if the NAT object is configured to rewrite port numbers. The second form of this function configures the object to enable or disable port number rewriting using the values true and false, respectively.
Syntax
bool ports( );
void ports(bool p);

Parameters

| Parameter | Type | Description |
|---|---|---|
| p | bool | Boolean indicating whether port number rewriting is enabled. |

Return Value
The first form of this function returns true if the NAT object is configured to rewrite TCP port numbers.
seqs
Description
The first form of this function returns true if the NAT object is configured to rewrite sequence/ACK numbers. The second form of this function configures the object to enable or disable sequence/ACK number rewriting using the values true and false, respectively.
Syntax
bool seqs( );
void seqs(bool s);

Parameters

| Parameter | Type | Description |
|---|---|---|
| s | bool | Boolean indicating whether sequence/ACK number rewriting is enabled. |

Return Value
The first form of this function returns true if the NAT object is configured to rewrite TCP port numbers.

29. TCPSNat Class

The TCPSNat class is derived from the TCPNat class. It defines the class of objects implementing source address and (optionally) port number and sequence number rewriting for complete and fragmented TCP segments.
Constructors
Description
The single-argument constructor is used to create TCP NAT objects that rewrite only the addresses in the IP header (and update the IP header checksum and TCP pseudo-header checksum appropriately). The two-argument constructor is used to create NAT objects that also rewrite the source port number in the TCP header. The three-argument constructor is used to rewrite the IP address, source port number, and to modify the TCP sequence number by a relative (constant) amount. The sequence offset provided may be positive or negative.
Syntax
TCPSNat(IP4Addr* newsaddr);
TCPSNat(IP4Addr* newsaddr, nuint16 newsport);
TCPSNat(IP4Addr* newsaddr, nuint16 newsport, long seqoff)

Parameters

| Parameter | Type | Description |
|---|---|---|
| newsaddr | IP4Addr* | Pointer the new source address to be used |
| newsport | nuint16 | The new source port number to be used |
| seqoff | long | Relative change to make to TCP sequence number fields. A positive value indicates the TCP sequence number is increased by the amount specified. A negative value indicates the sequence number is reduced by the amount specified. |

Return Value
None.
rewrite
Description
Defines the pure virtual rewrite functions in the parent class.
Syntax
void rewrite(IP4Datagram* dp);
void rewrite(IP4Fragment* fp);

Parameters

| Parameter | Type | Description |
|---|---|---|
| dp | IP4Datagram* | Pointer to the datagram to be rewritten (all fragment headers are modified) |
| fp | IP4Fragment* | Pointer to the fragment to rewrite (only the single fragment header is modified). Should only be called when the fragment represents a complete TCP/IP segment. |

Return Value
None.

30. TCPSDNat Class

The TCPSDNat class is derived from the TCPNat class. It defines the class of objects implementing source address and (optionally) port number and sequence number/ACK number rewriting for complete and fragmented TCP segments.
Constructors
Description
The two-argument constructor is used to create TCP NAT objects that rewrite only the addresses in the IP header (and update the IP header checksum and TCP pseudo-header checksum appropriately). The four-argument constructor is used to create NAT objects that also rewrite the source and destination port numbers in the TCP header. The three-argument constructor is used to rewrite the IP address, source port number, and to modify the TCP ACK number by a relative (constant) amount. The ACK offset provided may be positive or negative Syntax
TCPSDNat(IP4Addr* newsaddr, IP4Addr* newdaddr);
TCPSDNat(IP4Addr* newsaddr, nuint16 newsport, IP4Addr* newdaddr, nuint16 newdport);
TCPSDNat(IP4Addr* newsaddr, nuint16 newsport, long seqoff,
IP4Addr* newdaddr, nuint16 newdport, long ackoff);

| Parameters | | |
|---|---|---|
| Parameter | Type | Description |
| newsaddr | IP4Addr* | The new source address to be used |
| newsport | nuint16 | The new source port number to be used |
| seqoff | long | Relative change to make to TCP sequence number fields. A positive value indicates the TCP sequence number is increased by the amount specified. A negative value indicates the sequence number is reduced by the amount specified. |
| newdaddr | IP4Addr* | The new destination address to be used |
| newdport | nuint16 | The new destination port number to be used |
| ackoff | long | Relative change to make to TCP ACK number fields. A positive value indicates the TCP ACK number is increased by the amount specified. A negative value indicates the ACK number is reduced by the amount specified. |

Return Value
None.
rewrite
Description
  Defines the pure virtual rewrite functions in the parent class.
Syntax
void rewrite(IP4Datagram* dp);
void rewrite(IP4Fragment* fp);

| Parameters | | |
|---|---|---|
| Parameter | Type | Description |
| dp | IP4Datagram* | Pointer to the datagram to be rewritten (all fragment headers are modified) |
| fp | IP4Fragment* | Pointer to the fragment to rewrite (only the single fragment header is modified). Should only be called when the fragment represents a complete TCP/IP segment. |

Return Value
None.

Those skilled in the art will appreciate variations of the above described embodiments. In addition to these embodiments, other variations will be appreciated by those skilled in the art. As such, the scope of the invention is not limited to the specified embodiments, but is defined by the following claims.

What is claimed is:

1. A system comprising:
    at least one classification engine to classify a selected portion of a plurality of packets; and
    an apparatus to check cumulative status of a plurality of arithmetic operations comprising:
      a first facility to initialize a first condition code to a first value;
      a second facility to perform the plurality of arithmetic operations, a result of at least one of the plurality of arithmetic operations being capable of indicating whether a criterion is met; and
      a third facility to initialize the first condition code to a second value if the result of at least one of the plurality of arithmetic operations indicates the criterion is met.

2. The system of claim 1 wherein the classification engine includes a micro-programmed processor.

3. The system of claim 2 wherein the micro-programmed processor selectively processes the selected portion of the plurality of packets by performing thereon at least a subset of packet-based operations including packet header parsing and table lookups.

4. The system of claim 3 wherein the table lookups utilize hash tables.

5. The system of claim 1 wherein the classification engine receives a plurality of classification policies to indicate how the classification engine classifies a packet based on select information from a group comprising packet header parsing and table lookups.

6. The system of claim 5 wherein the classification policies are supplied dynamically from an application processor.

7. The system of claim 1 further including a fourth facility to perform a test on the first condition code.

8. The system of claim 1 wherein once the first condition code is initialized to the second value the first condition code remains unchanged for a remainder of the plurality of arithmetic operations.

9. The system of claim 1 wherein the plurality of arithmetic operations are selected from a group comprising a comparison operation and a subtract operation.

10. The system of claim 1 wherein the first value is non-zero.

11. The system of claim 1 wherein the second value is a zero.

12. The system of claim 1 wherein a classified packet is returned to the classification engine to be reclassified.

13. The system of claim 1 further including an application processor having a host interface.

14. The system of claim 1 further comprising a plurality of data buffers to store data utilized by the system.

15. The system of claim 1 further including an embedded processor to provide processing capabilities to the system.

16. An apparatus to check cumulative status of a plurality of arithmetic operations comprising:
    a first initializer to initialize a first condition code to a first value;
    a first circuit to perform the plurality of arithmetic operations, a result of at least one of the plurality of arithmetic operations being capable of indicating whether a criterion is met;
    a second initializer to initialize the first condition code to a second value if the result of at least one of the plurality of arithmetic operations indicates the criterion is met; and
    a second circuit to perform a test on the first condition code,
    wherein once the first condition code is initialized to the second value the first condition code remains unchanged for a remainder of the plurality of arithmetic operations.

17. The apparatus of claim 16 further including a micro-programmed processor.

18. The apparatus of claim 17 wherein the first and second circuits utilize the micro-programmed processor to perform their tasks.

19. The apparatus of claim 16 further including an embedded processor to provide processing capabilities to the apparatus.

20. The apparatus of claim 19 wherein the first and second circuits utilize the embedded processor to perform their tasks.

21. The apparatus of claim 16 wherein the plurality of arithmetic operations are selected from a group comprising a comparison operation and a subtract operation.

22. The apparatus of claim 16 wherein the first value is non-zero.

23. The apparatus of claim 16 wherein the second value is a zero.

24. The apparatus of claim 16 further including an application processor having a host interface.

25. The apparatus of claim 16 further comprising a plurality of data buffers to store data utilized by the apparatus.

26. A method of checking cumulative status of a plurality of arithmetic operations, the method comprising:
    initializing a first condition code to a first value;
    performing the plurality of arithmetic operations, a result of at least one of the plurality of arithmetic operations being capable of indicating whether a criterion is met;
    if the result of at least one of the plurality of arithmetic operations indicates the criterion is met, then initializing the first condition code to a second value;
    keeping the first condition code unchanged for a remainder of the plurality of arithmetic operations once the first condition code is initialized to the second value; and
    performing a test on the first condition code,
    wherein a status of the first condition code indicates a cumulative status of the performed plurality of arithmetic operations.

27. The method of claim 1 wherein the criterion is an item selected from a list comprising the result being non-zero, the result being zero, the result being greater than zero, and the result being less than zero.

28. The method of claim 26 wherein the first condition code is initialized by a non-arithmetic operation.

29. The method of claim 26 wherein the plurality of arithmetic operations are selected from a group comprising a comparison operation and a subtract operation.

30. The method of claim 26 wherein the result of at least one of the plurality of arithmetic operations returns an item selected from a list comprising data equal non-zero, data equal zero, data greater than zero, and data less than zero.

31. The method of claim 26 wherein the first value is non-zero.

32. The method of claim 26 wherein the second value is a zero.

33. An apparatus to check cumulative status of a plurality of arithmetic operations, the apparatus comprising:
    first initializing means to initialize a first condition code to a first value;
    processing means to perform the plurality of arithmetic operations, a result of at least one of the plurality of arithmetic operations being capable of indicating whether a criterion is met;
    second initializing means to initialize the first condition code to a second value; and
    test means to perform a test on the first condition code,
    wherein the first condition code remains unchanged for a remainder of the plurality of arithmetic operations once the first condition code is initialized to the second value.

34. The apparatus of claim 33 wherein the first condition code is initialized by a non-arithmetic operation.

35. The apparatus of claim 33 wherein the plurality of arithmetic operations are selected from a group comprising a comparison operation and a subtract operation.

36. The apparatus of claim 33 wherein the first value is non-zero.

37. The apparatus of claim 33 wherein the second value is a zero.

38. A machine-readable medium that provides instructions which, when executed by a machine, cause the machine to perform operations comprising:
    initializing a first condition code to a first value;
    performing a plurality of arithmetic operations, a result of at least one of the plurality of arithmetic operations being capable of indicating whether a criterion is met;
    if the result of at least one of the plurality of arithmetic operations indicates the criterion is met, then initializing the first condition code to a second value; and
    keeping the first condition code unchanged for a remainder of the plurality of arithmetic operations once the first condition code is initialized to the second value.

39. The medium of claim 38 further performing a test on the first condition code.

40. The medium of claim 38 wherein a status of the first condition code indicates a cumulative status of the performed plurality of arithmetic operations.

41. The medium of claim 38 wherein the plurality of arithmetic operations are selected from a group comprising a comparison operation and a subtract operation.

42. The medium of claim 38 wherein the first value is non-zero.

43. The medium of claim 38 wherein the second value is a zero.

44. An apparatus to check cumulative status of a plurality of arithmetic operations comprising:
    a first facility to initialize a first condition code to a first value;
    a second facility to perform the plurality of arithmetic operations, a result of at least one of the plurality of arithmetic operations being capable of indicating whether a criterion is met;
    a third facility to initialize the first condition code to a second value if the result of at least one of the plurality of arithmetic operations indicates the criterion is met; and
    a fourth facility to perform a test on the first condition code,
    wherein once the first condition code is initialized to the second value the first condition code remains unchanged for a remainder of the plurality of arithmetic operations.

45. The apparatus of claim 44 wherein the plurality of arithmetic operations are selected from a group comprising a comparison operation and a subtract operation.

46. The apparatus of claim 44 wherein the first value is non-zero.

47. The apparatus of claim 44 wherein the second value is a zero.

48. The apparatus of claim 44 further including a microprogrammed processor.

49. The apparatus of claim 44 further including an application processor having a host interface.

50. The apparatus of claim 44 further comprising a plurality of data buffers to store data utilized by the apparatus.

51. The apparatus of claim 44 further including an embedded processor to provide processing capabilities to the apparatus.

52. A method of checking cumulative status of a plurality of arithmetic operations, the method comprising:

initializing a first condition code to a first value;

performing the plurality of arithmetic operations, a result of at least one of the plurality of arithmetic operations being capable of indicating whether a criterion is met;

if the result of at least one of the plurality of arithmetic operations indicates the criterion is met, then initializing the first condition code to a second value; and performing a test on the first condition code, wherein a status of the first condition code indicates a cumulative status of the performed plurality of arithmetic operations.

53. The method of claim 52 wherein once the first condition code is initialized to the second value the first condition code remains unchanged for a remainder of the plurality of arithmetic operations.

54. The method of claim 52 wherein the criterion is an item selected from a list comprising the result being non-zero, the result being zero, the result being greater than zero, and the result being less than zero.

55. The method of claim 52 wherein the first condition code is initialized by a non-arithmetic operation.

56. The method of claim 52 wherein the plurality of arithmetic operations are selected from a group comprising a comparison operation and a subtract operation.

57. The method of claim 52 wherein the result of at least one of the plurality of arithmetic operations returns an item selected from a list comprising data equal non-zero, data equal zero, data greater than zero, and data less than zero.

58. The method of claim 52 wherein the first value is non-zero.

59. The method of claim 52 wherein the second value is a zero.

60. An apparatus to check cumulative status of a plurality of arithmetic operations, the apparatus comprising:

a first initializer to initialize a first condition code to a first value;

a processor to perform the plurality of arithmetic operations, a result of at least one of the plurality of arithmetic operations being capable of indicating whether a criterion is met;

a second initializer to initialize the first condition code to a second value; and a tester to perform a test on the first condition code, wherein the first condition code remains unchanged for a remainder of the plurality of arithmetic operations once the first condition code is initialized to the second value.

61. The apparatus of claim 60 wherein the first condition code is initialized by a non-arithmetic operation.

62. The apparatus of claim 60 wherein the plurality of arithmetic operations are selected from a group comprising a comparison operation and a subtract operation.

63. The apparatus of claim 60 wherein the first value is non-zero.

64. The apparatus of claim 60 wherein the second value is a zero.

\* \* \* \* \*

UNITED STATES PATENT AND TRADEMARK OFFICE
CERTIFICATE OF CORRECTION

PATENT NO. : 6,701,338 B2
DATED : March 2, 2004
INVENTOR(S) : Narad et al.

It is certified that error appears in the above-identified patent and that said Letters Patent is hereby corrected as shown below:

Column 1,
Line 10, after "U.S. Pat. No. 6,157,955.", insert -- The subject patent application is related to U.S. Patent Application 10/ 100, 746, entitled "Multiple Consumer- Multiple Producer Rings", filed 3/18/2002 and U.S. Patent Application 10/084,815, entitled "Programmable System for Processing a Partitioned Network Infrastructure" filed 02/27/2002. The patent application is also related to U.S. Patent Application 09/282,790, entitled "Platform Permitting Execution of Multiple Network Infrastructure Applications", filed 3/31/1999, and issued as U.S. Pat. No. 6,401,117 --.

Column 14,
Line 7, delete "(BARI)" and insert -- (BAR1) --.

Column 15,
Line 11, delete "EEE" and insert -- IEEE --.

Column 16,
Line 23, delete "BARI" and insert -- BAR1 --.

Column 24,
Line 5, after "118", please insert:
-- has not yet dequeued. For the purposes of a TX Ring 406 or 408 this region consists of space into which more packets may be scheduled for transmit. One skilled in the art will recognized that region 704 or region 706 could just as easily be the region wrapping around the array boundary, depending on the values of MTRECOV 712, MTCONS 714, and MTPROD 716.
  Embedded in the buffer is the packet length in bytes (including the Ethernet header, but not including the CRC since the TX MAC will generate that) and also the byte offset within the buffer where the Ethernet header begins. The offset is necessary since the start of packet might have been moved back (if adding encapsulation headers) or forward (if decapsulating a packet.) The Ethernet header typically starts at byte offset 0x2 within that word, but the TX MAC supports arbitrary byte alignment. PKT_OFFSET and LENGTH are found in the "RX Status" and "TX Command" word of the buffer as described in Table 1; for transmit purposes those are the only two meaningful fields in that word.
  The area labeled "TX Status/TX Timestamp" is optionally written with one word of transmit status plus the value of TIMER at the time the field is written, if MCSR [TX_STAT] is set; the content of that word is described in Table 2.
  FIG. 9 illustrates the transmit buffer format according to certain embodiments of the present invention.

UNITED STATES PATENT AND TRADEMARK OFFICE
CERTIFICATE OF CORRECTION

PATENT NO.   : 6,701,338 B2
DATED        : March 2, 2004
INVENTOR(S)  : Narad et al.

It is certified that error appears in the above-identified patent and that said Letters Patent is hereby corrected as shown below:

Column 24, (cont.)
   When a packet is scheduled through TX Ring 406 or 408 to be transmitted on a TX MAC 218 or 234, respectively, the TX MAC controller 222 or 232, respectively, interprets the contents of the packet buffer 840 in accordance with the format shown in FIG. 9. The RX Status Word and TX Command Word 802 is found at the location pointed to by the 2KB-aligned buffer pointer obtained from the TX Ring 406 or 408. The RX Status and TX Command Word 802 is in the format specified by Table 1; when this word is interpreted by the TX MAC controller 222 or 232 only the fields LENGTH and PKT_OFFSET have any meaning and the rest of the word is ignored. PKT_OFFSET indicates the byte offset from the start of the 2KB-aligned buffer at which the first byte of the Ethernet header is to be found, and LENGTH is the number of bytes to be transmitted not including the (4-byte) Ethernet CRC which the TX MAC 222 or 232 will generate and append to the packet as it is being transmitted. The RX Timestamp 804 was used by previous agents processing this buffer, and is not interpreted by the TX MAC controller 222 or 232.
The PKT_OFFSET field can legitimately have any value between (16) and (255), allowing the agent that scheduled the transmit to manipulate headers and to relocate the start of the packet header 812 as needed. FIG 9. shows a zero-filled two-byte pad 830 prior to the start of Ether Header 812, but that is not a requirement of the preferred embodiment; the TX MAC 222 or 232 can transmit a packet which starts at any arbitrary byte alignment in the transmit buffer 840. The two-byte pad 830 shown preceding the header 812 is shown to illustrate the common case, wherein a received packet was thus aligned and any movement of the ethernet header 812 for encapsulation or decapsulation of protocols is in
   units of words (4 bytes.) Pad Space 810 can vary in size from zero bytes to (240) bytes as defined by the value of PKT_OFFSET in the TX Command Word 802.
   The concatenation of Ether Header 812 and Payload 814 comprise the packet that is transmitted, along with the generated Ethernet CRC which the TX MAC 222 or 232 appends during the transmit. The Ethernet CRC field 816 is not normally used by the TX MAC 218 or 234, but was written there during receive by the RX MAC 220 or 228. Each TX MAC controller 222 and 232 has a configuration setting which can instruct it to not generate CRC as it transmits; in that case the LENGTH field in the TX Command Word 802 includes the four bytes of Ethernet --.

UNITED STATES PATENT AND TRADEMARK OFFICE
CERTIFICATE OF CORRECTION

PATENT NO. : 6,701,338 B2
DATED : March 2, 2004
INVENTOR(S) : Narad et al.

It is certified that error appears in the above-identified patent and that said Letters Patent is hereby corrected as shown below:

<u>Column 37,</u>
Lines 19-20, delete "completes" and insert -- complete --.

<u>Column 38,</u>
Line 5, delete "cleaning" and insert -- clearing --.

<u>Column 39,</u>
Lines 66-67, delete "fornats" and insert -- formats --.

<u>Column 40,</u>
Line 10, delete "1-Reg" and insert -- I-Reg --.

<u>Column 45,</u>
Line 24, delete "Daring" and insert -- During --.

<u>Column 52,</u>
Table 16, Line 18, after "pass-thru", append -- [52] -- at the end of the line.

<u>Column 57,</u>
Line 40, delete "DFFO" and insert -- DFIFO --.

<u>Column 58,</u>
Line 7, delete "uniock" and insert -- unlock --.

<u>Column 62,</u>
Line 36, delete "trae" and insert -- true --.

<u>Column 69,</u>
At the beginning of line 4, insert -- value --.

<u>Column 96,</u>
At line 21, after "size", insert -- . --.

<u>Column 97,</u>
Line 17 delete "P", insert -- IP --.

<u>Column 109,</u>
Line 13, delete "ever", insert -- never --.

UNITED STATES PATENT AND TRADEMARK OFFICE
CERTIFICATE OF CORRECTION

PATENT NO. : 6,701,338 B2
DATED : March 2, 2004
INVENTOR(S) : Narad et al.

It is certified that error appears in the above-identified patent and that said Letters Patent is hereby corrected as shown below:

Column 110,
Line 36, delete "P", insert -- IP --.

Signed and Sealed this

Eighth Day of June, 2004

JON W. DUDAS
*Acting Director of the United States Patent and Trademark Office*